US006999117B2

(12) United States Patent
Yamazaki

(10) Patent No.: US 6,999,117 B2
(45) Date of Patent: Feb. 14, 2006

(54) IMAGE PICKUP DEVICE AND METHOD FOR AUTOMATICALLY INPUTTING PREDEFINED INFORMATION AND PROCESSING IMAGES THEREOF

(75) Inventor: Yoshiro Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 879 days.

(21) Appl. No.: 09/855,539

(22) Filed: May 16, 2001

(65) Prior Publication Data

US 2002/0018138 A1 Feb. 14, 2002

(30) Foreign Application Priority Data

May 16, 2000 (JP) ............................. 2000-143218
May 16, 2000 (JP) ............................. 2000-143582
May 19, 2000 (JP) ............................. 2000-148861

(51) Int. Cl.
*H04N 5/228* (2006.01)

(52) U.S. Cl. ...................... 348/222.1; 348/207.99; 348/161; 348/231.6; 396/297

(58) Field of Classification Search ............... 348/222, 348/231, 211.9, 333, 222.1, 161, 207.99, 348/208.14, 231.6; 396/297
See application file for complete search history.

(56) References Cited

U.S. PATENT DOCUMENTS

| 5,845,166 A | * | 12/1998 | Fellegara et al. ............. 348/64 |
| 6,097,431 A | * | 8/2000 | Anderson et al. ........ 348/231.7 |
| 6,133,951 A | * | 10/2000 | Miyadera ................. 348/220.1 |
| 6,512,919 B1 | * | 1/2003 | Ogasawara ................. 348/14.01 |
| 6,683,649 B1 | * | 1/2004 | Anderson .............. 348/333.05 |
| 6,747,692 B1 | * | 6/2004 | Patel et al. .............. 348/211.2 |

FOREIGN PATENT DOCUMENTS

JP  11-275351 A  10/1999

* cited by examiner

*Primary Examiner*—David L. Ometz
*Assistant Examiner*—Gevell Selby
(74) *Attorney, Agent, or Firm*—Birch Stewart Kolasch & Birch LLP

(57) ABSTRACT

When using a digital still camera to sense and capture an image of a medium with a bar code being recorded thereon for indication of information to be input to the digital still camera (such as information indicative of photographing conditions and/or information representing processing conditions of image processing), judgment is done to determine whether a region equivalent to the bar code is present within an image, and then a region equivalent to the bar code is extracted for analyzation of coded information as indicated by such bar code; if no contradiction is found in the coded information then let it be stored in a storage or "memory" region pursuant to the kind of such coded information. And the information thus stored will be used to perform setting of image pickup conditions and/or setup of image processing condition.

38 Claims, 21 Drawing Sheets

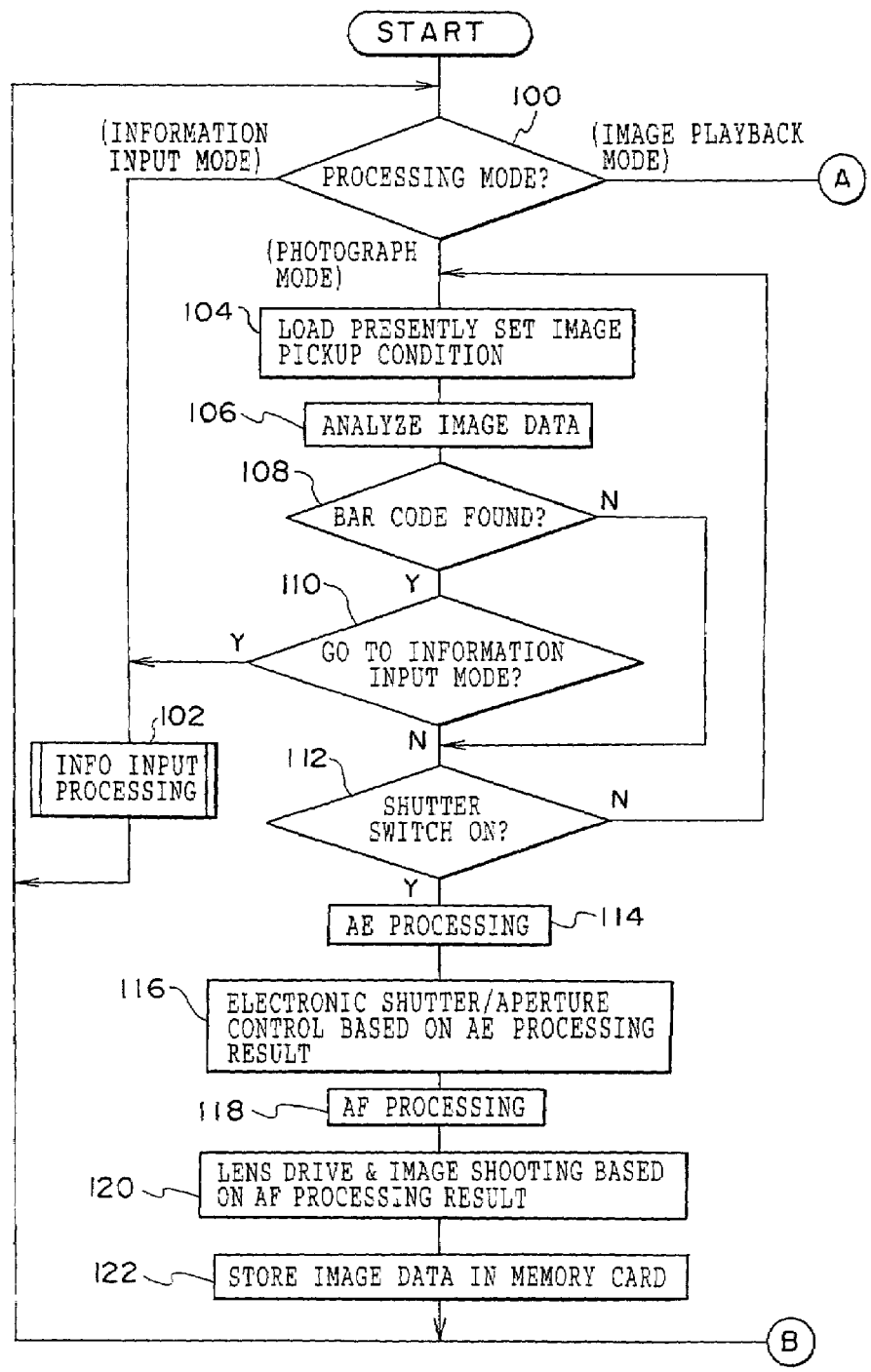

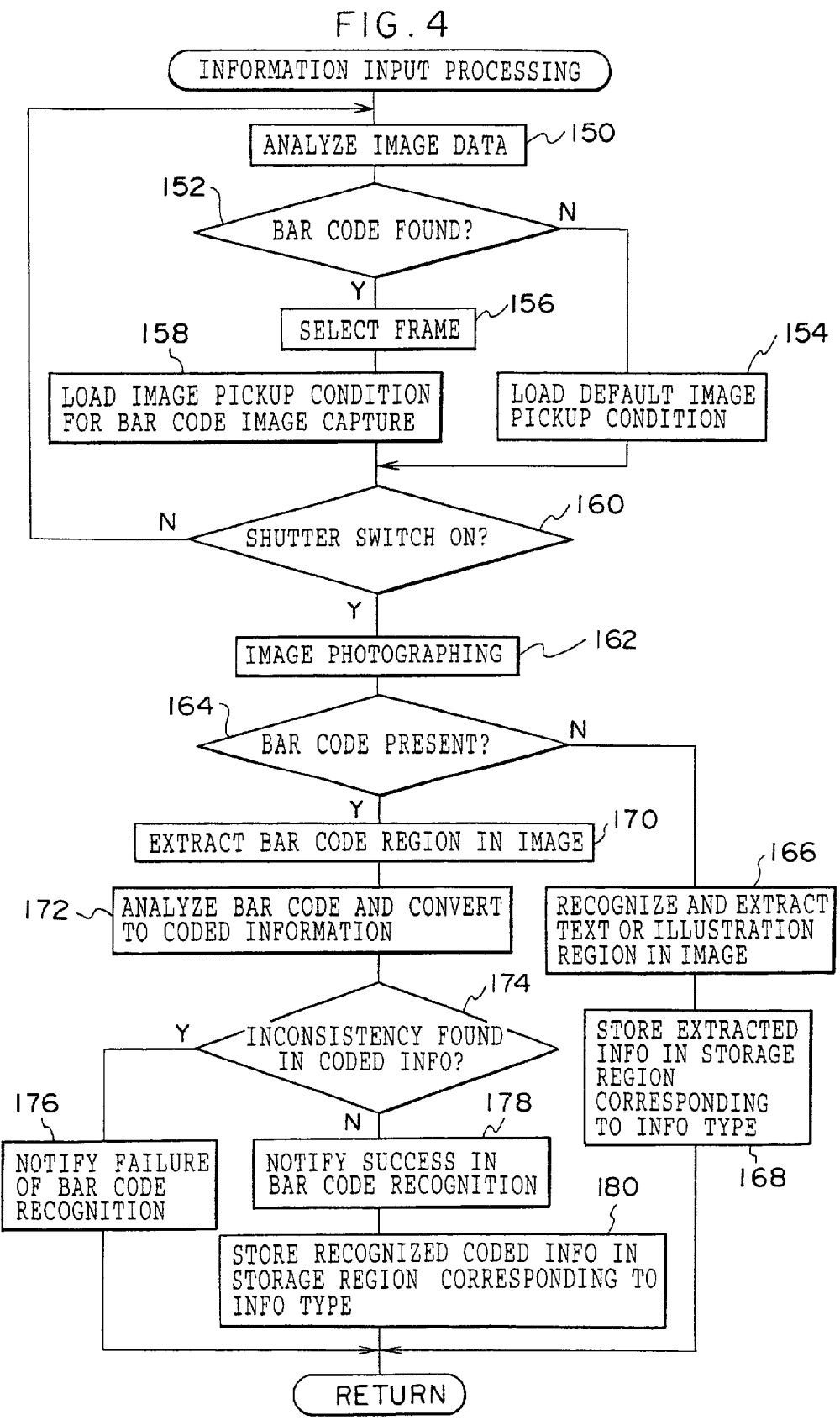

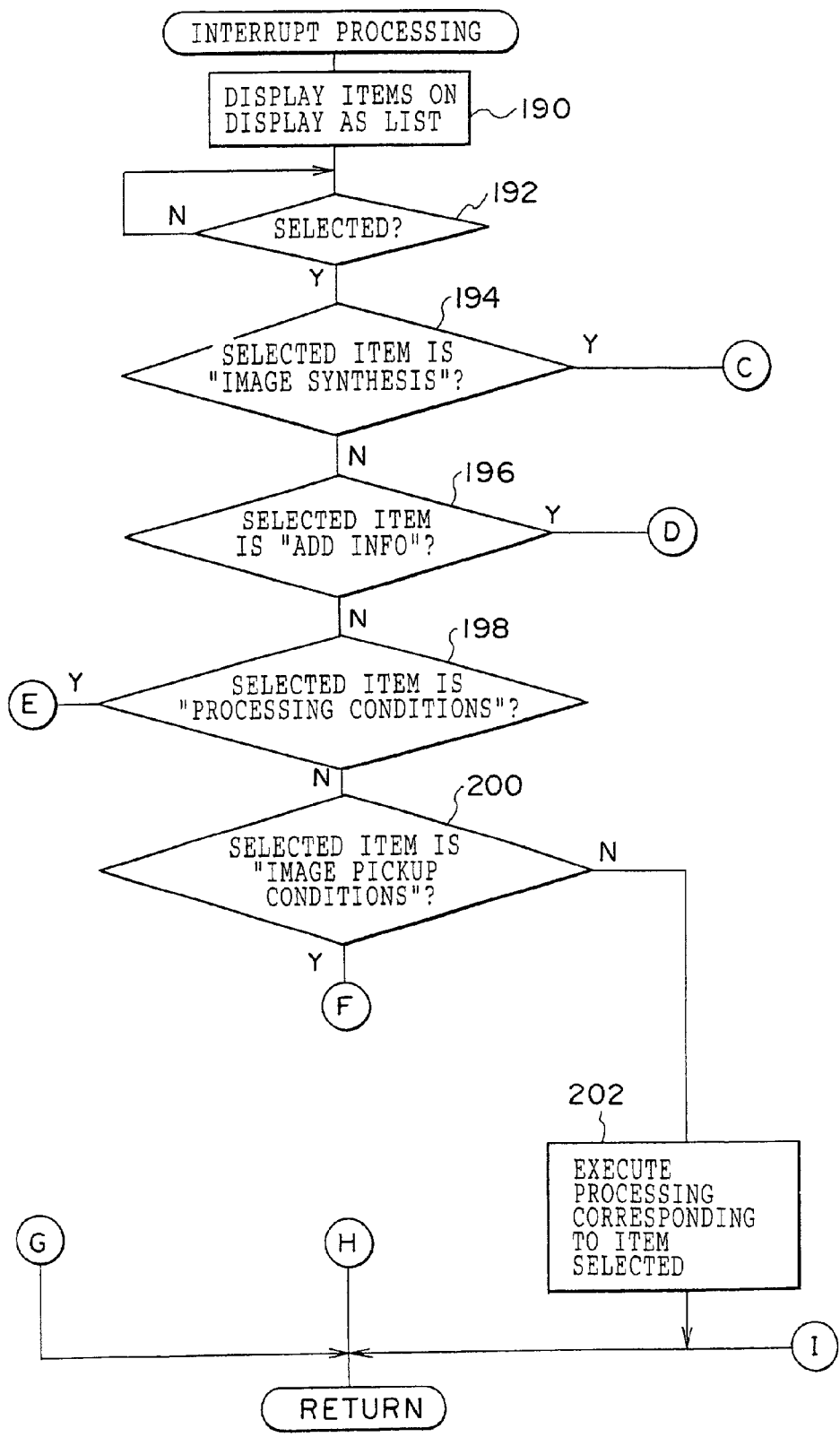

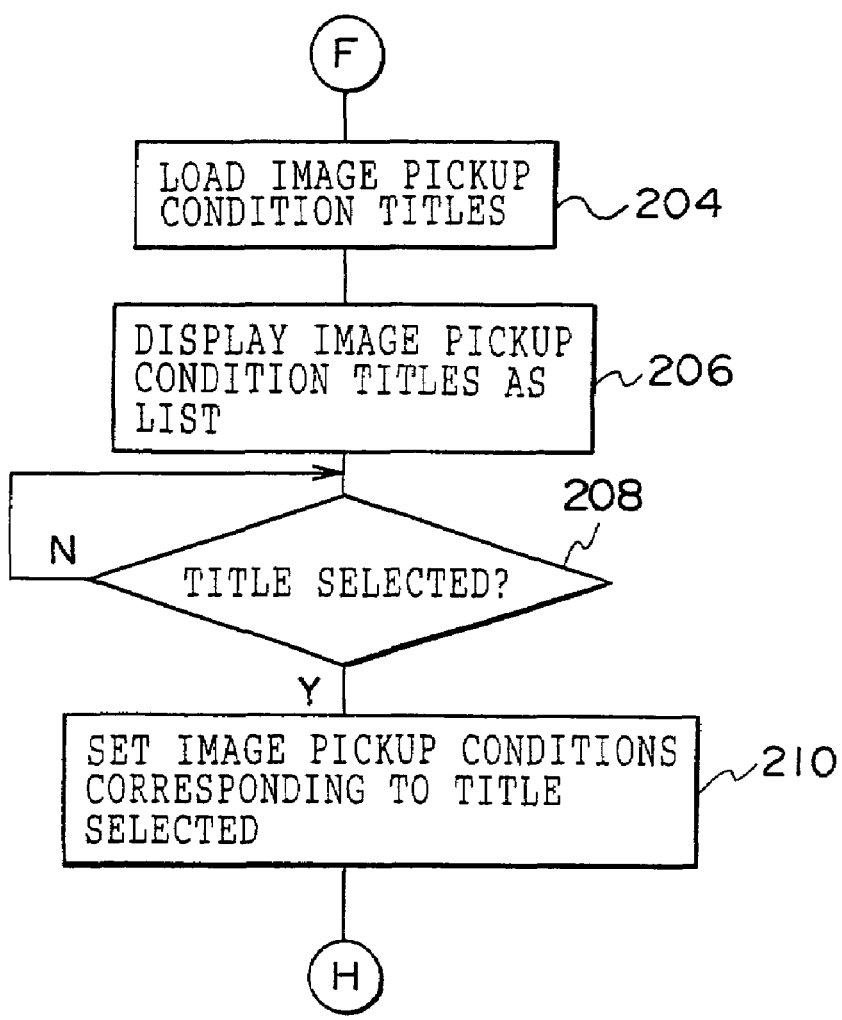

FIG.8A

```
IMAGE PICKUP CONDITION TITLE LIST

1. PORTRAIT
2. CLEAR DAY
3. LANDSCAPE
4. BACKLIT
5. NIGHT SCENE
   :
```

FIG.8B

```
IMAGE PICKUP CONDITION DETAILS <PORTRAIT>
FLASH                 ON
AE MODE               APERTURE-PRIORITY
HIGHLIGHT AREA        NOT SATURATED
SHOOTING CONDITION
AUTO-WHITE BALANCE    ON
   :
```

FIG.8C

```
IMAGE PROCESSING CONDITION TITLE LIST

1. PORTRAIT
2. BUILDING
3. COLORFUL
4. INDOOR SHOOTING
   :
```

FIG.8D

```
PROCESSING CONDITION DETAILS <PORTRAIT>
SATURATION                  +0
SHARPNESS                   -2
RED-EYE REDUCTION           AUTO
SETUP LEVEL                 FIXED TONE
COLOR CONVERSION TABLE      NO. 1
TONE SETTING                SOFT
   :
```

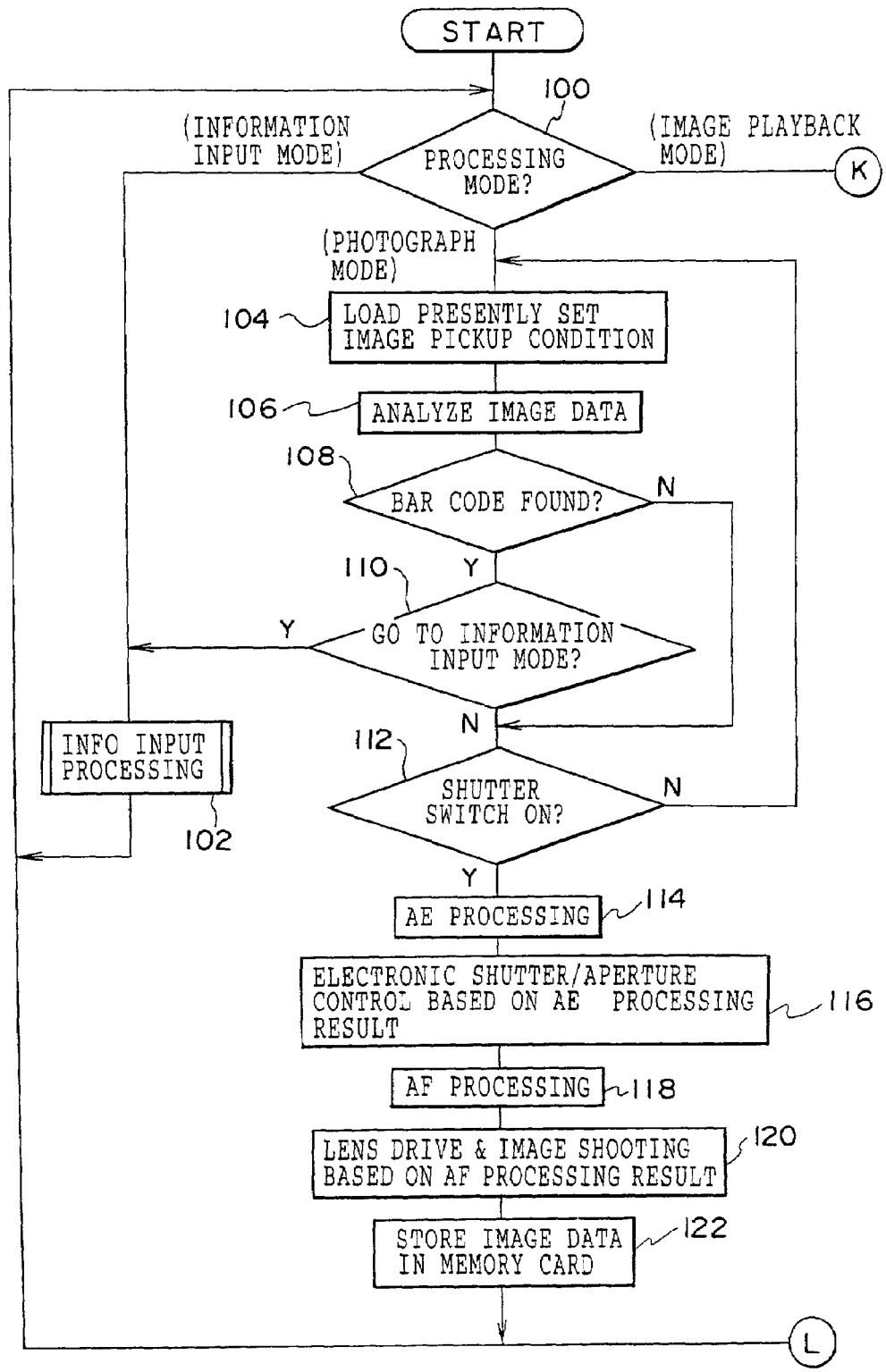

FIG. 10A
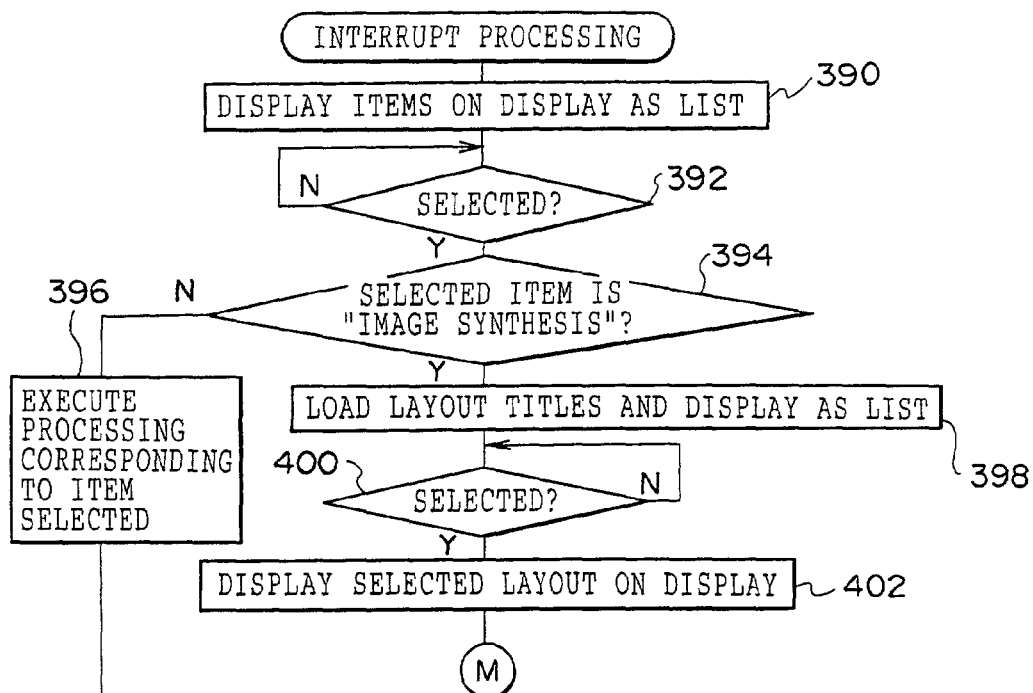
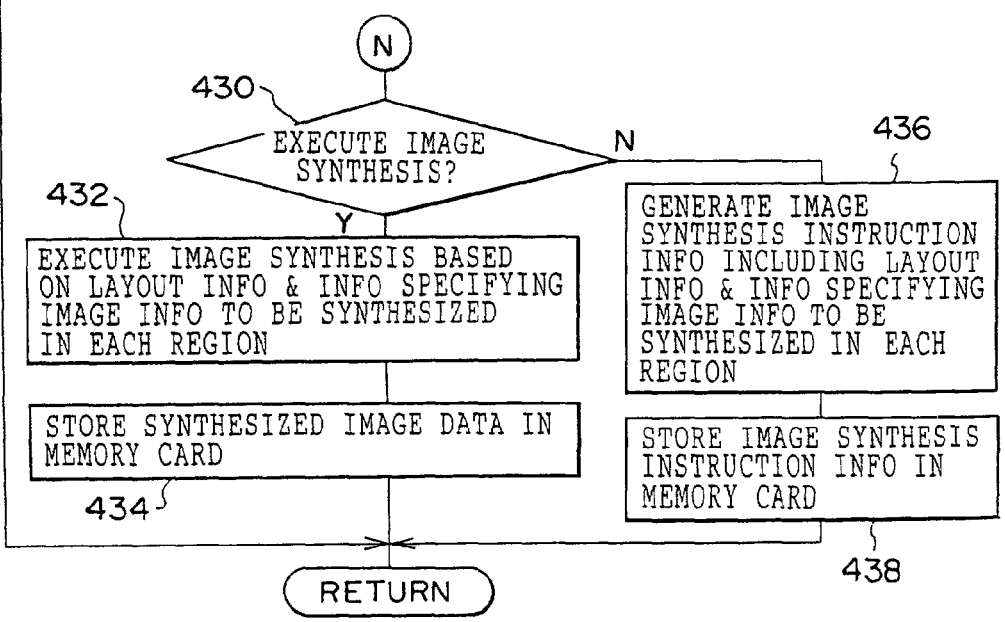

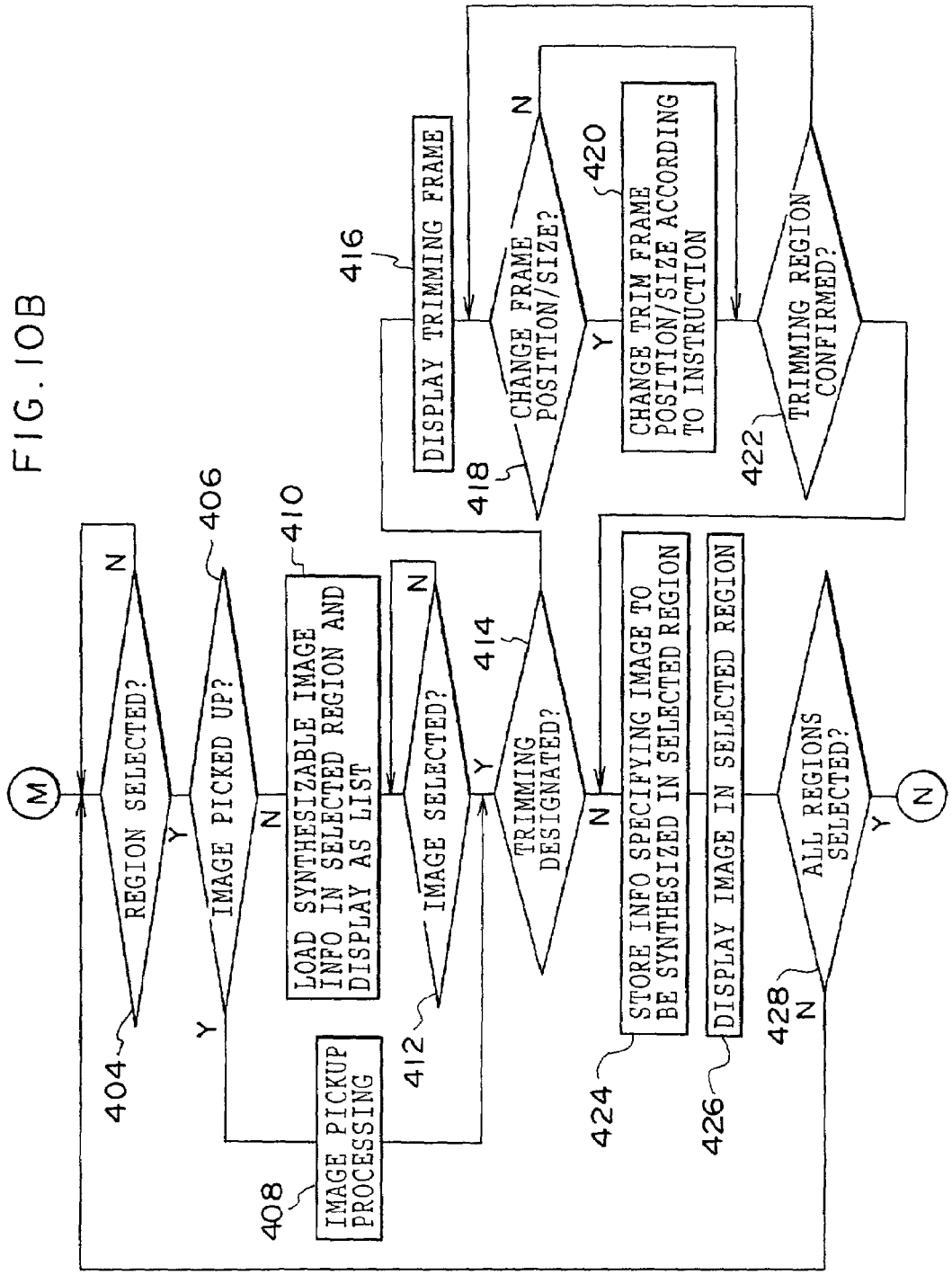

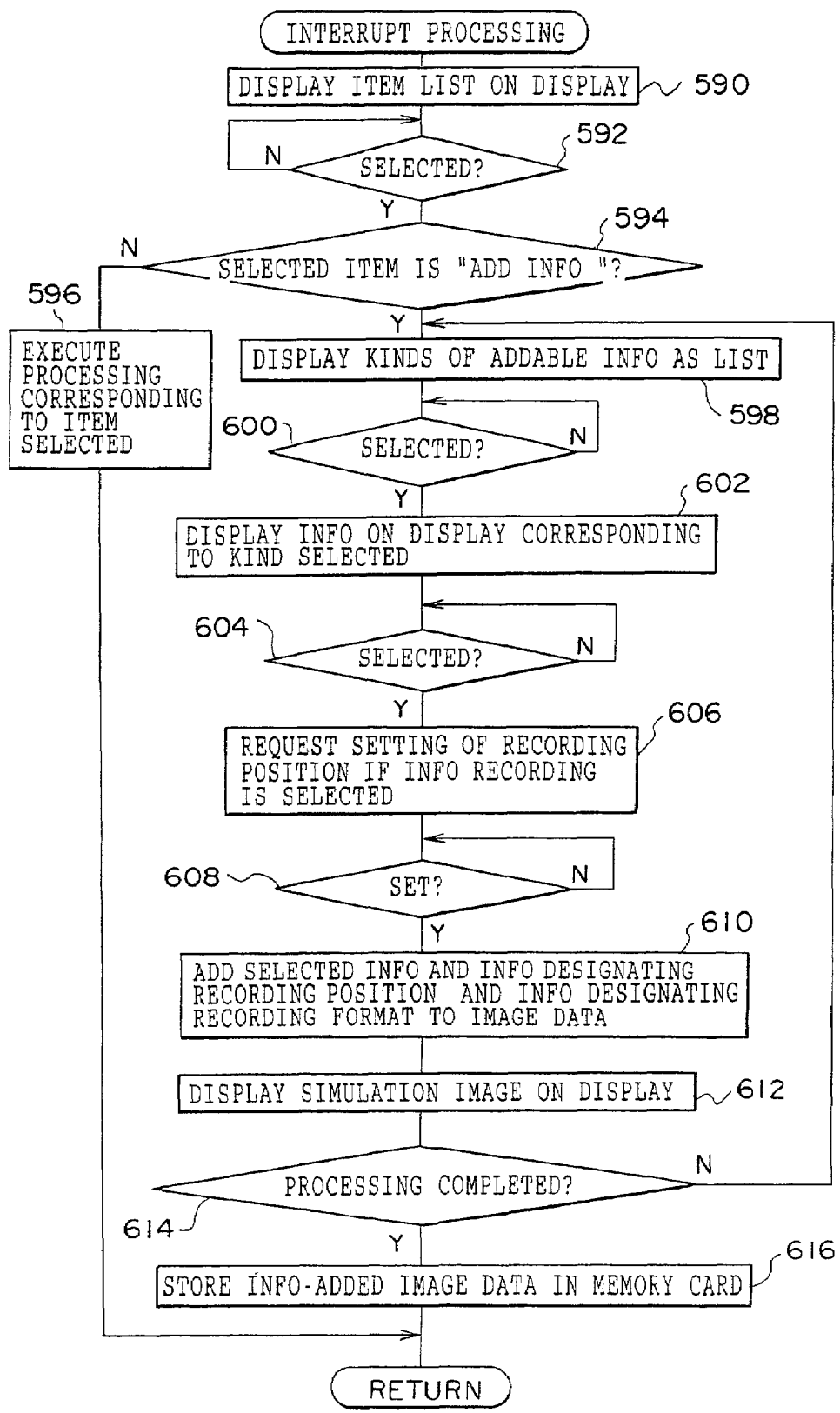

FIG. 14A
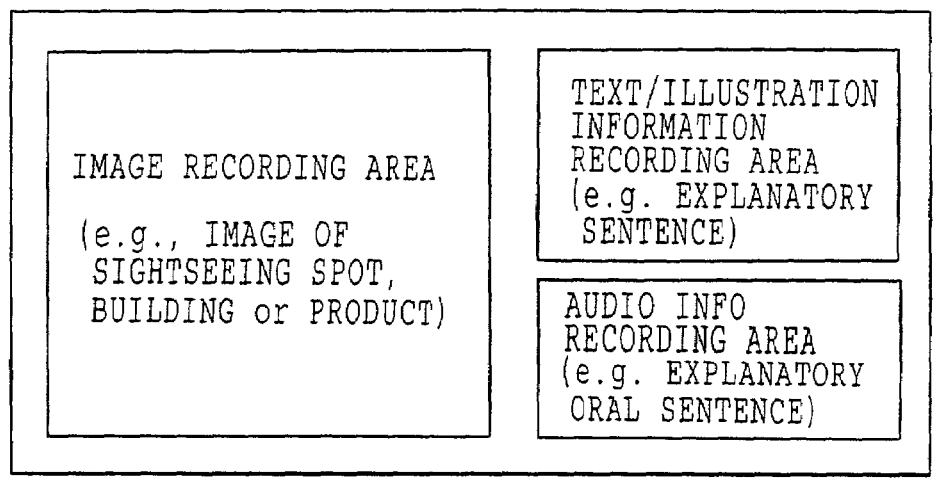
FIG. 14B
<TOP SURFACE>
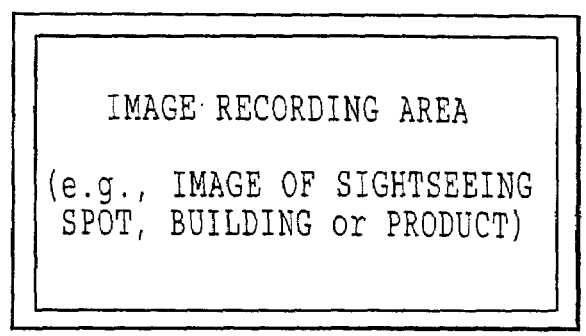
<BACK SURFACE>
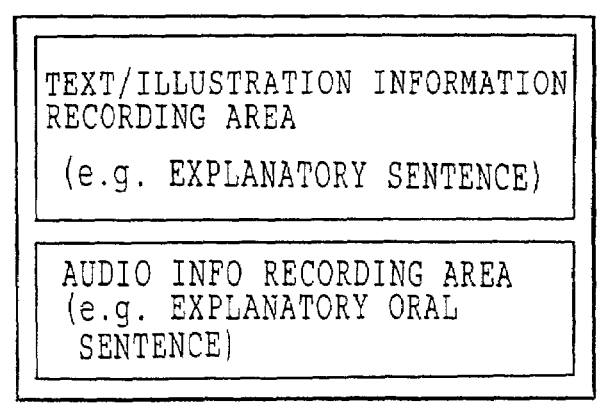

IMAGE PICKUP DEVICE AND METHOD FOR AUTOMATICALLY INPUTTING PREDEFINED INFORMATION AND PROCESSING IMAGES THEREOF

BACKGROUND OF THE INVENTION

1. Field of the Invention

The present invention relates generally to image sensing or pickup devices and image pickup device control methodology as well as image processing methods, and more particularly to an image pickup device including an image pickup section for sensing an optical image and converting it into image information such as a digital still camera or digital video camera or the like, an image pickup device control method for permitting execution of input of predefined information to the image pickup device and then letting it perform corresponding processing, an image processing method utilizing the image pickup device, and an image processing method for causing, upon recording of an image represented by the image information on a recording material, desired information to be recorded on the same recording material.

2. Description of the Related Art

Digital still cameras which have come into wide use or popularized rapidly in recent years are typically designed to include an image sensing or pickup element such as a charge-coupled device (CCD) or the like for taking a photograph of an object of interest to obtain an optical image thereof by the image sensor and, after having converted an analog image signal thus obtained by such photography into digital image data, recording it into information storage media (memory card) such as the one called "Smart Media" or the like. These cameras are capable of obtaining high-quality photo prints through the user's action of sending resultant image data obtained by photography toward a photo processing lab with a request for preparation of photo prints, and also capable of readily recording an image represented by the image data on a sheet of paper or the like by use of his or her own home-use printer machine.

Incidentally, while in the digital still cameras the endless quest for higher quality in photographic images results in a further increase in image sensor resolution year by year, such photographic images of higher quality will hardly be achieved only by such image sensor resolution enhancement. In order to photograph or "shoot" various objects or scenes with high precision under a variety of illumination conditions in every event, it will be desirable that the digital still cameras come with built-in functions for enabling a camera operator or user to precisely set up several image pickup conditions in accordance with the object of each photo image. Unfortunately, presently available digital still cameras—in particular, general-purpose or "point-and-shoot" digital still cameras, also known as compact cameras—are decreasing in size from year to year, resulting a difficulty being felt in providing a digital still camera body with a great number of switches and/or manual operation buttons for the purpose of enabling precise setup of any intended image pickup conditions.

Although currently available digital still cameras include those that are designed to offer connectivity with personal computers (PCs) or the like for enabling setup of more than one parameter of various parameters defining a image pickup condition via such PCs, such cameras suffer from a disadvantage that this function is not utilizable unless digital still cameras are connected to PCs—for some users who own no PCs, they are obviously unable to utilize the function in any way.

Additionally, with schemes for recording picture images by use of digital image data, unlike traditional schemes for recording images that have been once recorded on a roll of photo film onto photographic paper sheets by area exposure techniques, it is possible to well control the picture quality of an individual output image by execution of certain image processing as applied to image data while at the same time enabling accomplishment without difficulties of image composition/synthesis processes by using digital image data for creating a composite image with a plurality of images being combined together in any given layout or a composite image with any required characters and/or illustrations or the like being synthesized onto an original photo image, by way of example. If the functionality for performing such variety of kinds of image processings is built into a digital still camera in the way discussed above, then a need arises for users to manually set up precisely what kind of image processing is to be carried out under which processing condition in the digital still camera whenever the user wants to utilize this functionality; however, the switches and operation buttons capable of provision at a digital camera body are limited in number, which in turn makes it difficult to "mount" such functionality into the digital still camera as the built-in function thereof.

In addition, while in many cases the above-noted multi-way image processing tasks are to be done at the photo processing lab upon receipt of a request from the camera user to prepare photo prints, it is inherently time-consuming and troublesome works for the user to inform in detail the exact kind of his or her desired image processing and processing conditions in a way corresponding to the individual one of photo images upon issuance of the photo print preparation request, resulting in occurrence of another problem that the user suffers from the significance of workload for requesting creation of photo prints with his or her intended finish.

One available approach to avoiding the above problems is, for example, to provide a digital still camera with manual switches and operation buttons for allowing the user to designate the content of image synthesis processing to be executed to thereby enable the user to precisely set in his or her digital still camera the contents of such image synthesis processing such as designation of a layout of images being combined or synthesized together and/or which one of images is to be subjected to synthesis, wherein the contents will then be sent to the photo processing lab in the form of a memory card storing therein the contents of settings along with image data concerned. However, presently available digital still cameras—in particular, point-and-shoot or "compact" digital still cameras—are more downsized from year to year, resulting a difficulty being felt in providing a digital still camera body with a great number of switches and/or manual operation buttons for the purpose of enabling precise setup of the contents of image synthesis processing to be executed.

Another exemplary approach is also available, which performs any required image synthesis on a digital still camera by use of layout information indicative of a layout of a plurality of images to be combined or synthesized together, which information has been electronically stored in a memory card as loaded into the digital still camera and thus input thereto. Regrettably such memory card is relatively high in price; thus, the user's purchasing the memory card for storage therein the layout information in order to perform the required image synthesis on the digital still camera would force the user to pay more money therefor.

Alternatively on the photo processor lab side, in cases where an attempt is made to provide the user who desires to add certain information to photo prints with services for adding users' instructed information to the photo prints, it will possibly happen that the information desired by user to be added to photo prints are taken to the lab in a wide variety of forms. One example is that in case "rare" information of non-data format such as a string of hand-written characters and/or hand-written illustration is taken to the lab as the information to be added to photo prints, it is necessary to optically scan and read such hand-written character string and/or illustration and thereafter convert the result into corresponding electrical data readily addable to the photo prints. Another necessity is to manage or handle the information as instructed by the user to be added to photo prints in a way corresponding to the "original" photo print images to which the information is added.

In this way, whenever an attempt is made to provide services for adding user's desired information to photo prints, the photoprocessor lab is strictly required to do complicated processing tasks upon receipt of the information the user brings. Alternatively, with regard to the user side, complicated actions will often be required upon request of preparing photo prints, including but not limited to actually bringing desired information being added to photo prints to the lab and then designating more than one photo print to which the information is to be added.

Also note that the information addable to photo prints may also include sound/voice or audio information. While this audio information may be recorded on a photo print in a prespecified format which permits easy reproduction or "playback" of sounds and/or voices by use of commercially available reader equipment for example, any techniques have not yet been established at least at present for smoothly performing delivery of such audio information between the user and the photo processor lab without complicating processing tasks on the lab side and works on the user side.

Further note that advanced portable or "mobile" electronic information terminal devices or tools with a built-in image sensor unit have become available on the market today while attempts are made to provide such image sensor to mobile "over-the-air" radiotelephone handsets also; however, regarding such image sensor built-in electronic equipment and/or electronic imaging devices such as digital still cameras also, it remains difficult to precisely set up image pickup or photography conditions and others in the way stated supra. To aid in interpretation of the claims that follow, the terms "imaging device," "image sensing device," "image sensor" and "image pickup device" may be used interchangeably to mean a device or equipment operable to detect and capture an image of an object on a light-sensitive surface thereof.

SUMMARY OF THE INVENTION

The present invention has been made in view of the above stated facts, and its primary object is to obtain an image sensing or pickup device capable of permitting easy execution of any desired processing without increasing the complexity of an arrangement thereof, and also a method for controlling the image pickup device.

Another object of the present invention is to obtain an image processing method capable of facilitating requesting of image information processing with any desired processing contents.

Still another object of this invention is to obtain an image pickup device capable of easily achieving co-recording of desired information when recording more than one picture image on recording material.

To attain the foregoing objects an image sensing or pickup device in accordance with a first aspect of the present invention is arranged to include an image pickup section for sensing an optical image and converting the optical image into image information, a recognition section for recognizing, when an optical image containing therein a medium presently displaying predefined information is sensed and captured by the image pickup section, the predefined information based on the image information as obtained due to the image sensing, storage section for storing therein the predefined information as recognized by the recognition section, and a processing section for controlling the image sensing by the image pickup section based on the predefined information or for processing image information based on the predefined information or alternatively for letting the predefined information correspond to image information relating thereto.

The image pickup device in accordance with the first aspect of the instant invention comprises the image pickup section for converting a sensed optical image to corresponding image information. Examples of this image pickup device typically are digital still cameras, digital video cameras, mobile information terminals with built-in image sensor module, and portable or "handheld" telephone handsets with image sensor unit. In addition, the image pickup device in accordance with the first aspect of the invention also comprises the recognition section for recognizing, when an optical image containing therein a medium that is displaying predefined information was sensed and captured, the predefined information based on the image information that has been obtained due to the image sensing/capture operation, wherein the predefined information as recognized by the recognition section will be stored or "memorized" in the storage section operatively associated therewith.

With such an arrangement, displaying on a medium the predefined information to be input to the image pickup device and then capturing an image of this medium by the image pickup device results in the predefined information being recognized by the recognition section and then stored in the storage section and thereafter input to the image pickup device. Inputting of the predefined information is done by use of an image sensing unit of the image pickup device in the way stated above avoids a need to provide a great number of manual switches and/or any extra operation buttons used during input of the predefined information, which in turn makes it possible to preclude unwanted increase in complexity of the arrangement of the image pickup device.

Additionally it is preferable that the predefined information be coded and displayed at a medium in a visually recognizable form. While a two-dimensional (2D) bar code is employable as this form, a one-dimensional (1D) bar code may also be employable when the need arises. Letting the predefined information be coded and displayed in such visually recognizable form makes it possible to display the predefined information with high densities (in particular, the use of the 2D bar code is preferable due to its capability of displaying the predefined information with higher densities) while at the same time enabling avoidance of any possible reduction in recognition rates of the predefined information even in the case of increased information mounts.

Also note that the predefined information in accordance with the invention should not be limited only to the one that is displayed at a medium in the visually recognizable coded form and may alternatively be a string of characters or an illustration as displayed at the medium. Additionally the medium may also be a display medium for constantly displaying specific information (for example, a sheet-like recording material such as a paper sheet or optionally a signboard or the like) or still alternatively a display medium capable of freely modifying the information to be displayed thereon (e.g. display units such as a CRT or LCD).

And, the processing section in accordance with the first aspect of the invention is operable to control the image sensing as executed by the image pickup section based on the predefined information as recognized by the recognition section and stored in the storage section, or alternatively process image information based on the predefined information, or still alternatively cause the predefined information to correspond to image information relating thereto.

With such an arrangement, in cases where an attempt is made to control an image pickup condition during image sensing to be performed by the image pickup section to become a desired image pickup condition by way of example, if the processing section is arranged to control image sensing being done by the image pickup section on the basis of predefined information, then the image sensing by the image pickup section will be controlled under a desired image pickup condition based on information concerning the image pickup condition by a process of sensing an image of the medium on which the "information concerning an image pickup condition of the image pickup section" (more specifically, image pickup condition information defining a desired image pickup condition, for example) is presently displayed as the predefined information.

Alternatively in case where an attempt is made to apply desired processing to the image information obtained through image sensing by the image pickup section for example, if the processing section is designed to process image information based on predefined information then such desired processing will be carried out with respect to the image information on the basis of information as to processing of the image information by a process of sensing an image of a medium with the "information as to processing of image information" (specifically, processing condition information defining the processing condition of desired image processing relative to the image information, or alternatively layout information defining a layout during synthesis with other visually recognizably recordable information) as the predefined information by way of example.

Furthermore, in case the image information obtained due to the image sensing by the image pickup section is required to be set in a relation corresponding to predefined information relating to this image information, if the processing section is designed to offer the capability of letting the predefined information correspond to the related image information then the information to be set in the relation corresponding to the image information will be set in the relation corresponding to the related image information by a process of sensing an image of a medium on which "information to be caused to correspond to the image information" is presently displayed.

Accordingly, in accordance with the first aspect of the invention, it is possible to obtain the intended image pickup device capable of permitting easy execution of desired processing without increasing complexities in arrangement otherwise occurring due to provision of multiple manual switches and/or operation buttons. Additionally, it is needless to say that the processing section may be modified in arrangement to offer a function of controlling image sensing by the image pickup section, a function of processing image information based on predefined information, and a function of letting the predefined information correspond to its relevant image information while permitting selection of the processing (function) to be executed in accordance with the kind or the like of such predefined information.

Additionally, although information as to the image pickup condition of the image pickup section for example may be applied as the predefined information in accordance with the invention, this information as to image pickup condition may be arranged to include image pickup condition information defining an image pickup condition. Parameters defining this image pickup condition typically include those specifying an electronic flash light emission mode, automatic exposure determination mode, automatic white balance adjustment on/off, and whether the loss or "collapse" of intermediate gray tones at highlight portions is allowable or not, wherein information defining at least one of the respective parameters is employable as the image pickup condition information.

In case the information as to image pickup condition is arranged to include the image pickup condition information defining the image pickup condition in the way stated above, it will be preferable that the processing section performs a control operation to ensure that image sensing by the image pickup section is carried out under an image pickup condition as defined by the image pickup condition information. With such an arrangement, using the image pickup condition information defining a desired image pickup condition as the image pickup condition information makes it possible to permit execution of image sensing by the image sensing by the image pickup section under such desired image pickup condition.

In view of the fact that a preferable image pickup condition might differ depending upon the kinds of optical images to be sensed by the image pickup section and/or illumination conditions relative to optical images, it will be preferable to further comprise a selector section for selecting information, wherein the storage section is arranged to offer an ability to store therein a plurality of kinds of image pickup condition information whereas the processing section controls to ensure that the image sensing by the image pickup section is done under an image pickup condition as defined by an image pickup condition as selected via the selector section from among the plurality of kinds of image pickup condition information being stored in the storage section. Additionally the selector section may be arranged to include more than one switch and/or button.

With such an arrangement, applying this invention makes it possible to let a plurality of kinds of image pickup condition information items be prestored in the storage section and then appropriately select one image pickup condition information item corresponding to an optimal image pickup condition in accordance with the kind of an optical image being sensed and/or illumination condition; thus it becomes possible to permit the image pickup section to perform image sensing under such proper image pickup condition in any events.

In the case of letting the plurality of image pickup condition information items be stored in the storage section in the way noted above, it is preferable that the information concerning the image pickup condition is designed to include title information indicative of a title of an image pickup condition as defined by the image pickup condition information and that the selector section is arranged to display based on the title information a title of a selectable image pickup condition at a display section (e.g. LCD or the like) of the image pickup device. Thus it is possible upon selection of image pickup condition information to readily judge the content of an image pickup condition corresponding to each image pickup condition information item by referring to image pickup condition titles as displayed at the display section, which in turn makes it possible to easily perform selection of a proper image pickup condition.

Although the information concerning processing of image information as obtained through image sensing of the image pickup section may be applied as the predefined information in accordance with the invention by way of example, this information concerning image information processing may be arranged to include processing condition information which defines the processing condition of the image processing with respect to image information. Parameters defining this image processing condition include, but not limited to, a chroma saturation enhancement degree, sharpness enhancement degree, processing condition of color conversion processing, processing condition of density conversion processing, and on/off of special image processing, wherein information defining at least one of the respective parameters is useable as the processing condition information.

In the event that the information as to image information processing is arranged to include the processing condition information defining the processing condition of image processing, it is preferable that the processing section performs image processing with respect to the image information under the processing condition as defined by the processing condition information. Whereby, using the processing condition information defining any desired processing condition as the processing condition information makes it possible to permit execution of image processing relative to the image information under such desired processing condition.

In view of the fact that a preferable processing condition of the image processing might also be different depending on the content of an image as represented by the image information, it will be preferable to further comprise a selector section for selecting information, wherein the storage section is arranged to offer an ability to store therein a plurality of kinds of processing condition information whereas the processing section performs image processing with respect to image information under a processing condition as defined by processing condition information as selected via the selector section from among the plurality of kinds of processing condition information being stored in the storage section.

With such an arrangement, applying this invention makes it possible to let a plurality of kinds of processing condition information items be prestored in the storage section and thereafter appropriately select a processing condition information item corresponding to an optimal processing condition in accordance with the content of an image represented by the image information; thus it becomes possible in any events to permit successful execution of the image processing with respect to the image information under such proper processing condition.

In the case of letting the plurality of processing condition information items be stored in the storage section in the way stated above, it is preferable that the information as to image information processing is designed to include title information indicative of a title of a processing condition as defined by the processing condition information, wherein the selector section is operable to display based on the title information a title of a selectable processing condition at the display section (e.g. LCD or the like) of the image pickup device. Whereby it is possible upon selection of processing condition information to easily judge the content of a processing condition corresponding to each processing condition information item by referring to processing condition titles being presently displayed at the display section, which in turn makes it possible to easily attain successful selection of a proper processing condition.

The information as to image information processing may also be arranged to include layout information for layout definition during synthesis of an image represented by the image information with other visually recognizably recordable information (e.g. character information or illustration information). In this case, it is preferable that the processing section synthesizes a part or entirety of an image represented by specific image information together with other information in a layout as defined by the layout information. Whereby, using layout information defining a desired layout as the layout information makes it possible to permit execution of synthesis of part or the entire area of the image represented by the specific image information and other information in such desired layout.

While the above stated one is directed to the case where the processing section performs processing of image information on the basis of the information as to image processing information, this may be replaced with another preferred form which performs image information processing by an image processing apparatus or the like that is designed as a device separated from the image pickup device (simply referred to as "external device" hereinafter). In such case, it is preferable that the information as to image information processing includes at least one of the processing condition information, the title information and the layout information, wherein the processing section causes at least one of the processing condition information and the title information plus the layout information to correspond to the image information. Note here that this corresponding setup may be done by, for example, addition of the information per se that is to be forced to correspond to the image information as attribute information or alternatively addition of information specifying the information being forced to correspond as the attribute information of the image information.

With such an arrangement, using as the information as to image information processing the processing condition information that defines a desired processing condition during image processing relative to image information for example makes it possible to allow the external device that has received image information from the image pickup device in accordance with the invention to recognize processing condition information being forced to correspond to the received image information due to establishment of a relationship for causing the processing condition information to correspond to the image information, which in turn enables the external device to perform the intended image processing with respect to the image information under the desired processing condition.

Also note that in case the content and title of processing condition are forced to correspond to each other on the external device by way of example, using for example title information corresponding to the desired processing condition as the information concerning image information processing makes it possible for the external device that has received image information from the image pickup device in accordance with the invention to recognize such title information as forced to correspond to the received image information due to establishment of a corresponding relation of the title condition information versus the image information and also recognize the processing condition corresponding to the title information thus recognized, which in turn enables the external device to perform any intended image processing with respect to the image information under the desired processing condition in a similar way to that stated above.

Furthermore, using as the information as to image information processing the layout information defining a desired layout during synthesis of part or the entire area of an image represented by the image information and other information for example makes it possible to allow the external device that has received image information from the image pickup device in accordance with the invention to recognize the layout information being forced to correspond to the received image information due to establishment of a corresponding relation of the layout information and the image information, which in turn enables the external device to perform any intended synthesis of part or the entire area of an image represented by the image information and other information in the desired layout.

In this way, as the information as to image information processing is forced to correspond to the image information, it is possible for the external device being expected to receive image information from the image pickup device in accordance with the invention to perform any desired processing with respect to the image information.

It should be noted that although information forced to correspond to image information as obtained due to image sensing by the image pickup section for example is also applicable as the predefined information in accordance with the invention, this information being caused to correspond to the image information may be designed to include at least one of classification information for classification of an image represented by the image information and character information indicating a sentence for explanation of a content of the image represented by the image information and also illustration information indicating an illustration to be added to the image represented by the image information, by way of example.

In case the information being forced to correspond to image information is arranged to include at least one of the classification information and the character information plus the illustration information, it is preferable that the processing section forces the information being caused to correspond to correspond to specific image information or synthesizes the information being caused to correspond together with specific image information. This makes it possible to permit desired given information (at least one of the classification information, character information and illustration information) to correspond to specific image information or to be synthesized therewith.

Optionally, taking into consideration the presence of a risk that the recognition section in accordance with the invention can fail to recognize the predefined information, it is preferable to provide a first notifying section for giving notice when predefined information is successfully recognized by the recognition section or alternatively upon failure of recognition of the predefined information. This may ensure that the user becomes aware of the recognition section's result of recognition of the predefined information.

A recognition rate of predefined information by the recognition section in the case of sensing and capturing an image of a medium that presently displays predefined coded information in a visually recognizable form can vary or deviate in value depending on actual image pickup conditions during image sensing by the image pickup section. In view of this, it is preferable that the image pickup section performs image sensing under a fixedly predetermined or "default" image pickup condition when capturing an optical image that contains therein a medium presently displaying predefined coded information in a visually recognizable form. The image pickup condition may be defined in such a way that the rate of recognition of predefined information being done by the recognition section is set at a maximal value or values in close proximity thereto. This makes it possible to improve the recognition rate of predefined information by the recognition section.

Although the user is expected to designate by himself or herself whether the medium presently displaying predefined coded information thereon in a visually recognizable form is to be sensed or not, there may be provided a second notifying section for judging whether a medium displaying predefined coded information in a visually recognizable form is contained in the optical image as sensed by the image pickup section and for giving notice when the medium is judged to be contained therein. With such an arrangement, since whether the medium displaying predefined coded information is contained in an optical image to be sensed is automatically judged, it becomes possible to lighten the user's burden or load as to his or her designation of image sensing of the medium presently displaying the predefined information thereon.

An image pickup device control method in accordance with a second aspect of the present invention is arranged to include the steps of using an image pickup device with an image pickup section for sensing an optical image and for converting it into image information to capture an image of a medium presently displaying thereon predefined information to be input to the image pickup device, permitting recognition of the predefined information based on the image information obtained due to the image sensing operation for letting a storage section store therein this predefined information to thereby input the predefined information to the image pickup device, and then letting execution of control of image sensing being done by the image pickup section based on the predefined information or processing of the image information based on the predefined information or alternatively causing the predefined information to correspond to its relevant image information; thus it is possible in a similar way to that of the first aspect of the invention to permit the image pickup device to easily perform any desired processing without increasing complexities in arrangement thereof.

An image pickup device control method in accordance with a third aspect of the present invention is arranged to include the steps of using an image pickup device with image pickup section for sensing an optical image and for converting it into image information to capture an image of a medium presently displaying thereon processing information that defines the processing content of such image information, permitting recognition of the processing information based on the image information obtained due to the image sensing operation to let this processing information be stored in a storage section to thereby input the processing information to the image pickup device, causing the processing information to correspond to specific image information, and sending forth the specific image information being caused to correspond to the processing information toward image processor apparatus to thereby allow the image processor apparatus to process the specific information with a processing content the processing information defines.

In the third aspect of the invention, the image information processing may include for example image processing relative to image information and/or synthesis with other information which is visually recognizably recordable, wherein the processing information may include at least one of processing condition information that defines a processing condition of image processing relative to image information, title information indicative of the title of the processing condition of the image processing, and layout information defining a layout upon synthesis of an image represented by specific image information together with other visibly recognizably recordable information.

In accordance with the third aspect of the invention, a medium presently displaying thereon processing information is image-sensed permitting recognition of the processing information based on image information obtained based on such image-sensing and then storage of the processing information in the storage section to thereby input the processing information to the image pickup device. In addition, letting the processing information correspond to specific image information and then sending forth the specific information to which the processing information is forced to correspond toward an image processing apparatus (for example, any one of information processing equipment with functions as the image processing apparatus (e.g. personal computers or the like), image recording devices with functions as the image processing apparatus, and image processing systems (e.g. photo processing labs) with a group of image processing devices and/or image recorder devices provided therein) allows the image processing apparatus to process the specific image information with the processing content as defined by the processing information.

Whereby, upon requesting of processing of specific image information, using the image pickup device to sense or pick up an image of the medium presently displaying specific information defining a desired processing content and then letting the specific processing information be stored in the storage section makes it possible to input the specific processing information to the image pickup device while forcing the specific processing information to correspond to the specific image information and then sending forth the specific image information being forced to correspond to the specific processing information toward the image processing apparatus may permit the specific image information to be processed by the image processing apparatus with any desired processing content as defined by the specific processing information; thus, it is no longer be required to perform complicated works such as designation of desired processing content or the like, thereby making it possible to readily perform requesting of the image information processing with the desired processing content.

To attain the foregoing objects an image pickup device in accordance with a fourth aspect of the instant invention is arranged to include an image pickup section for sensing an optical image and for converting it to image information, a recognition section for, when an optical image containing therein a medium presently displaying layout information for definition of a layout employable during image synthesis is captured by the image pickup section, recognizing the layout information based on the image information as obtained by the image sensing, a storage section for storing therein the layout information as recognized by the recognition section, and generator section for generating, upon designation of more than one image to be synthesized in accordance with the layout as defined by the layout information or upon inputting of image information of the image to be synthesized, composite image information indicative of a composite image with the image to be synthesized being synthesized in accordance with the layout or alternatively for generating instruction information for creation of the composite image information.

The image pickup device in accordance with the fourth aspect of the invention comprises the image sensing or a pickup section for converting a sensed optical image into image information. Examples of this image pickup device include but not limited to digital still cameras, digital video cameras, mobile information terminals with built-in image sensor unit, and portable wireless telephone handsets with built-in image sensor unit. Additionally the image pickup device in accordance with the fourth aspect of the invention is arranged to comprise the recognition section for, when an optical image is sensed or "photographed" which includes the medium presently displaying layout information defining a layout in image synthesis events, recognizing the layout information based on image information obtained due to such image sensing operation, wherein the layout information as recognized by the recognition section is stored in the storage section.

Whereby, visually displaying at the medium the layout information to be input to the image pickup device and then image-sensing this medium by the image pickup device permits the layout information to be recognized by the recognition section and then stored in the storage section to be later input to the image pickup device. In this way, utilizing the image sensor unit of the image pickup device to input the layout information makes it unnecessary to provide multiple switches and/or operation buttons for inputting the layout information to thereby enable avoidance of increased complexity of the arrangement of such image pickup device while at the same time avoiding the user's need to prepare high-price information storage media such as memory cards or the like.

Note that the layout information is preferably displayed at the medium in a visibly recognizably coded form. While a two-dimensional (2D) bar code is employable as this form, it maybe replaced with other forms such as a one-dimensional (1D) bar code. Letting the layout information be displayed at the medium in such visibly recognizably coded form makes it possible to display the layout information with high densities (in particular, the use of 2D bar code is preferable because it offers an ability to display the layout information with extra high densities) while simultaneously enabling avoidance of reduction of recognition rates of the layout information even in the case of an increased amount of information.

Additionally the layout information in accordance with this invention should not be limited only to the arrangement that causes it to be displayed in visibly recognizably coded forms and may alternatively be displayed at the medium as graphic figures or drawings or equivalents thereto. The medium may be any display media fixedly displaying specific information (e.g. sheet-like recording materials, sign boards or the like) or alternatively may be display media offering capabilities of freely modifying information to be displayed thereon.

And the generator section in accordance with the fourth aspect of the invention is such that upon designation of an image to be synthesized or upon inputting of image information of the to-be-synthesized image in accordance with the layout as defined by the layout information, it generates synthetic or "composite" image information which represents a composite image with the to-be-synthesized image being actually synthesized in accordance with the layout or alternatively generates instruction information for generation of the composite image information. This instruction information is useable during preparation of a composite image(s) at a photo processing lab for example; accordingly, the use of this instruction information makes it possible to easily prepare the composite image with more than one image being synthesized in the layout as defined by the layout information.

With such an arrangement, in case image synthesis is to be done with a desired layout, image-sensing the medium on which layout information defining such desired layout is visually displayed results in generation of composite image information representing a composite image with images being synthesized together in a desired layout in accordance with the layout as defined by the layout information or alternatively generation of instruction information for generating the composite image information representing the composite image. Accordingly, in accordance with the first aspect of the invention, it is possible to easily realize image synthesis with any desired layout.

It must be noted here that in view of the fact that there are available a plurality of kinds of layouts that the user will possibly desire to use for image synthesis, it will be preferable to provide a first selector section for selecting layout information to be used during image synthesis in a state that a plurality of kinds of layout information for definition of mutually different layout patterns are stored in the storage section.

With such an arrangement, while prestoring a plurality of kinds of layout information items in the storage section through a process of image-sensing in advance or "prephotographing" media presently displaying mutually different layout information items respectively or alternatively prephotographing a single medium displaying respective ones of such different layout information items, it becomes possible to select a layout information item defining a desired layout from among them when letting execution of generation of either one of the composite image information and the instruction information. Accordingly it is possible to more easily perform image synthesis in any desired layout as compared to other forms which are arranged to sense and capture an image of a medium presently displaying the layout information defining a desired layout in every event for letting execution of generation of the composite image information or the instruction information.

Note here that in case the storage section is arranged to store therein a plurality of kinds of layout information items in the way stated above, it is preferable that the layout information in accordance with the invention be added title information indicative of the title of a layout as defined by the layout information while designing the first selector section to visually display based on the title information the title of more than one selectable layout at the display section (e.g. LCD or the like) of the image pickup device. Whereby it is possible to easily judge the content of a layout as defined by each layout information by referring to the title of layout being displayed at the display section upon selection of layout information, which in turn makes it possible to readily perform selection of any desired layout.

Also note that image synthesis is carried out through execution of synthesis in such a way that with respect to information representing a base paper sheet with at least one of a character string and an illustration and also an image for example being prerecorded thereon, a single image is buried at a predefined position (synthesis region) on the base sheet; however, in case a plurality of synthesis regions capable of synthesizing images together are provided on a layout as defined by the layout information, it is preferable that a second selector section be provided for selecting a synthesis region being subjected to processing from among the plurality of synthesis regions that are provided on the layout as defined by the layout information.

In case such plurality of image-synthesizable synthesis regions are provided on the layout as defined by the layout information, designation of an image(s) to be synthesized or inputting of image information of the to-be-synthesized image(s) will be done in units of individual synthesis regions. Note here that although the order of sequence of processing tasks relative to respective synthesis regions are determined fixedly as a default setting, provision of the above-noted second selector section makes it possible to perform designation of the to-be-synthesized image(s) or alternatively inputting of image information of such to-be-synthesized image(s) in the order of sequence as desired by the user, which in turn enables improvement in manual operability during permitting execution of generation of the composite image information or instruction information.

Additionally in the case of providing the second selector section, it is preferable that the layout as defined by the layout information be displayed at the display section of the image pickup device in such a way as to enable visual recognition of a layout of the plurality of synthesis regions being provided on the layout. With such an arrangement, it is possible for the user to easily visually recognize the layout of a plurality of synthesis regions on the layout by viewing the display section of the image pickup device, which in turn makes it possible for the user to readily perform selection of a synthesis region(s) to be processed.

Also note that while an image(s) is/are determinable by designation of the to-be-synthesized image(s) or alternatively inputting of image information of such to-be-synthesized image(s), it will be possible that the process of inputting the to-be-synthesized image(s) is done by letting an optical image be sensed and captured by the image pickup section after completion of instruction of image synthesis, thereby permitting input of the image information as obtained through the image sensing. In this case, if the image pickup device in accordance with the invention is used to sense and capture an optical image to be synthesized after completion of the user's instruction for image synthesis then the image information obtained by the image sensing operation will be used for generation of either the composite image information or the instruction information.

Alternatively designation of the to-be-synthesized image is also achievable for example by a process having the steps of providing a first designation section for designation from among a plurality of images whose image information items are presently stored in the storage section due to image sensing of an optical image by the image pickup section and then performing designation via the first designation section. In this case the image information of an image as designated from among those of the plurality of images being stored in the storage section is taken out of the storage section and used for generation of the composite image information or the instruction information.

Additionally the first designation section is preferably arranged to display more than one designatable image as the to-be-synthesized image at the display section of the image pickup device. With such an arrangement, viewing the display section of the image pickup device makes it possible for the user to easily recognize the designatable image as the to-be-synthesized image.

In accordance with the fourth aspect of the invention, it may also be characterized by further comprising second designation section for designating as an image being synthesized a partial region of a specific image whose image information is stored in the storage section, wherein the generator section is operable to generate based on a position and shape plus significance of a region as designated via the second designation section any one of the composite image information and the instruction information to ensure that only the region is synthesized as the composite image.

In cases where the user wants to partially synthesize an image, simply designate his or her preferred region to be synthesized via the second designation section, resulting in generation of the composite image information or the instruction information in such a way that only the designated region will be synthesized. This in turn makes it possible to readily realize synthesis of only a partial image region.

An image pickup device control method in accordance with a fifth aspect of the present invention includes the steps of using an image pickup device with image pickup section for sensing an optical image and for converting it into image information to capture an image of a medium presently displaying layout information defining a layout for use during image synthesis, permitting recognition of the layout information based on the image information obtained due to the image capture and then letting this layout information be stored in a storage section to thereby input the layout information to the image pickup device, and letting execution of designation of more than one image to be synthesized in accordance with the layout as defined by the layout information or inputting of image information of the to-be-synthesized image to thereby permit generation of composite image information indicative of a composite image with the to-be-synthesized images being synthesized in accordance with the layout or alternatively generation of instruction information for creation of the composite image information; thus it is possible to easily realize image synthesis in any desired layout in a similar way to that of the fourth aspect of the invention.

To attain the foregoing objects an image pickup device in accordance with a sixth aspect of this invention is arranged to include image pickup section for sensing an optical image and for converting it to image information, recognition section for recognizing, when an optical image containing therein a medium presently displaying thereon predefined information in a first visually recognizable format is captured by the image pickup section, the predefined information based on the image information obtained due to the image sensing, storage section for storing therein the predefined information as recognized by the recognition section, and adder section for adding the predefined information to the image information as information to be recorded on an identical recording material in a second format different from the first format upon recording of an image represented by the image information onto the recording material.

The image pickup device in accordance with the sixth aspect of the instant invention comprises the image pickup section for sensing and capturing an optical image and then converting it into image information. Preferred examples of this image pickup device are a digital still camera, digital video camera, mobile information terminal with image sensor unit, and handheld radiotelephone handset with image sensor unit. The image pickup device of the sixth aspect of the invention also comprises the recognition section for recognizing, when an optical image containing therein a medium presently displaying thereon predefined information in the first visually recognizable format is sensed, the predefined information based on the image information obtained due to the image sensing, wherein the predefined information as recognized by the recognition section will be stored in the storage section.

Note here that the first format in accordance with this invention may be a format permitting achievement of visibly recognizably display of any given information; for example, given formats such as "hand-writing" or the like may be used. It should be noted however that if the predefined information is codable information (information capable of rewriting into coded information that represents the to-be-processed information by an ensemble of codes as defined by a chosen code system) then it is preferable to use as the first format an easily recognizable format by the recognition section; for example, a bar code may be used. In case such bar code is used as the first format, it is possible to display predefined information on the medium with high densities (in particular, the use of 2D bar code is preferable since it offers an ability to display the predefined information with high densities) while at the same time enabling avoidance of reduction of recognition rates of the predefined information even in the event of an increased amount of information.

And the adder section in accordance with the sixth aspect of the invention is operable upon recording of an image represented by image information on a recording material to add predefined information being presently stored in the storage section to the image information as the information to be recorded at the same recording material in a second format different from the first format. Additionally any given format the user desires for example is employable as the second format. By adding the predefined information to the image information as the information being recorded at the same recording material in the second format, in one preferred form that is designed to input image information to image recording apparatus installed in a photo processing lab by way of example and then let the image recording apparatus record an image represented by the image information on the recording material, the predefined information will be input to the image recording apparatus along with the image information and then recorded on the same recording material in the second format upon recording of the image represented by the image information onto the recording material by the image recording apparatus.

With such an arrangement, in cases where the user desires to add to the recording material either a string of characters or an illustration as displayed on a medium such as for example a sheet of paper in a "hand-write" format or equivalents thereof, if the medium is image-sensed by the image pickup device in accordance with the sixth aspect of the invention then the character string or illustration will be recognized and added to the image information as the information being recorded in the second format (e.g. character image or illustration image) after having stored in the storage section as character information or illustration information, resulting in the character information or illustration information being recorded in the second format onto the recording material on which an image as represented by this image information has been recorded.

Alternatively in case the user desires to add predefined sound/voice or "audio" information to the recording material by way of example, if a medium with such predefined audio information being recorded therein in a format such as bar codes is image-sensed by the image pickup device in accordance with the sixth aspect of the invention then the predefined audio information will be added to the image information as the information being recorded in the second format (e.g. easily sound/voice reproducible format by use of a chosen optical reader or the like) after having recognized and stored in the storage section, resulting in the predefined audio information being recorded in the second format to the recording material with an image as represented by this image information having been recorded.

In this way, in accordance with the sixth aspect of the invention, it is possible to realize co-recording of any desired information upon recording of an image on the recording material by utilization of the image sensor unit of the image pickup device for causing the image pickup device to sense and capture an image of the medium with desired information being displayed thereon in the first format; thus it is possible to easily realize co-recording of any given information upon recording of an image(s) on the recording material.

It should be noted that although the predefined information in accordance with the invention may be a single kind of information, it is preferable in cases where a plurality of kinds of information is present as the predefined information or alternatively in cases where the kind of such predefined information remains undeterminable that identification information indicative of the predefined information be added to the predefined information thereby enabling recognition of the predefined information based on the identification information. Adding the identification information is realizable by displaying the information with the identification information being added to the predefined information as a bar code in the event that the predefined information is displayed on the medium in a chosen format such as the bar code for example. This makes it possible for the recognition section to successfully recognize the kind of the predefined information with increased reliability.

In case a plurality of kinds of information items are present as the predefined information or alternatively in case the predefined information remains undeterminable in kind, the format (i.e. second format) per se which is used upon recording of the predefined information to the recording material will become undeterminable: if this is the case, it is preferable to determine the second format in accordance with the kind of the second information thus recognized and then add information designating the second format to the image information along with the predefined information. Whereby it is possible to record the predefined information on the recording material in an adequate format pursuant to the kind of the predefined information.

Alternatively in case the predefined information is audio information for example, an audio information display format that displays the audio information in a way capable of easily reproducing sound/voice as represented by the audio information for example may be used as the second format. Additionally in case the predefined information is character information, an image display format displaying as an image a string of characters as represented by the character information is employable as the second format. Furthermore if the predefined information is illustration information then an image display format displaying as an image an illustration represented by the illustration information is usable as the second format. In addition if the predefined information is either a character string or an illustration as displayed in the "hand-write" format then an image display format displaying as an image the character string or illustration may be used as the second format, by way of example.

Alternatively it may also be arranged so that a designation section is provided for designating the second format to thereby allow a user to designate the second format via this designation section. In this case, letting the user designate the second format via the designation section makes it possible to record predefined information on a recording material in any available format the user desires.

An image processing method in accordance with a seventh aspect of the invention is designed to comprise the steps of using an image pickup device with image pickup section for sensing an optical image and for converting it to image information to capture an image of a medium presently displaying in a first visually recognizable format predefined information to be recorded on an identical recording material to an image as represented by image information, permitting recognition of the predefined information based on the image information obtained due to the image sensing and then letting this predefined information be stored in a storage section to thereby input the predefined information to the image pickup device, letting the predefined information be added to the image information as information to be recorded on the identical recording material in a second format different from the second format upon recording of the image represented by the image information onto the recording material, and, upon recording of the image represented by the image information with the predefined information being added thereto onto the recording material, letting the predefined information be recorded on the identical recording material in the second format; accordingly, as in the sixth aspect of the invention, it is possible to easily achieve the intended co-recording of any given information upon recording of an image(s) on the recording material.

BRIEF DESCRIPTION OF THE DRAWINGS

FIGS. 3A and 3B are flow charts showing contents of a main routine of the processing to be executed in the digital still camera in accordance with a first embodiment of the invention.

FIG. 4 is a flow chart showing contents of information input processing.

FIGS. 5A–5E are flowcharts showing contents of interruption processing in accordance with the first embodiment.

FIG. 8A is a diagram showing an on-screen display image which visually indicates a list of titles of image pickup or "photographing" conditions.

FIG. 8B is a diagram showing an on-screen display image presenting the content of a specific image pickup condition.

FIG. 8C is a diagram showing an on-screen display image for visual presentation of a list of titles of processing conditions of image processing.

FIG. 8D is a diagram showing an on-screen display image for visual presentation of the content of a specific processing condition.

FIGS. 9A and 9B are flow charts showing contents of a main routine of the processing to be executed by a digital still camera in accordance with a second embodiment of the invention.

FIGS. 10A and 10B are flowcharts showing the content of interruption processing in accordance with the second embodiment.

FIG. 13 is a flowchart showing the content of interrupt processing in accordance with a third embodiment.

FIGS. 14A and 14B are diagrams each showing an exemplary format for use during addition of information to a photo print.

DESCRIPTION OF THE PREFERRED EMBODIMENTS

Figure 1A:
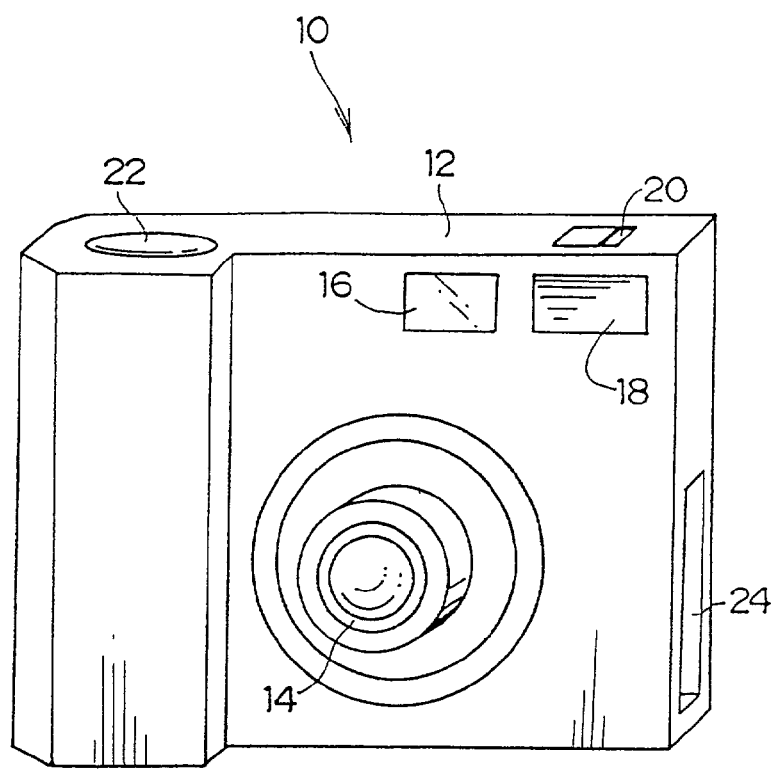
FIG. 1A is a diagram showing a perspective view of a digital still camera in accordance with one preferred embodiment of the present invention when looking at from the front side thereof.
Figure 1B:
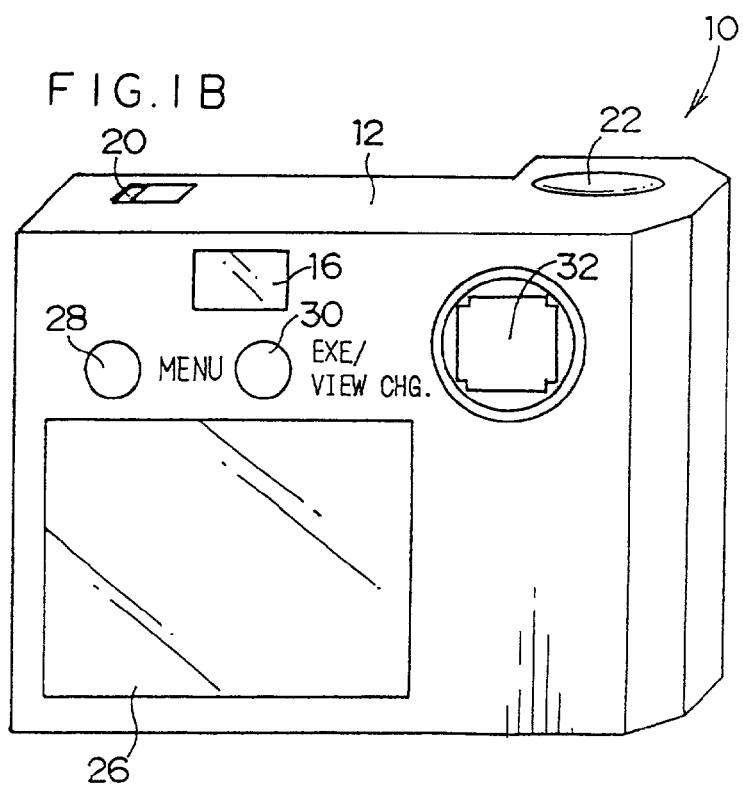
FIG. 1B is a diagram showing a perspective view of the digital still camera in accordance with the embodiment of this invention when looking at from its back side.

A first embodiment of the present invention will be explained in detail with reference to the accompanying drawings below. Referring to FIGS. 1A and 1B, there is shown a digital still camera 10 to which an image pickup device control method and an image processing method in accordance with this invention are applicable. This digital still camera 10 corresponds to the image pickup device in accordance with the invention.

As shown in FIGS. 1A and 1B, the digital still camera 10 has its main body 12 of substantially rectangular box-like shape, which is formed to have a shape with a projection (hand grip section) for facilitation of hand holding of the camera body 12 being formed on its left side when looking at from a front side thereof. As shown in FIG. 1A, a lens unit 14 is attached to a central portion on the front side of the body 12. Also attached to the body 12 are an optical viewfinder 16 for permitting a camera operator or user to visually recognize the zone of a scene to be photographed or the like and a built-in electronic flash unit 18 for emission of auxiliary light during photography at lower illumination intensities, wherein the viewfinder 16 and flash 18 overlie the lens 14.

Additionally as shown in FIG. 1B, the camera body 12 has its back surface to which a flat-panel color display module 26 (this may be replaced with a monochrome display) is attached to lower side thereof, wherein the display 26 is comprised of a reflection-type display device or transmission-type display device (e.g. liquid crystal display or "LCD") along with a menu switch 28 and an execution/view changeover switch 30 plus a manual operation switch 32 being attached to upper side of the display 26.

Figure 2:
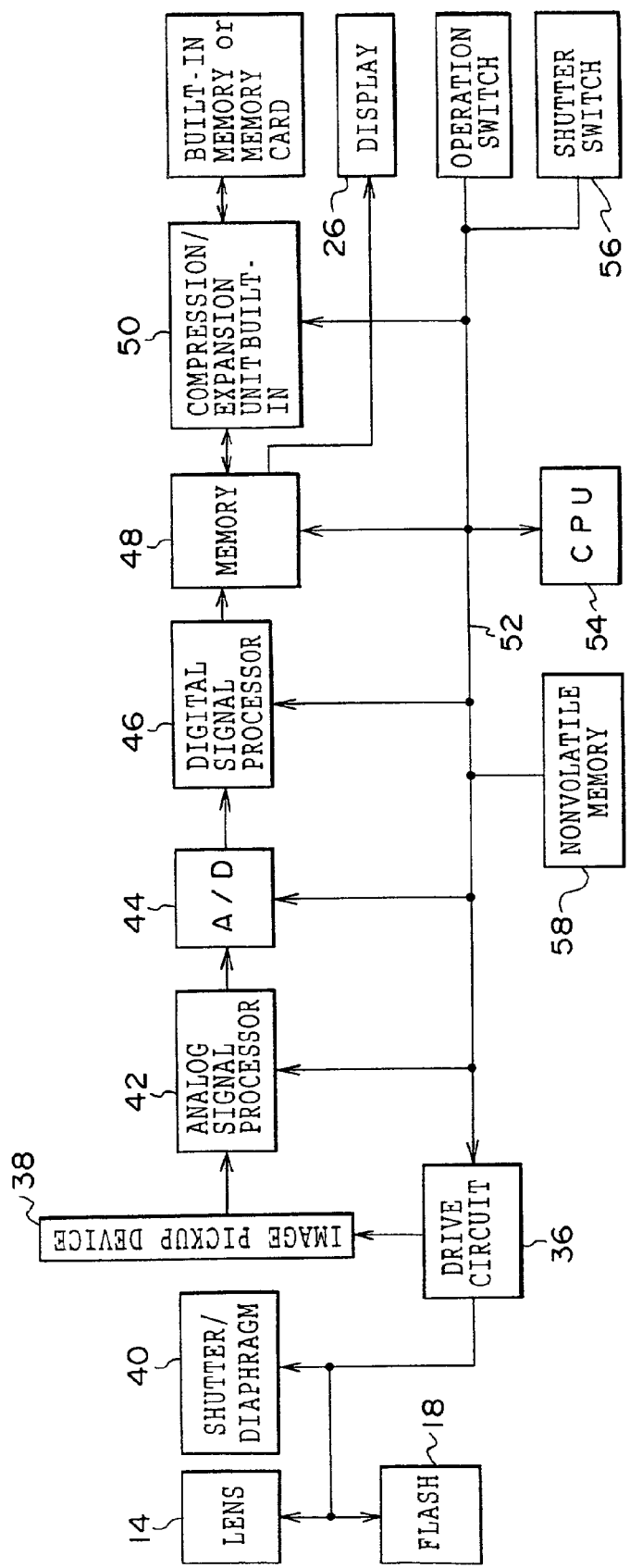
FIG. 2 is a block diagram schematically showing a configuration of an electrical system of the digital still camera shown in FIGS. 1A and 1B.

Turning to FIG. 2, there is shown an electrical system of the digital still camera 10. More specifically the lens 14 is a zoom lens (focal length alterable lens) with an autofocusing (AF) mechanism, wherein the lens 14's AF mechanism and zooming mechanism are driven by a drive circuit 36. Note that the lens 14 should not be limited to the zoom lens and may be replaced with a focal length fixed lens with only the AF mechanism provided therein.

An image sensing or "pickup" device 38 constituted from an area charge-coupled device (CCD) sensor is disposed at a position equivalent to the local point of the lens 14 within the camera body 12, permitting rays of incident light as reflected off from a target object being photographed to reach the lens 14 to be collected together and focused onto the light sensitive surface of the image pickup device 38.

This image pickup device 38 is electrically driven at the timing as synchronized with a timing signal which is generated by a timing generator circuit (not shown) that is built into the driver circuit 36, for outputting an image signal (i.e. a signal indicative of the amount of received light at a respective one of multiple photoelectric conversion cells that are lait out and organized into a matrix array on the light receiving surface).

A shutter/diaphragm unit 40 is disposed between the lens 14 and image pickup device 38. This shutter/diaphragm unit is driven by the driver circuit 36. The shutter is for preclusion of creation of unwanted smear otherwise occurring due to incidence of light rays onto the light sensitive surface of the image pickup device 38 when outputting of an image signal from the image pickup device 38, and may be eliminated depending upon the arrangement of the image pickup device 38. The diaphragm may be a single diaphragm capable of continuously varying its aperture value or, alternatively, may be comprised of a plurality of diaphragms with different apertures for selective use on a case-by-case basis. Also connected to the driver circuit 36 is the electronic flash 18. Flash 18 is rendered operative by driver circuit 36 to produce a burst of illumination light upon detecting of low illuminance intensities or upon issuance of the user's instruction to emit light.

The image pickup device 38 has its signal output terminal which is connected to an analog signal processing unit 42, analog-to-digital (A/D) converter 44, digital signal processor unit 46 and memory 48 in this order of sequence. The analog signal processor 42 is operable to amplify an image signal as output from the image pickup device 38 and also apply correction processing such as white balancing or the like to the image signal thus amplified. The image signal as output from the analog signal processor 42 is then converted by the A/D converter 44 into digital image data for input to the digital signal processor 46. Digital signal processor 46 applies to the input image data a variety of kinds of processings including but not limited to color correction, gamma correction, and Y/C conversion. Image data as output from the digital signal processor 46 is temporarily stored in the memory 48, which is formed of a random access memory (RAM) or the like.

Note that the image data being stored in the memory 48 corresponds to the image information in accordance with the present invention whereas the lens 14 and image pickup device 38 along with analog signal processor 42 and A/D converter 44 plus digital signal processor 46 correspond to the image pickup section in accordance with the present invention as claimed.

The drive circuit 36, analog signal processor 42, A/D converter 44, digital signal processor 46, memory 48 and a compression/expansion processing unit 50 (to be later described) are connected to a data bus 52. Also connected to this bus 52 are a central processor unit (CPU) 54, a data-rewritable nonvolatile memory (e.g. electrically erasable programmable read-only memory (EEPROM) or RAM as connected to a buckup power supply) 58, manual switches (indicated as "operation switch" in FIG. 2) including a power switch 20, menu switch 28, execution/view changeover switch 30, operation switch 32 and the like, and a shutter switch 56 which is caused to turn on and off in response to manual operation of a shutter button 22, also known as release button. Although not specifically depicted in the drawing, the CPU 54 is configured including peripheral circuits such as a ROM, RAM, input/output (I/O) ports and others. The nonvolatile memory 58 corresponds to the storage section of the claimed invention.

The display module 26 and compression/expansion processing unit 50 are each connected to the memory 48. In cases where an image is visually displayed on the display 26, the CPU 54 transfers the image data being temporarily stored in memory 48 toward display 26. Whereby an image represented by the image data being temporarily stored in memory 48 is displayed on display 26. Additionally in case an instruction is issued to store the image data into a memory card being loaded into a card slot 24 when the shutter switch 56 is activated upon manual operation of shutter switch 56, CPU 54 reads the image data being temporarily stored in memory 48 and then sends forth it to the compression/expansion processor 50. Thus the image data will be stored in the memory card after having compressed by compression/expansion processor 50. In some cases the image data may be directly stored in the memory card without experiencing such data compression depending upon a photography mode or the like.

Upon issuance of an instruction to reproduce or "play back" (display) the image represented by the image data being stored in the memory card as loaded into the slot 24, the image data is read out of the memory card: if the image data thus read is stored therein with compression applied thereto, then the compressed image data will be decompressed or expanded (called "defrosted" among those skilled in the art) by the compression/expansion processor 50 and thereafter temporarily stored in memory 48. And the image data being temporarily stored in memory 48 is used to perform displaying (playback) of the image on display 26.

A system processing routine to be executed by the CPU 54 as an operation of the illustrative embodiment during power-up of the digital still camera 10 will next be explained with reference to flow charts of FIGS. 3A and 3B. The system routine starts with step 100, which judges which mode is presently selected as a processing mode and diverts the routine in a way pursuant to the present processing mode. The digital still camera 10 in accordance with the illustrative embodiment is provided with several processing modes which follows: a photographing mode as will be selected when photographing or "shooting" objects or scenes, image playback mode to be selected when visually displaying a resultant photographic image on the display 26, and information input mode as selected when inputting information to the digital still camera 10.

Upon selection of the photography mode as the processing mode, the system routine goes to step 104 which accommodates an image pickup condition that is presently set as the image pickup condition for use during shooting of a target object or scene. This image pickup condition is configured including several types of parameters such as for example electronic flash burst (On, Off, or Auto), autoexposure or "AE" mode (Aperture-Priority, Shutter Speed-Priority), highlight image-sensing condition (Saturated, Non-Saturated), and automatic white balance (On/Off). Note that each parameter comes with a bracketed notation which indicates selectable items or "candidates" thereof.

At step 106, make the image pickup device 38 operative causing it to perform an image sensing operation and then analyze, based on the image data obtained due to this image sensing and then stored in the memory 48 via the analog signal processor 42 and A/D converter 44 plus digital signal processor 46, whether or not an optical image as sensed by the image pickup device 38 contains therein an object equivalent to a bar code. Then the routine goes to step 108 which judges based on the analysis result at step 106 whether the optical image sensed contains therein the object corresponding to the bar code.

Inputting of information to the digital still camera 10 in the information input mode in accordance with this embodiment is done by photographing of a medium with a two-dimensional (2D) bar code indicative of the information, depending on the kind of such information to be input. Accordingly, when the sensed optical image contains such object corresponding to the bar code, this suggest that there is a possibility for the user to erroneously select the processing mode: thus, if said judgment is denied ("NO") then the system routine proceeds to step 112; if said judgment is affirmative ("YES") then go to step 110 which judges whether the mode is shifted to the information input mode by checking the user's intention for appropriateness through visual displaying of a prompt message on the display 26, which message confirms the user whether his or her presently selected mode is shifted to the information input mode by way of example.

In case such mode transition to the information input mode is not instructed by the user, the judgment of step 110 is "NO," causing the system routine to go to step 112 which judges whether the shutter switch 56 is turned on by manual operation of the release button 22. If NO at step 112 then the routine returns to step 104 for repeated execution of the steps 104 to 112. Alternatively when transition to the information input mode is instructed, that is, if "YES" at step 110 then the routine goes next to step 102 which performs information input processing (to be set forth later in the description).

With such a processing flow, it is possible to avoid risks of the failure of inputting information to the digital still camera 10 otherwise occurring due to erroneous selection of the photography mode as the processing mode in spite of the fact that the user has performed an operation for inputting information to digital still camera 10. In this way, the steps 106–110 correspond to the second notify section of the present invention as claimed.

Optionally, in view of the possibility that an increased length of time is taken for analysis and judgment for determining whether the object corresponding to the bar code is contained in the optical image sensed, the system routine may alternatively be designed so that it permits the user to pre-select whether this analysis/judgment process is done and that if the user fails to select the execution of analysis/judgment then ignore the presently established setting even when the object corresponding to the bar code is contained in the optical image sensed.

When the shutter switch 56 is turned on upon manual operation of the release button 22, that is, if YES at step 112 then the system routine proceeds to step 114 which acquires or "imports" the image data being stored in the memory 48 due to image sensing by the image pickup device 38 and then automatically performs AE processing for determination of an appropriate exposure based on the image data. At step 116 next thereto, determine based on the AE processing result a recommendable shutter speed (electrical charge accumulation or "integration" time period) and an aperture value at the camera diaphragm while also taking account of the image pickup condition as taken at step 104; then, control an activation timing of an electronic shutter mechanism of the image pickup device 38 while at the same time driving the diaphragm.

Note here that acquirement of the image pickup condition at step 104 is repeatedly carried out while the judgment of step 112 is being denied ("NO") as discussed above; accordingly, in case the image pickup condition is modified by interruption processing to be later discussed during a time interval from photography mode selection after poweron of the digital still camera 10 to actual turn-on of the shutter switch 56, picture image photographing will be done in accordance with such modified or "updated" image pickup condition.

At next step 118, perform AF processing for searching for a focused position (lens position in focus state). And at step 120, drive based on the lens position at a focused position as detected at step 118 a stepper motor in the AF mechanism of lens 14 in such a way that a viewed image of the object of interest is precisely focused (in the focus state), thereby permitting the image pickup device 38 to sense and capture the object (optical image) in the focus state. Additionally if the image pickup condition as taken at step 104 is such that the "Flash" is selected to "Emit Light" or alternatively if "Flash" is selected at "Auto" while flash light emission is judged to be necessary at the AE processing (step 114), then the electronic flash unit 18 is also rendered operative or "fired" at the same time that an image sensing operation is done.

Image data obtained due to the photographic image sensing will be temporarily stored in the memory 48 and then stored in the memory card at next step 122. After completion of the processing of step 122, the system routine returns at step 100 for rejudgment of the presently selected processing mode.

An explanation will next be given of the processing in the information input mode. The user is expected to select this information input mode as the processing mode in order to input information to the digital still camera 10. If this is the case, the system routine goes from step 100 to step 102 for execution of the information input processing required. This information input processing will be explained in detail with reference to a flowchart of FIG. 4. Note that the information input processing corresponds to the recognition section of the claimed invention.

At step 150, make the image pickup device 38 operative causing it to perform an image sensing operation and then analyze, based on image data as obtained by such image sensing and stored in the memory 48, whether an object equivalent to a bar code is contained in an optical image as sensed and captured by the image pickup device 38. And at step 152, an attempt is made to judge based on an analysis result of step 150 whether the object equivalent to the bar code is contained in the resultant optical image sensed.

Incidentally, in cases where desired information is input to the digital still camera 10, the user is expected to take a picture image of a medium with desired information being recorded (displayed) thereon by use of the digital still camera 10 to which information is to be input. In the illustrative embodiment, information capable of being input to the digital still camera 10 is generally subdivided into three major ones which follow: information concerning image pickup condition, information as to processing of image data, and information to be forced to correspond in relation (or to be added) to image data.

In this embodiment under discussion, the information concerning image pickup condition includes a plurality of kinds of information items that are prepared in a way corresponding to a plurality of possible image pickup conditions while letting information corresponding to a single image pickup condition of the digital still camera 10 be used as a unit. The information corresponding to a single image pickup condition consists essentially of image pickup condition information that defines a corresponding image pickup condition (more specifically, defining respective parameters making up the image pickup condition) and title information that indicates the title of such image pickup condition as defined by the image pickup condition information. One example of the information concerning the image pickup condition is shown in Table 1 presented below (information corresponding to a single image pickup condition is shown so that it is surrounded by thick lines).

TABLE 1

<Example of Information on Image Pickup Condition>

|  |  | 1 Portrait | 2 Sunshine | 3 Scene | 4 Backlit | 5 Night View |
|---|---|---|---|---|---|---|
|  | Title Info |  |  |  |  |  |
| Information on Image Pickup Condition | Flash | On | Auto | Auto | On | Auto |
|  | AE mode | Aperture Priority | Shutter Priority | Aperture | Shutter Priority | Shutter Priority |
|  | High-Lights Shooting Condition | Not Saturated | Saturated | Not Saturated | Saturated | Saturated |
|  | Auto-White Balance | On | On | On | On | Off |
|  | . | . | . | . | . | . |
|  | . | . | . | . | . | . |
|  | . | . | . | . | . | . |

The information concerning image pickup condition is digitally coded and then recorded on a sheet-like material such as a paper sheet as a visually recognizable 2D bar code pattern (this may be a stack scheme or alternatively a matrix scheme). Recording the information concerning image pickup condition on the sheet material as the 2D bar code is done for example by a manufacturer or the like of the digital still camera 10, wherein the information concerning image pickup condition is recorded as a 2D bar code on the sheet material in the state that information corresponding to a single image pickup condition is handled as a unit or alternatively information items corresponding to a plurality of kinds of image pickup conditions are gathered together, which sheet material will be supplied to camera users. Supplement of this sheet material may be done via postal delivery to registered users or by public indication in books such as magazines, by way of example.

Figure 6A:
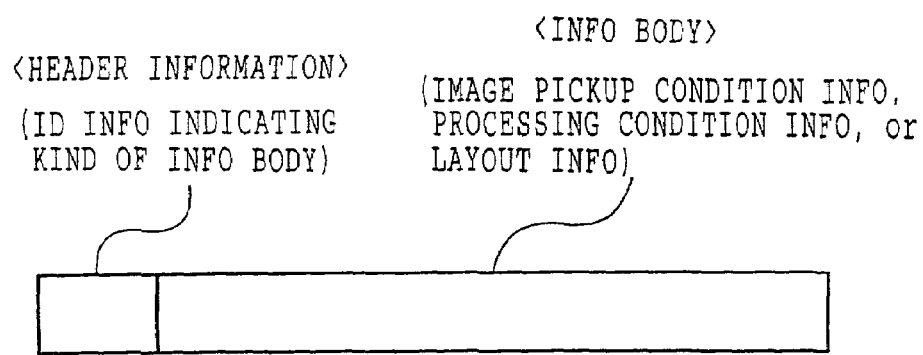
FIG. 6A is a diagram showing a pictorial representation of a structure of coded information to be recorded as a bar code.
Figure 6B:
FIG. 6B is a diagram depicting one example of an image of a two-dimensional (2D) bar code.

Additionally the information (coded information) to be recorded as a 2D bar code is such that information body (in this case, information as to image pickup condition) is added header information (identification information) indicative of a kind of the information body as shown as example in FIG. 6A and is thereafter recorded on a sheet material as a 2D bar code as exemplarily shown in FIG. 6B. This header information is for use upon detection of the kind of information body as contained in the coded information that has been obtained from the 2D bar code. In case said information concerning image pickup condition is input to the digital still camera 10, the user is expected to use digital still camera 10 to take a picture image of specific part of the sheet material with the 2D bar code indicative of the information concerning image pickup condition being recorded thereon, which part records said 2D bar code. Whereby the image pickup condition information will be input to digital still camera 10.

Additionally in this embodiment, the information as to image data processing may be subdivided into information concerning the processing condition of image processing and layout information. The information as to image data processing is such that a plurality of kinds of information items are provided in a way corresponding to a plurality of kinds of processing conditions with an information item corresponding to a single processing condition being as a unit. The information corresponding to a single processing condition is made up from processing condition information that defines a corresponding processing condition (more specifically, defining respective parameters making up the processing condition) and title information indicative of the title of a processing condition as defined by the processing condition information.

Parameters constituting a processing condition includes for example "Color (Chroma) Saturation," "Sharpness," "Red-Eye Reduction," "Setup Level," "Color Conversion Table," "Tone Setting" and the like. One example of the information as to processing condition is shown in Table 2 below (information corresponding to a single processing condition is shown to be surrounded by fat lines).

TABLE 2

<Example of Information on Processing Condition>

|  | Title Info | 1 Portrait | 2 Buildings | 3 Colorful | 4 Indoors Shooting |
|---|---|---|---|---|---|
| Information on Processing Condition | Color Saturation | +5 | +0 | ... | ... |
|  | Sharpness | −2 | +3 | ... | ... |
|  | Red-Eye Reduction | Auto | None | ... | ... |
|  | Setup Level | Tone Fixed | Full | ... | ... |
|  | Color Conv. Table | Use No. 1 | Use No. 3 | ... | ... |
|  | Tone Setup | Soft | Hard | ... | ... |
|  | . | . | . | . | . |
|  | . | . | . | . | . |
|  | . | . | . | . | . |

Note that the "Color Saturation" as used herein refers to the parameter that defines how to control color saturation during chroma control processing for controlling the color saturation of an image through control of the coefficient of a 3 3 matrix; "Sharpness" is the parameter that defines how sharpness is enhanced during hyper sharpness processing for enhancing the sharpness while suppressing granularity; "Red-Eye Reduction" is the parameter that defines whether red-eye reduction processing (corresponding to the special image processing of the claimed invention) for correction of color tone defects (so-called red-eye phenomena) in image regions corresponding to people's eyes; "Setup Level" is the parameter defining whether gamma correction is also carried out (indicated by "Full" in Table 2) during density/color correction processing or whether density/color balance correction alone is done (indicated by "Tone Fixed" in Table 2); "Color Balance Table" is the parameter defining which one of a plurality of color conversion tables prepared is used during color balance correction of the density/color correction processing; and, "Tone Setup" is the parameter defining whether an image is finished in a soft mode or in hard mode during gradation/tone conversion processing.

Regarding the above-noted information as to processing condition of the image processing also, this is coded and added the aforementioned header information and then recorded on a sheet material such as a sheet of paper or the like as a visually recognizable 2D bar code. Recording on the sheet material the information as to processing condition of the image processing as such 2D bar code is also done for example by the manufacturer of the digital still camera 10 in such a way that the information as to the processing condition of the image processing is recorded on the sheet material as the 2D bar code with an information item corresponding to a single processing condition being as a unit or alternatively with information items corresponding to a plurality of kinds of processing conditions being gathered together, which sheet material will be supplied to the user. When inputting to the digital still camera 10 the information as to the processing condition of image processing, the user is expected to use digital still camera 10 to take a picture of specific part of the supplied sheet material with the 2D bar code indicative of the information as to the processing condition of image processing being recorded thereon, which part records said 2D bar code.

Figure 7A:
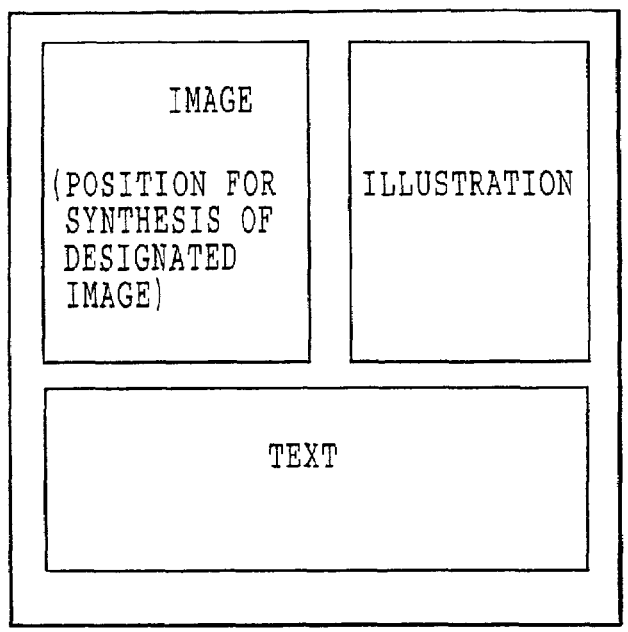
FIG. 7A shows one example of a layout as defined by layout information.

Layout information is the one that indicates a layout when an image represented by image data is combined or synthesized together with a string of characters or a pictorial illustration or the like (i.e. how the image and characters and/or illustration are laid out), one example of which layout is shown in FIG. 7A. Regarding to the layout information also, a plurality of kinds of information items are provided in a way corresponding to a plurality of kinds of layout patterns with information corresponding to a single layout being as a unit. The information corresponding to a single layout consists essentially of layout definition information defining a corresponding layout and title information indicative of the title of a layout as defined by the layout definition information.

As to the layout information also, this is coded and added the aforesaid header information and then recorded on a sheet material such as a paper sheet or the like as a visually recognizable 2D bar code. Recording the layout information on sheet material as such 2D bar code is also done for example by the manufacturer of the digital still camera 10 in such a way that the layout information is recorded on the sheet material as a 2D bar code with an information item corresponding to a s single layout being as a unit or alternatively with information items corresponding to a plurality of kinds of layouts being collected together, which sheet material will be supplied to the user. When inputting the layout information to the digital still camera 10, the user is expected to photograph by digital still camera 10 specific part of the supplied sheet material with the 2D bar code indicative of the layout information being recorded thereon, which part records said 2D bar code.

Note that in this embodiment it is possible to add any given information desired by the user to image data, wherein the information to be added to the image data may be a variety of information including for example classification information used to classify more than one image represented by the image data (e.g. title of individual image, keyword being added thereto, etc.) character information indicating a sentence for explanation of the content of each image represented by the image data (e.g. an explanatory sentence as to an individual location in a photographic image obtained due to shooting of a memorable event, amusement park also called "thema" park, sightseeing spot or the like), and illustration information indicative of a pictorial illustration or "caricature" to be added to an image represented by the image data (e.g. a local map of a nearby land location of a shooting place in a photographic image obtained due to photography of an event, amusement park, sightseeing spot or the like).

Figure 7B:
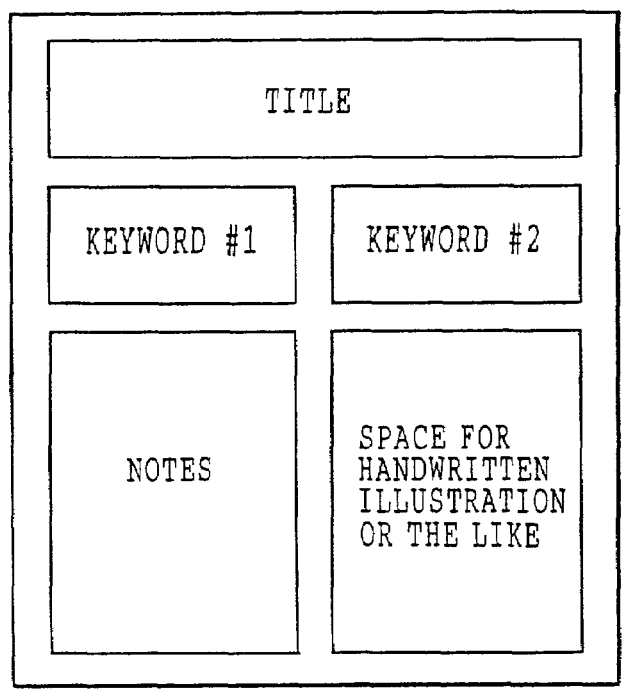
FIG. 7B depicts one exemplary format of an input sheet for use during input of given information.

When the user wants to input the above-stated information, he or she uses a data input sheet of predetermined format with several blank spaces being provided for input of a title, keyword, memo and illustration as exemplarily shown in FIG. 7B and then handwrites the information (characters of a title, keyword, memo or the like along with an illustration) being input to the digital still camera 10 into the blank spaces and, thereafter, takes a photographic image of the handwriting-completed input sheet by using the digital still camera 10. Note that if there are present a plurality of types of input sheets different in format from one another then a bar code indicative of the format of an input sheet (each blank space's location and size) may be added to an input sheet thereby permitting the digital still camera 10 to recognize this bar code.

It must be noted that inputting of the classification information and character information plus illustration information should not be limited to the above-noted scheme for employing the handwriting one and may also be attainable by other schemes including for example a scheme which follows: for the classification information such as a title and/or keyword, generally available or "default" title and keyword or equivalents thereto are coded and added the aforesaid header information and then pre-recorded on sheet material such as a paper sheet or the like as a visually recognizable 2D bar code to thereby enable inputting thereof through image sensing or photography of such sheet material by the digital still camera 10 when the need arises. Additionally, regarding the character information such as an explanatory sentence as to a memorable event or amusement park or sightseeing spot for example, it is also possible to digitally code said explanatory sentences and then add thereto the above-stated header information and thereafter record on signboards or the like to be installed at respective land locations concerned to thereby enable inputting thereof through image sensing or photography of such signboards by the digital still camera 10 when the need arises. Furthermore, regarding the illustration information, it is also possible to input by image sensing of an illustration as prerecorded on a medium such as paper by using the digital still camera 10.

Also note that the information addable to image data should not be limited only to the above-noted classification information and character information plus illustration information: in the illustrative embodiment, information on processing conditions of the image processing and/or layout information associated therewith can also be added in a way as will be set forth later in the description.

Additionally, media with bar codes recorded thereon for indication of information the user wants to input to the digital still camera 10 may also be obtainable in such a way that s/he uses a personal computer or the like for example to get access to a specified home page with said bar codes recited therein and then downloads said page for printout thereof. Alternatively it is also employable that in the state that said specified home page is being displayed on the display screen of a personal computer or the like, this display may be image-sensed and captured by the digital still camera 10 to thereby permit said information to be input to the digital still camera 10.

As has been described previously, in the image sensing for inputting information to the digital still camera 10, there are two possible cases: one is that an object equivalent to a bar code is contained in an optical image to be image-sensed; the other is that such object equivalent to said bar code is not contained therein. Due to this, if at the above-stated step 152 a judgment is made saying that the object equivalent to the bar code is contained in the optical image thus image-sensed, then the system routine goes to step 156 which recognizes outer edges or contour lines of a region corresponding to the bar code in an image represented by image data as stored in the memory 48 due to image sensing and then selects an image pickup frame corresponding to the shape of such region equivalent to the bar code from among a plurality of kinds of image pickup frames that have been prepared in advance with different aspect ratios.

Note here that the image pickup frame may be selected by the user per se. More specifically, there is employable a process which includes the steps of visually displaying on the display 26 an image represented by the image data as presently stored in the memory 48 due to image sensing while substantially simultaneously displaying a graphic image indicative of the image pickup range or "zone" of a specific image pickup frame in such a way that these are superposed over each other, switching said graphic being presently displayed to a graphic image represented by another image pickup frame's image sensing zone in a way pursuant to an instruction from the user, and then selecting an appropriate image pickup frame corresponding to the graphic as selected by the user.

Alternatively it may also be arranged so that in the state that the display 26 is displaying an image thereon, the user is allowed to designate on the display plane the position of more than one corner portion of an image pickup zone the user has judged to be proper for recognition of the image pickup zone being judged to be proper on the basis of such designated position(s) to thereby select an image pickup frame having an image pickup zone that is in close proximity to the image pickup zone thus recognized.

In addition, at the next step 158, acquire or "accept" an image pickup condition for bar code image sensing being fixedly stored in a certain memory region of the nonvolatile memory 58 in such a way as to be predefined as bar code photography use; thereafter, the system routine goes to step 160. It will be preferable that image pickup condition in which the recognition rate of the information represented by a 2D bar code being recorded on sheet material is a maximal value or those values near the maximum be used as the image pickup condition for bar code photographing; for example, it is possible to employ an image pickup condition wherein the "AE mode" is set at "Aperture Priority" when "Flash" is at "Emit Light." On the other hand, if at step 152 a judgment is made so that any object equivalent to a bar code is not contained in the image-sensed optical image then the routine goes next to step 154 which accepts a standard or "default" image pickup condition that is fixedly prestored in a certain memory region of the nonvolatile memory 58 in such a manner that it is predefined to be used for image-sensing of hand-written characters or hand-written illustrations or the like; thereafter, the routine goes to step 160.

At step 160, judge whether the shutter switch 56 is turned on upon manual operation of the release button 22. If NO at this step then the routine returns to step 150 for repeated execution of steps 150–160.

When the shutter switch 56 turns on upon operation of the release button 22, that is, if YES at step 160 then the system routine proceeds to step 162 which performs image photographing processing (the processing similar to those of steps 114–120 in the flowchart of FIG. 3A). In case an object equivalent to a bar code is contained in the optical image to be image-sensed, this image photography processing is performed in accordance with the image pickup condition for bar code image sensing as has been gained or accepted at step 158; thus, even where the bar code is image-sensed, it is possible to recognize the information that is represented by such bar codes at high recognition rates. In this way, the steps 158 and 162 correspond to the image pickup section of the claimed invention.

At next step 164, judge again whether an object equivalent to a bar code is contained in the optical image as image-sensed by the image photography processing of step 162. If NO at step 164 then it is possible to judge in a way that the information to be input to the digital still camera 10 is not the information as represented by the 2D bar code; thus, at step 166, an attempt is made to recognize based on the image data being stored in the memory 48 due to the above-noted image photography processing a character region and/or illustration region of the image represented by the image data with characters and/or illustration to be input to the digital still camera 10 being recorded in the region(s) and then extract the information (classification information and/or character information) of such character region and/or information (illustration information) of the illustration region on the basis of the recognized character region and/or illustration region.

The memory region of the nonvolatile memory 58 is such that storage regions for storage of information as input to the digital still camera 10 are provided respectively in units of kinds of said information. At next step 168, detect the kind of information as extracted at step 166 based on the region from which information has been extracted and then store it in a storage region of the storage regions of nonvolatile memory 58 which corresponds to said detected kind; then, the information input processing is completed.

On the other hand, if YES at step 164 then it is possible to judge in a way that the information to be input to the digital still camera 10 is the information as represented by the 2D bar code; if this is the case, the routine goes to step 170 which recognizes based on the image data being stored in the memory 48 due to the image photography processing a bar code region of the image represented by the image data in which the 2D bar code is recorded and then extracts from the image data the information of said bar code region thus recognized.

At next step 172, analyze the information of the bar code region extracted; then, convert the 2D bar code being recorded in this region into coded information that this 2D bar code indicates. At step 174, judge whether there is inconsistency or "contradiction" in the coded information obtained from the 2D bar code. With the illustrative embodiment, the coded information is added header information indicative of the kind of an information body of such coded information, wherein the kind of such information body must be any one of the information concerning image pickup condition, the information as to the processing condition of image processing and the layout information; accordingly, in the event that there is a contradiction in the content of the header information being added to the coded information obtained from the 2D bar code (e.g. any codes indicating the kind of the information body are not set in the header information) or alternatively the kind of the information body of the coded information is different from any one of the above-stated three types of information, the judgment of step 174 is made affirmative ("YES") thus causing the system routine to go to step 176 which informs the user of failure in bar code recognition in such a way as to produce an alarm sound for warning to the user or alternatively display a message on the display 26 by way of example.

Whereby, the user is capable of recognizing that although the medium with the 2D bar code indicative of specific information being recorded thereon was image-sensed, said specific information has not been input successfully to the digital still camera 10, which in turn makes it possible to take a corrective action such as a retry to image-sense the same while changing the position and/or direction of the digital still camera 10 or alternatively image-sense the same under different illumination conditions for example to ensure that the intended information is recognized successfully.

On the other hand, if NO at step 174 then the routine goes to step 178 which notifies the user of success in bar code recognition in such a way as to produce an electronic sound different from the alarm sound stated previously or alternatively display a message on the display 26 by way of example. Whereby the user is capable of recognizing that image-sensing of the medium with the 2D bar code indicative of the specific information being recorded thereon results in said specific information being successfully input to the digital still camera 10. In this way the steps 174, 176, 178 correspond to the first informing section of the claimed invention.

At next step 180, detect the kind of the information body as contained in the coded information by referring to the header information being added to the coded information obtained from the 2D bar code, and then store the information body in a storage region of the storage regions of the nonvolatile memory 58 which corresponds to said detected kind; thus the information input processing is terminated. Note that this step 180 corresponds to the recognition section of the claimed invention. With the above processing, even when the user is the one who does not own information processing apparatus such as personal computers, it is possible to input for storage a variety of information to the digital still camera 10. Upon completion of the information input processing, the system routine gets back to step 100 in the flowchart of FIG. 3A for again judging a present processing mode.

An explanation will next be given of the processing in an image reproduction or "playback" mode. In case the image playback mode is selected as the processing mode, the system routine leaves step 100 and goes to step 126 which brings or loads from a memory card the image data of an image to be displayed on the display 26 and then stores it in the memory 48.

At step 128, perform conversion of the pixel density of the image data being stored in the memory 48 in accordance with the pixel number of the display 26 (i.e. convert so that the numbers of longitudinal pixels and lateral pixels of an image represented by the image data become identical to the longitudinal/lateral pixel numbers of display 26), and then expand resultant pixel-density converted image data in a display image data storage region (bitmap memory) as provided in advance on the memory 48, and thereafter transfer the image data being stored in the display image data storage region toward the display 26. Whereby the image represented by the image data being stored in memory 48 will actually be displayed on display 26. Obviously in this process of image displaying on display 26, a plurality of images may also be laid out together in a matrix form and then displayed.

At next step 130, judge whether extra information is added to the image data as loaded from the memory card at the previous step 126. In this embodiment, adding information to the image data is done exclusively relative to image data of an image designated by the user, by interruption processing (to be described later) that gets started when the user turns on the menu switch 28.

Due to this, in case no information is added to the image data loaded, that is, if NO at step 130 then the system routine proceeds to step 134 which judges whether the image data is modified during displaying of an image or the like on the display 26 or whether new information is added thereto. If NO at step 134 then the routine goes to step 138 which judges whether an instruction is issued to change an image to be displayed on display 26. If NO at step 138 then go to step 140 which judges whether termination of the image playback mode is instructed. If NO at step 140 then return at step 134 for repeated execution of steps 134 to 140 until either the to-be-displayed image changeover or image playback mode termination is actually instructed.

When the to-be-displayed image changeover is instructed through manual operation of the operation switch 32 for example, that is, if YES at step 138 then the system routine returns to step 126 for recurrent execution of the processing tasks at step 126 and its following steps whereby the image being displayed on the display 26 is changed. Alternatively when termination of the image playback mode is instructed, YES is found at step 140; thus the routine gets back to step 100 for rejudgment of the present processing mode.

Next, an explanation will be given of the interruption processing that gets started in response to occurrence of an interruption when the user turns on the menu switch 28, with reference to flowcharts of FIGS. 5A–5E. Note that this interruption processing corresponds to the processing section of the claimed invention.

At step 190, visually display a list of certain items to be displayed in a table-like form upon activation of the menu switch 28. Such items being displayed at this time indicate titles of processing tasks executable in reply to the user's instruction: with this embodiment, in addition to standard items being displayed at the digital still camera 10 upon activation of menu switch 28, respective items of "Image Pickup Condition," "Processing Condition," "Image Synthesis" and "Information Addition" will also be displayed on the display 26.

At step 192, judge whether any one of such items as displayed in a table form on the display 26 is selected by the user: if no selection is made then wait until the judgement says YES. Additionally the operation switch 32 that is provided on the back face of the body 12 of digital still camera 10 is structured from an almost rectangular-shaped button having respective switch portions corresponding to upper/lower and right/left edges thereof, and is arranged so that upon depressing of an edge of the button, its corresponding switch portion will turn on.

During the interruption processing, the operation switch 32 is used for permitting the user to select information: the user's selection of a specific item from among those items being displayed in a table form is achievable for example by turning on either an upper side switch or a lower side switch of the operation switch 32 to thereby let a cursor move accordingly and then activating the execution/view changeover switch 30 in the state that the cursor is at said specific item. Thus the operation switch 32 corresponds to part of the selector section of the claimed invention.

When an item is selected by the user, YES is verified at step 192; thus, the system routine goes to step 194 which judges whether the user's selected item is one of "Image Pickup Condition," "Processing Condition," "Image Synthesis" and "Information Addition" or another item. When the user's selected item is an item belonging to none of the above four types of items, NO is issued at each of steps 194 to 200, causing the system routine to go to step 202 which performs a processing corresponding to the user's selected item and then completes the interruption processing.

Alternatively in the event that the use of a specific image pickup condition (i.e. image pickup condition corresponding to the image pickup condition information being stored in the digital still camera 10 in the information input mode discussed previously) is desired upon photographing or "shooting" of a subject or scene, the user first activates the menu switch 28—prior to beginning of shooting said subject in order to set said specific image pickup condition as the subject shooting condition—causing certain items to be displayed on the display 26 in a list-up or table-like form and then selects "Image Pickup Condition" from among the items being displayed in such table form.

Whereby, YES is issued at step 200 letting the routine go to step 204. At step 204, refer to the storage region of the nonvolatile memory 58 with information as to image pickup conditions being stored therein and then load titles of all the image pickup conditions whose image pickup condition information items are stored in the storage region; at step 206 next thereto, let the image pickup condition titles thus loaded be displayed on the display 26 in a listup or table-like form as exemplarily shown in FIG. 8A. Referring to these image pickup condition titles displayed in such table form enables the user to readily recognize the content of an individual image pickup condition and therefore select with no difficulties a specific image pickup condition to be set as the subject shooting condition.

At next step 208, judge whether a specific title is selected by the user from among the titles of image pickup conditions being displayed in the table form: if no choice is done then wait until the judgment is made affirmative. When a specific title is selected, that is, if YES at step 208 then the routine goes to step 210 which loads image pickup condition information corresponding to such selected title out of the nonvolatile memory 58 and, based on this loaded image pickup condition information, sets the image pickup condition corresponding to said selected title as the subject shooting condition and thereafter completes the interruption processing. Whereby it is possible to significantly easily perform the setting of any complicated image pickup condition. Note that step 210 corresponds to the processing section of the claimed invention.

It should be noted that in order to permit the user to select a proper image pickup condition with no errors, an alternative technique may also be employable which includes the steps for example of loading, when a specific title is selected by the user and then an instruction is made to display the content thereof, its corresponding image pickup condition information and then visually displaying the content of an image pickup condition as defined by the image pickup condition information thus loaded as exemplarily shown in FIG. 8B.

In case the image processing is required to be applied to image data of a specific image as obtained due to photographing of a subject or scene under a specific processing condition (i.e. the processing condition corresponding to the processing condition information being presently stored in the digital still camera 10 in the information input mode stated supra), the user first activates the menu switch 28—in the state that a specific image is being displayed on the display 26 due to the above-stated image playback mode in order to set a specific processing condition as the processing condition of the image processing with respect to this specific image—causing a list of certain items to be displayed on display 26 in a table form and then selects "Processing Condition" from among the items being visually indicated in the table form.

Whereby, YES is obtained at step 198 causing the system routine to go to step 212. At step 212, refer to the storage region of the nonvolatile memory 58 with information as to processing conditions being stored therein and then load titles of all the processing conditions whose processing condition information items are stored in the storage region;

at next step 214, let the processing condition titles thus loaded be displayed on the display 26 in a table-like form as exemplarily shown in FIG. 8C. Referring to these processing condition titles displayed in such table form enables the user to readily recognize the content of a processing condition represented by the individual image pickup condition and therefore select without difficulties a specific processing condition to be set as the processing condition of the image processing relative to the specific image. Note that step 214 corresponds to the selector section of the present invention as claimed.

At next step 216, judge whether a specific title is selected by the user from among the titles of processing conditions being displayed in the table form: if no choice is made then wait until the judgment says YES. When a specific title is selected, that is, if YES at step 216 then the routine proceeds to step 218 which loads processing condition information corresponding to the selected title from the nonvolatile memory 58 and applies required image processing to image data of the specific image—typically including color saturation control processing, hyper sharpness processing, density/color correction processing, tone/gradation conversion processing (and red-eye reduction processing) and the like—in accordance with the processing condition as defined by the loaded processing condition information and thereafter completes the interruption processing. Whereby it is possible to extremely easily perform setup of the processing condition of any complicated image processing. Note that step 218 corresponds to the processing section of the present invention as claimed.

It must be noted that in order to allow the user to select an adequate processing condition without errors, a technique may also be employable which includes the steps for example of loading, when a specific title is selected by the user and then an instruction is made to display the content thereof, its corresponding processing condition information and then visually displaying the content of a processing condition as defined by such loaded processing condition information as exemplarily shown in FIG. 8D.

Figure 3B:
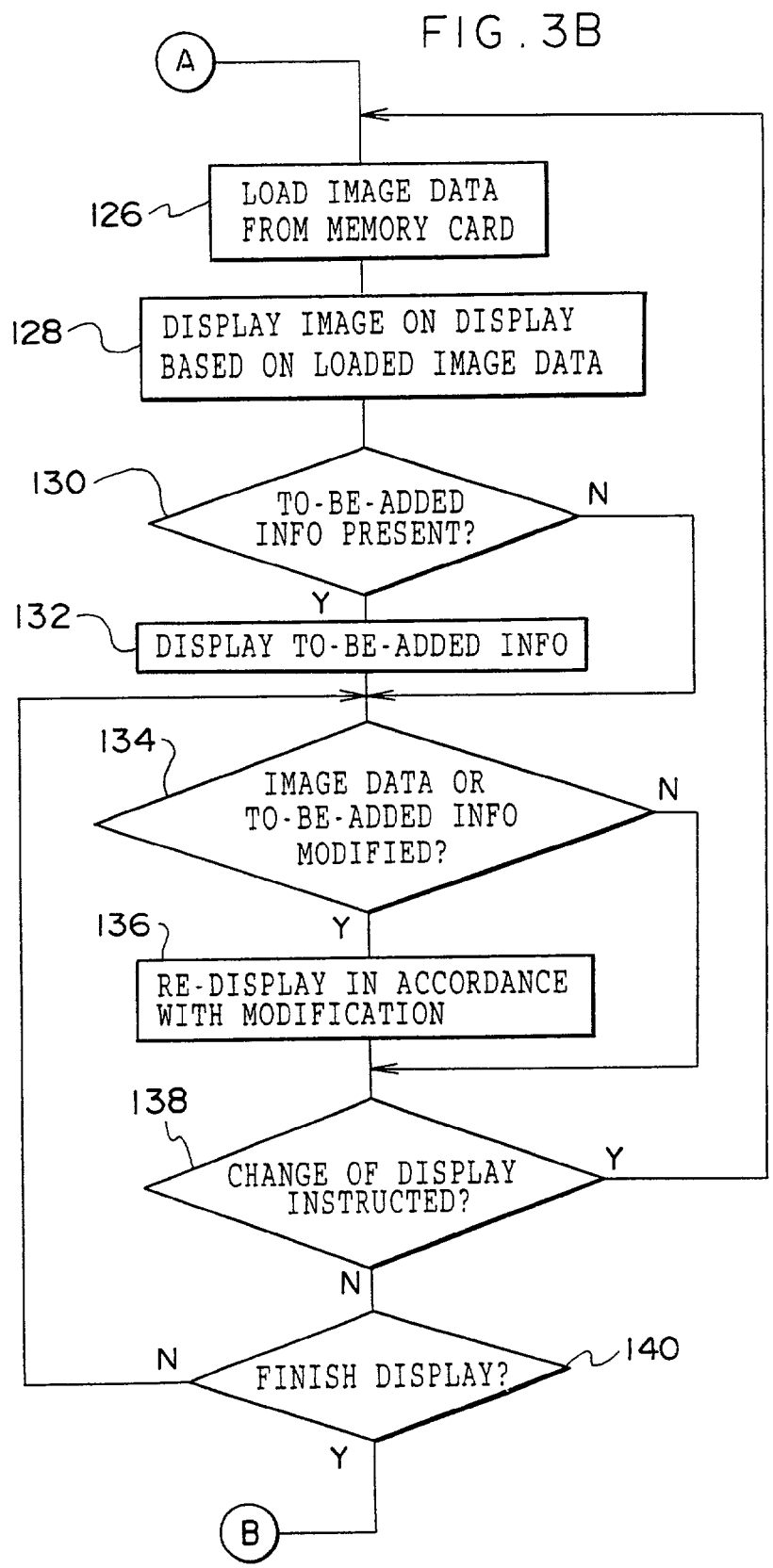
Figure 5B:
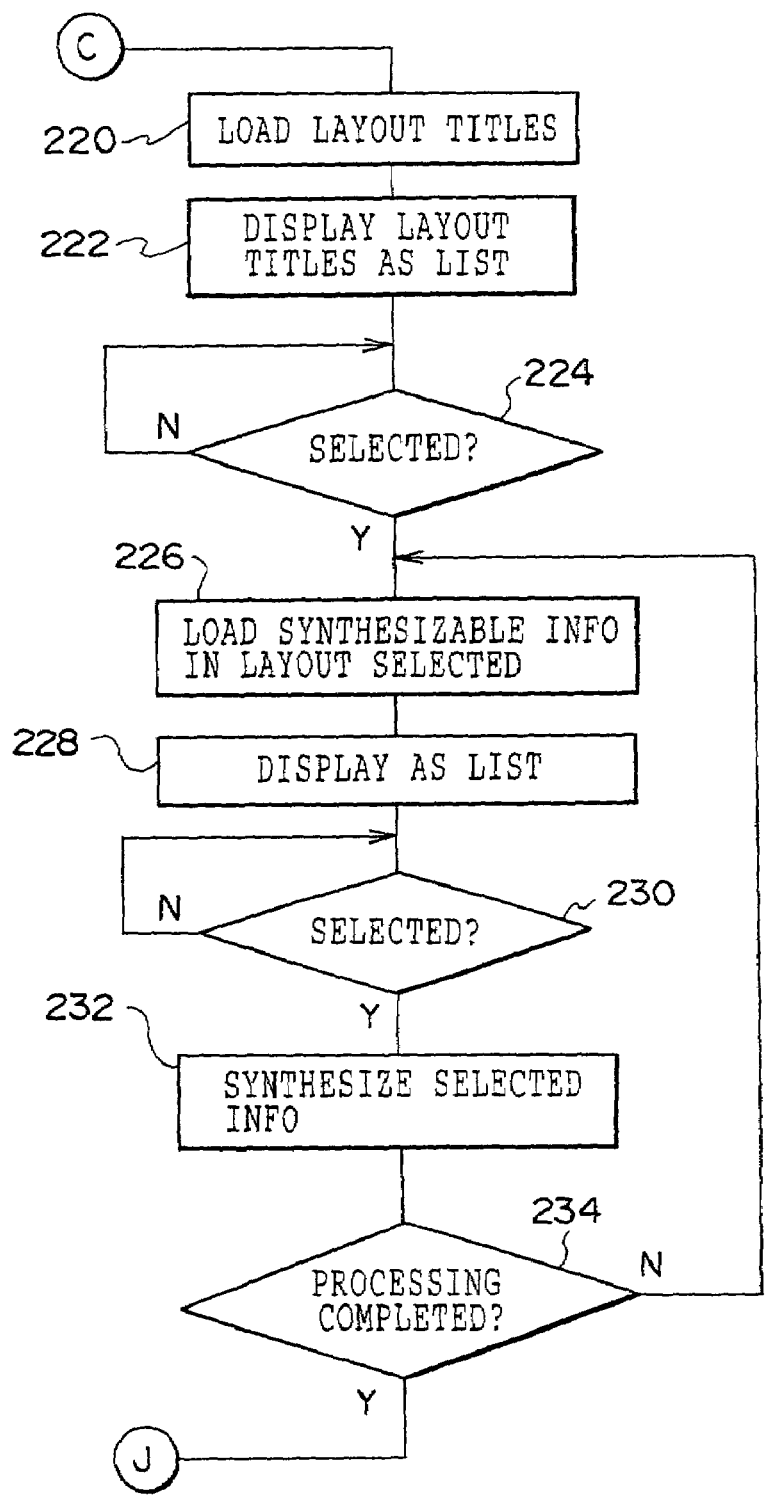
Figure 5C:
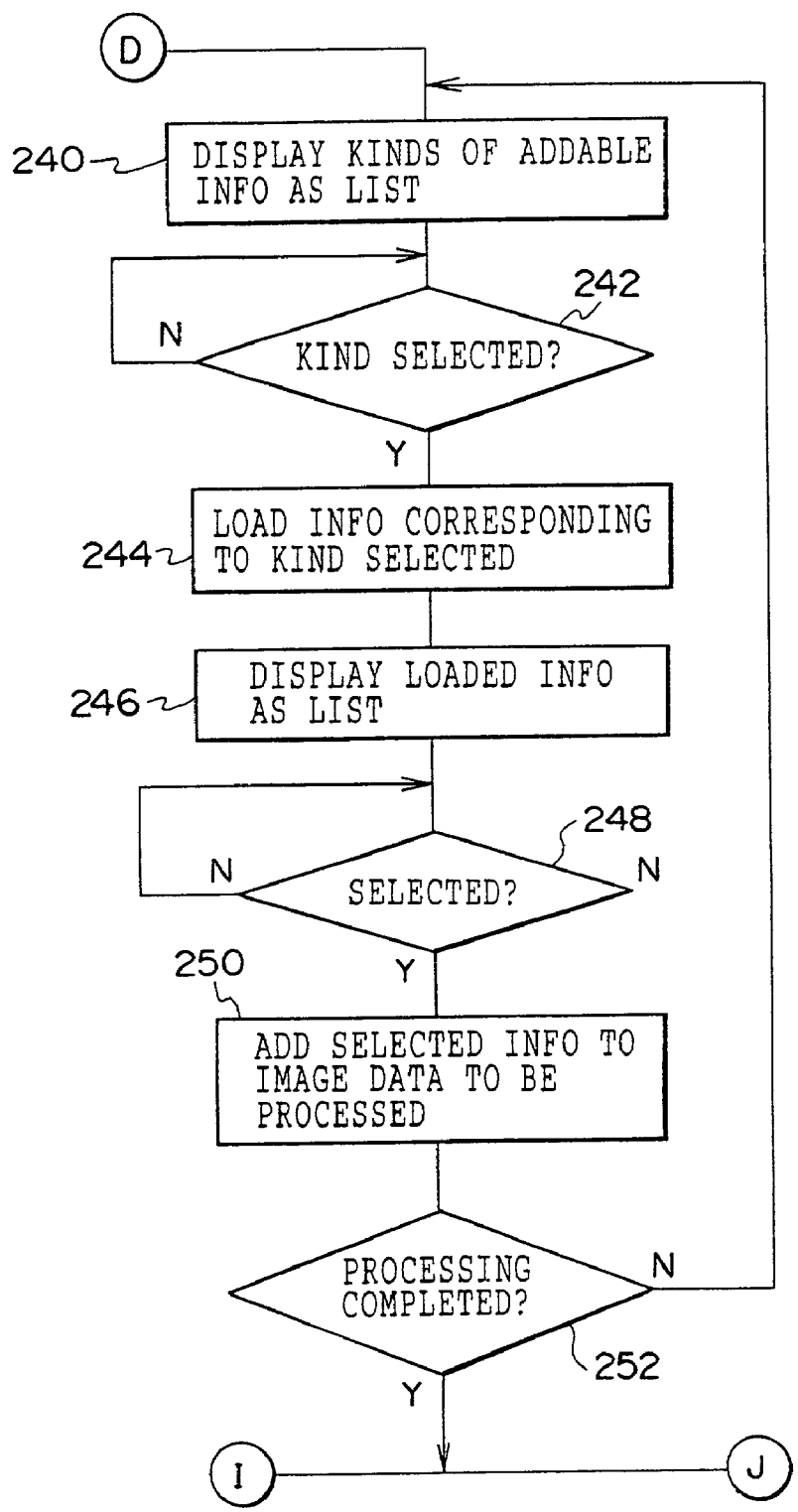
Figure 5D:
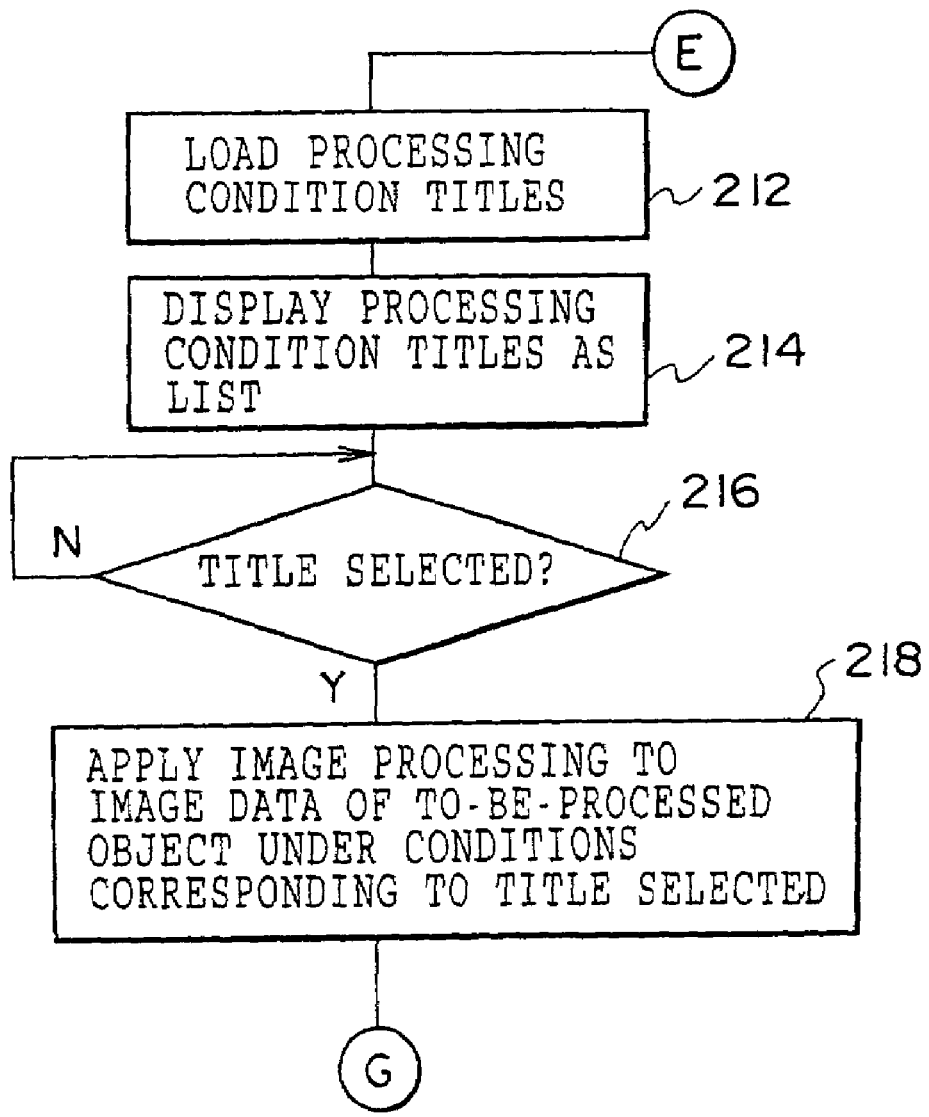

It must also be noted that since the image processing with respect to image data of the specific image is done while the specific image is being displayed on the display 26 in the image playback mode, upon completion of said image processing resulting in termination of the interruption processing, the judgment of step 134 in the flowchart of FIG. 3B is affirmed; thus, at step 136, said specific image is again displayed or "redisplayed" using image data changed due to the image processing. This permits the user to visually recognize a result of the image processing.

Additionally in case a specific image obtained due to photographing of a target subject is required to be synthesized with any other desired information in a specific layout (i.e. layout corresponding to the layout information as stored in the digital still camera 10 due to the information input mode noted previously), the user first turns the menu switch 28 on—in the state that a specific image is being displayed on the display 26 due to the aforementioned image playback mode in order to combine or synthesize this specific image with other desired information—causing a list of certain items to be displayed on display 26 in a table-like form and then selects "Image Synthesis" from among the items being indicated in the table form.

Whereby, YES is verified at step 194 thus letting the system routine go to step 220. At step 220, refer to the storage region of the nonvolatile memory 58 with layout information being stored therein and then load titles of all the layout patterns whose layout definition information items are stored in this storage region; at next step 222, let the loaded layout titles be displayed on the display 26 in a table-like form in a similar way to that in the case of image pickup condition titles and processing condition titles stated supra. Referring to the list of these layout titles being displayed enables the user to readily recognize the content of a layout pattern represented by the individual layout definition information and therefore select without difficulties his or her desired layout. This step 222 also corresponds to the selector section of the present invention as claimed.

It should be noted that in order to allow the user to select a proper layout with no errors, a technique may also be employed which includes the steps for example of loading, when a specific title is selected by the user and then an instruction is made to display the content thereof, its corresponding layout definition information, and then visually displaying on the display 26 the layout defined by the layout definition information.

At next step 224, judge whether a specific title is selected by the user from among the layout titles being displayed in the table form: if no selection is made then wait until the judgment says YES. When a specific title is selected, that is, if YES at step 224 then the routine goes to step 226 which loads layout definition information corresponding to the selected title out of the nonvolatile memory 58 and judges the kind of an information item capable of being synthesized with the specific image (i.e. the kind of information to be filled into each region other than those used for insertion of an image) and then loads from the nonvolatile memory 58 all possible single-kind information included in those of the kinds judged. And at next step 228, display such loaded information on the display.

As one example, in the layout pattern shown in FIG. 7A, the kinds of information synthesizable with images are "Character Information" and "Illustration Information"; accordingly, all the character information or all the illustration information being stored in the nonvolatile memory 58 will be loaded for visual indication on the display 26 in a table form.

Note here that it is also permissible if necessary to arrange so that in place of the character information and illustration information, a list of the tiles added to respective information items will be displayed; or still alternatively, either single character information or single illustration information alone may be displayed while offering an ability to change over or switch the information to be displayed in reply to an instruction from the user. Obviously the layout shown in FIG. 7A is a mere example, and other layouts are also employable for synthesizing an image with classification information such as a title or a keyword or the like.

At next step 230, judge whether information to be synthesized with a specific image is selected from among the information items being presently displayed on the display 26: if no selection is made then wait until the judgment is made affirmative. When information being synthesized with the specific image is selected by the user, that is, if YES at step 230 then the system routine goes to step 232 which integrally combines image data of the specific image with such information as selected by the user into a single "composite" image in accordance with the layout as defined by the layout definition information being selected by the user.

At next step 234, judge whether the image synthesis processing is completed. If more than one region in which information to be synthesized is not yet selected is present in the layout defined by the user's selected layout definition information then the judgement of step 234 is negative; if this is the case, i.e. if NO at step 234, then the routine returns at step 226 for repeated execution of steps 226 to 234. And, if YES at step 234 then terminate the interruption processing. With this procedure, it is possible to obtain through very simplified operations an image with the user's desired information being synthesized with a specific image in the user's desired layout. Additionally the above-noted image synthesis processings correspond to the processing section of the present invention as claimed, respectively.

In view of the fact that the above image synthesis processing is done while the specific image is being displayed on the display 26 in the image playback mode, upon completion of the image processing resulting in termination of the interruption processing, the judgment of step 134 in the flowchart of FIG. 3B is made affirmative; thus, at step 136, the resultant image data that has experienced the image synthesis processing is used to visually display the image with the user's desired information being synthesized with the specific image in the user's desired layout. This permits the user to visually recognize an exact result of the image synthesis processing.

In addition, in the event that the user wants to add any desired information to the image data of the specific image obtained due to photography of a subject of interest, s/he first turns the menu switch 28 on—in the state that the specific image is being displayed on the display 26 due to the above-described image playback mode in order to add other desired information to the image data of this specific image—causing a list of certain items to be displayed on display 26 in a table-like form and then selects "Information Addition" from among the items being displayed in the table form.

Whereby the judgment of step 196 is made affirmative causing the routine to proceed to step 240. At step 240, display in a table form the attributes of information items addable to the image data (i.e. the kinds; for example, "Information as to Processing Condition," "Layout Information," "Classification Information," "Character Information," and the like). At next step 242, judge whether a specific attribute is selected as the attribute of information to be added; if no selection is made then wait until the judgment becomes affirmative.

When a specific attribute is selected by the user, the judgment of step 242 is made affirmative causing the routine to go to step 244 which refers to the storage region of the nonvolatile memory 58 in which information corresponding to the selected attribute is stored and then loads therefrom all the information items stored in the storage region; at next step 246, display the loaded information on the display 26. Note here that it will be preferable that a listing of individual information tiles be visually indicated in a table-like form in cases where such selected attribute is either "Information as to Processing Condition" or "Layout Information" or the like.

At next step 248, judge whether specific information is selected as the information to be added to the image data; if no such selection is not available then wait until the judgment becomes affirmative. When specific information is selected by the user, that is, if YES at step 148 then the routine goes to step 250 which adds the user's selected information to the specific image data as the attribute information of such specific image data.

At step 252, judge whether addition of the information to the specific image data has been completed. When there is information to be further added, that is, if NO at this step then the routine returns to step 240 for repeated execution of steps 240–252. And if YES at step 252 then terminate the interruption processing. This permits the user to achieve addition of his or her desired information to the specific image data through very simplified procedure.

In light of the fact that the above-discussed information addition processing also is to be done while a specific image is being displayed on the display 26 in the image playback mode, when the information addition processing is completed resulting in termination of the interruption processing, the judgment of step 134 in the flowchart of FIG. 3B is made affirmative thereby letting at step 236 the information as added to the image data of specific image be visually displayed on display 26 along with the specific image. This enables the user to visually recognize an exact result of the information addition processing. Note that the above information addition processing corresponds to the processing section of the instant invention as claimed.

It will possibly happen that once after termination of the image playback mode, the image playback mode is again executed and then a specific image is instructed to be displayed; if this is the case, the judgment of step 130 in the flowchart of FIG. 3B is affirmative so that the information being added to image data of such specific image will be displayed continuously from the beginning of startup of an operation for displaying the specific image.

Additionally, in case the above-noted user's selected information is added to specific image data as the attribute information of the specific image data, a photo processing lab is responsive to receipt of a request of photo print preparation from the user for performing the following processing based on the attribute information as added to the image data as sent from the user: if information concerning the processing condition of image processing is added thereto as the attribute information for example, then image processing is carried out under the processing condition as defined by the processing condition information contained in the information; if layout information and/or information to be synthesized with an image (classification information, character information, illustration information, etc.) is added as the attribute information then processing similar to the image synthesis processing explained previously is carried out based on these information items.

In this way, adding to the image data the information defining how a photo print(s) is/are to be prepared makes it unnecessary for the user per se to perform complicated works such as informing the photo processing lab of the kind of his or her desired image processing to be executed and processing conditions in a way of one-to-one correspondence with each image, which in turn makes it possible to lighten the user's loads for requesting photo print preparation to ensure that photo prints are obtained with the user's initially intended effects and finish. In addition, while execution of the image processing and image synthesis processing generally results in application of relatively large loads to the CPU 54, it becomes possible to avoid a necessity of letting the digital still camera 10 perform these processing.

It should be noted that although in the above explanation one specific case has been set forth wherein the processing condition during image processing, the layout or the to-be-synthesized information during image synthesis processing, and the information to be added to image data are selected are selected in the state that a specific image (image to be processed) is being selected in the image playback mode, the invention should not exclusively be limited thereto and may alternatively be arranged so that upon turn-on of the shutter switch 56 in the photographing mode, anyone of image processing, image synthesis processing and information addition processing is applied to the image data obtained due to image sensing in accordance with a selected content thereof.

Optionally the image pickup condition information used during image pickup may be added as the information being added to image data. This image pickup condition information may be arranged so that it is automatically added to image data during image sensing or photography. The image pickup condition information is useable when automatically computing the processing condition of image processing at the photo processing lab upon receipt of a photo print preparation request, for example.

Also note that although in the foregoing description the digital still camera 10 has been explained as one example of the image pickup device in accordance with the present invention, the invention should not be limited thereto and may also be applicable to other devices of the type having functions for converting optical photographic images to image information, such as for example digital video cameras or equivalents thereto.

Further note that although in the above description one exemplary case has been presented where an image represented by image data is processed so that it is synthesized with other information in accordance with a certain format, the invention should not be limited thereto and may alternatively be arranged so that the image synthesis processing includes the process step of adhering or "pasting" an image onto a prespecified base sheet (base sheet information indicative of this base sheet is also capable of being input by using a 2D bar code or the like).

A second preferred embodiment of the present invention will next be set forth below. Note that the device structure and arrangement thereof is similar to that of the first embodiment and thus an explanation thereof will be eliminated herein.

Figure 9B:
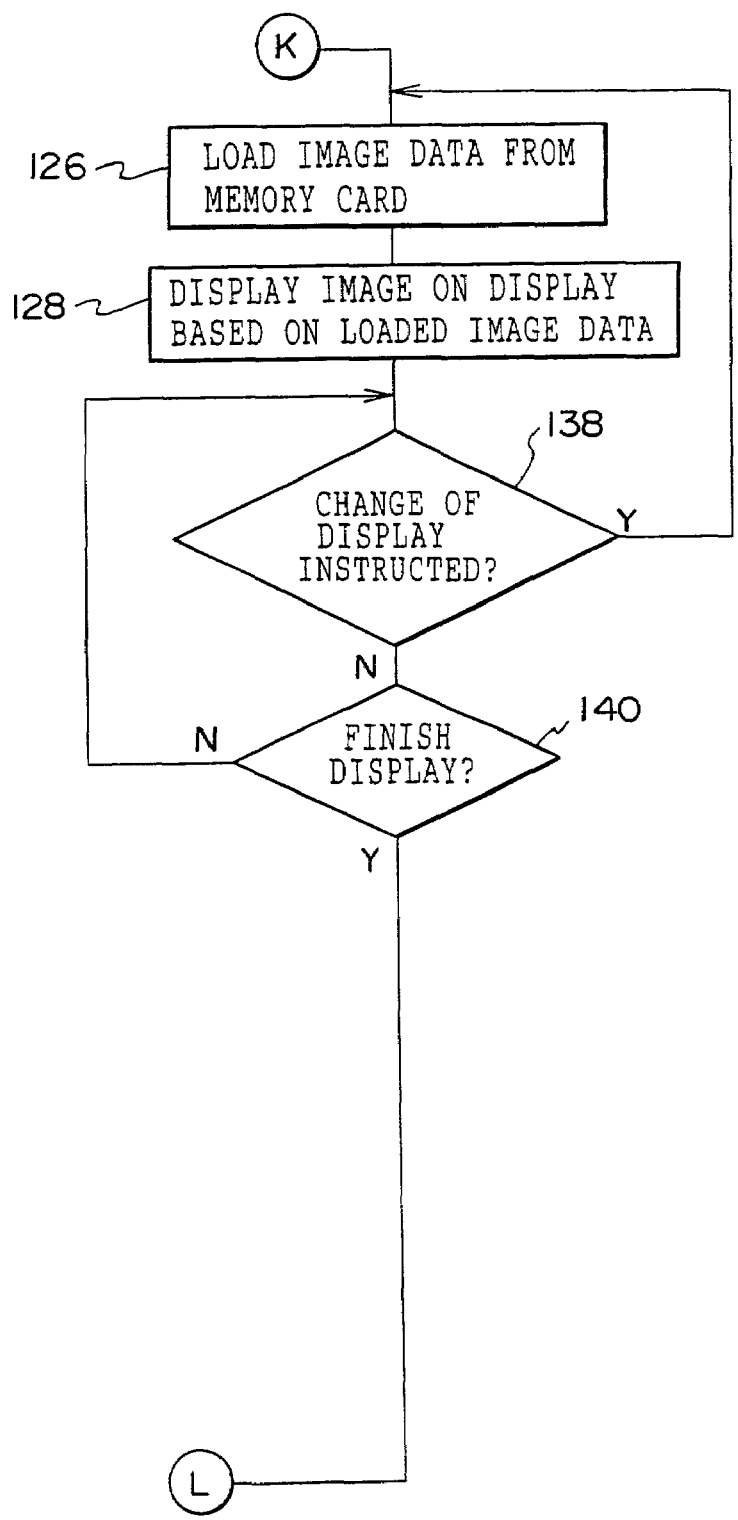
Figure 11A:
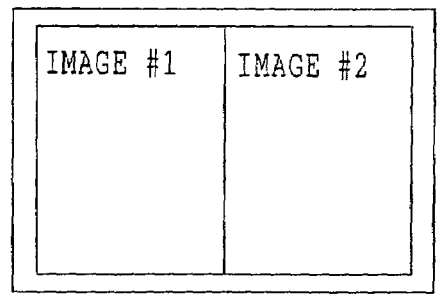
FIGS. 11A–11E are diagrams each showing an exemplary layout pattern as defined by layout information.
Figure 11B:
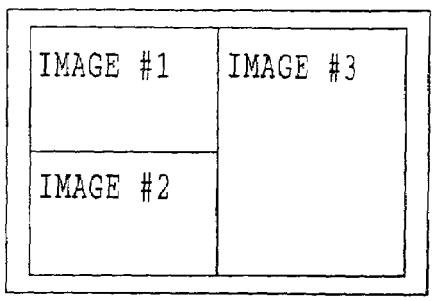
Figure 11C:
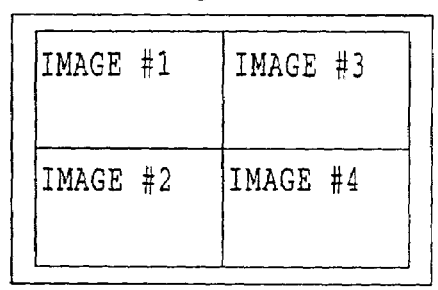
Figure 11D:
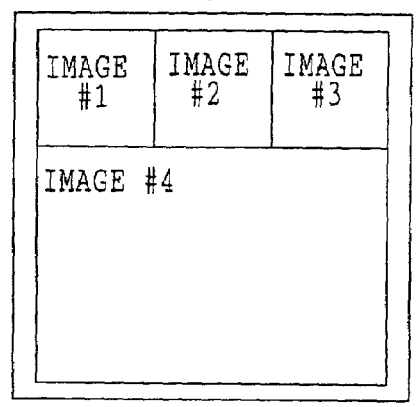
Figure 11E:
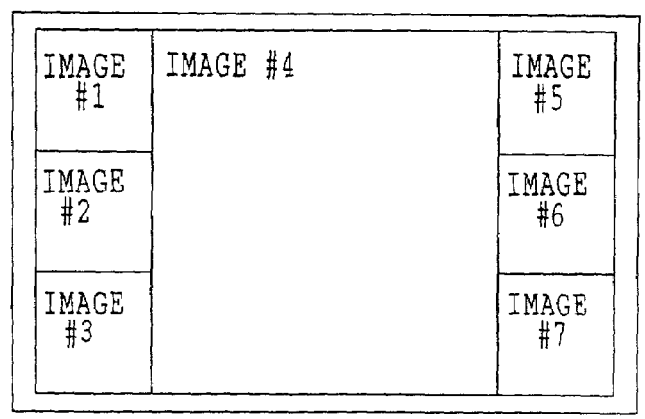

As an operation of this embodiment an explanation will be given of the processing to be executed by the CPU 54 during power-up of the digital still camera 10 with reference to flow charts of FIGS. 9A and 9B. As shown in FIGS. 9A and 9B, the system routine in this event starts with step 100 which judges which mode is presently selected as the processing mode, and its following process flow will be diverted in accordance with the presently selected processing mode. The digital still camera 10 in accordance with this embodiment is provided with a variety of kinds of processing modes, including a photographing mode to be selected when photographing or "shooting" a subject of interest, image playback mode to be selected when displaying a resultant photographic image on the display 26, and information input mode to be selected when inputting information to the digital still camera 10. Regarding the cases of selecting the photographing mode and the information input mode, the processing thereof will be executed in a similar way to that of the first embodiment.

In this embodiment, an explanation will be given using exemplary layout information indicative of several layout patterns shown in FIGS. 11A to 11E.

Note that in FIGS. 11A–11E, a respective one of rectangular regions with legends "Image #1" to "Image #7" added respectively indicates a synthesis region which permits an image to be synthesized therein. Layout information that defines a single layout is designed to include information defining the number of synthesis regions in a corresponding layout along with the location and size of an individual synthesis region and title information indicative of the title of such layout. In this way, the layout information in accordance with this embodiment corresponds to the layout information of the present invention as claimed. Additionally the layout as defined by the layout information may be a layout wherein a non-synthesis region is colored or alternatively a background image is added to outside of the synthesis region; in this case, information designating the color of such non-synthesis region and/or information representing the background image will also be added to the layout information.

In this embodiment also, the layout information is coded with the header information stated supra being added thereto and is then recorded on a sheet material such as a sheet of paper as a visually recognizable two-dimensional (2D) bar code. In case a camera operator or user wants to input the layout information indicative of a desired layout to the digital still camera 10, the user uses the digital still camera 10 to take a picture image of a portion of the supplied sheet material with the 2D bar code indicative of said layout information being recorded thereon.

Additionally this embodiment is also arranged so that any given image such as a character image or an illustration image or the like, other than the image as obtained through the user's activity of photographing any given subject using the digital still camera 10, is capable of being synthesized in the synthesis region on the layout defined by the layout information as shown in FIG. 8A as one example. The character information to be indicated by the character image typically includes but not limited to a word for image classification (e.g. a title of individual image, keyword being added to the individual image or the like) and a sentence for explanation of the content of an image (e.g. an explanatory sentence of the individual land location in a photographic image of a memorable event, amusement park, sightseeing spot, etc.) by way of example. An example of the illustration indicated by the illustration image is a land map of a nearby location of the shooting spot in the picture image obtained from photography of an event, amusement park, sightseeing spot, etc.

In case the user wants to input the above-noted character image and/or illustration image to the digital still camera 10 for synthesis with a photographic image, s/he uses a data input sheet of predetermined format with several blank spaces being provided for entry of a title, keyword, memo and illustration as exemplarily shown in FIG. 7B and then handwrites the information (characters of a title, keyword, memo or the like along with an illustration) being input to the digital still camera 10 into the blank spaces and, thereafter, takes a photographic image of the handwriting-completed input sheet by using the digital still camera 10. Note that if there are available a plurality of types of input sheets different in format from one another then a bar code indicative of the format of an input sheet (each blank space's location and size) may be added to an input sheet thereby permitting the digital still camera 10 to recognize this bar code.

It is noted that inputting of the character information should not be limited to the above-noted scheme for taking a picture of the handwritten one and may also be attainable by other schemes including for example a scheme which follows: regarding a character image indicating the character information used for image classification such as a title and/or keyword, generally available or "default" title and keyword or equivalents thereto are coded with the aforesaid header information added thereto and then prerecorded on sheet material such as a paper sheet or the like as a visually recognizable 2D bar code to thereby enable inputting thereof through image sensing or photography of such sheet material by the digital still camera 10 when the need arises. In this case the character information that has been input as a bar code to the digital still camera 10 is converted by the digital still camera 10 into a character image displaying a string of characters represented by said character information.

Additionally, as for the input of a character image indicating character information such as an explanatory sentence as to a memorable event or amusement park or sightseeing spot for example, it is also possible to digitally code said explanatory sentences and then add thereto the above-stated header information and thereafter record on signboards or the like to be installed at respective land locations to thereby enable inputting thereof through image sensing or photography of such signboards by the digital still camera 10 when the need arises. In this case also, the character information thus input in this way is converted by the digital still camera 10 into a character image displaying a string of characters represented by said character information.

Further, regarding inputting of the illustration image also, the process of achieving it through photography of a handwritten one maybe replaced with a process of photographing using the digital still camera 10 an illustration as prerecorded on media such as a paper sheet or the like.

Upon termination of the information input processing, the system procedure returns at step 100 in the flowchart of FIG. 9A for again judging or "rejudgment" of the present processing mode. Note here that since each of various kinds of information being input to the digital still camera 10 through the above-stated information input processing is generally such that specific information is selected for usage from among a plurality of information, the above information input processing is recurrently performed a plurality of times with respect to such various kinds of information—for example, as for the layout information, layout information defining a variety of layout patterns shown in FIGS. 11A to 11E will be stored in corresponding storage regions of the nonvolatile memory 58 of the digital still camera 10, respectively.

An explanation will next be given of the processing in an image reproduction or "playback" mode. In case the image playback mode is selected as the processing mode, the system routine leaves step 100 and goes to step 126 which brings or loads from a memory card the image data of an image to be displayed on the display 26 and then stores it in the memory 48.

At step 128, perform conversion of the pixel density of the image data being stored in the memory 48 in accordance with the pixel number of the display 26 (i.e. convert so that the numbers of longitudinal pixels and lateral pixels of an image represented by the image data become identical to the longitudinal/lateral pixel numbers of display 26), and then expand resultant pixel-density converted image data in a display image data storage region (bitmap memory) as provided in advance on the memory 48, and thereafter transfer the image data being stored in the display image data storage region toward the display 26. Whereby the image represented by the image data being stored in memory 48 will actually be displayed on display 26. Obviously in this process of image displaying on display 26, a plurality of images may also be laid out together in a matrix form and then displayed.

At next step 138, judge whether an instruction is made to change or switch an image to be displayed on the display 26. If NO at step 138 then the procedure goes to step 140 which judges whether an instruction is made to terminate the image playback mode. If NO at step 140 also then the procedure returns at step 138 for repeated execution of steps 138, 140 until either the to-be-displayed image changeover or the image playback mode termination is actually instructed.

When the to-be-displayed image changeover is instructed through manual operation of the operation switch 32 for example, that is, if YES at step 138 then the system routine returns to step 126 for recurrent execution of the processing tasks at step 126 and its following steps whereby the image being displayed on the display 26 is changed. Alternatively when termination of the image playback mode is instructed, YES is found at step 140; thus the routine gets back to step 100 for rejudgment of the present processing mode.

Next, an explanation will be given of the interruption processing that gets started in response to occurrence of an interruption when the user turns on the menu switch 28, with reference to flowcharts of FIGS. 10A and 10B.

At step 390, visually display a list of certain items to be displayed in a table-like form upon activation of the menu switch 28. Such items being displayed at this time indicate titles of processing tasks executable in reply to the user's instruction: with this embodiment, in addition to standard items being displayed at the digital still camera 10 upon activation of menu switch 28, respective items of "Image Pickup Condition," "Processing Condition" and "Image Synthesis" will also be displayed on the display 26.

At step 392, judge whether any one of such items as displayed in a table form on the display 26 is selected by the user: if no selection is made then wait until the judgement says YES. Additionally the operation switch 32 that is provided on the back face of the body 12 of digital still camera 10 is structured from an almost rectangular-shaped button having respective switch portions corresponding to upper/lower and right/left edges thereof, and is arranged so that upon depressing of an edge of the button, its corresponding switch portion will turn on.

During the interruption processing, the operation switch 32 is used for permitting the user to select information: the user's selection of a specific item from among those items being displayed in a table form is achievable for example by turning on either an upper side switch or a lower side switch of the operation switch 32 to thereby let a cursor move accordingly and then activating the execution/view changeover switch 30 in the state that the cursor is at said specific item.

When an item is selected by the user, YES is verified at step 392; thus, the procedure goes to step 394 which judges whether the user's selected item is "Image Synthesis." When the user's selected item is an item other than "Image Synthesis," NO is issued at step 394, thus causing the procedure to go to step 396 which performs processing corresponding to the user's selected item.

One example is that if the selected item is "Image Pickup Condition" then permit the user to select information defining a specific image pickup condition from among multiple information defining image pickup conditions as stored in the nonvolatile memory 58 and thereafter perform a processing of setting in the digital still camera 10 the image pickup condition defined by the user's selected information. Alternatively if the selected item is "Processing Condition" then let the user select information defining a specific processing condition from among multiple information defining processing conditions as stored in the nonvolatile memory 58 and thereafter perform a variety of kinds of image processings (e.g. color saturation control processing, hyper sharpness processing, density/color correction processing, tone conversion processing or the like) under such processing condition as defined by the user's selected information. And, upon completion of the processing of step 396, the interruption processing is terminated.

On the other hand, when the user wants to obtain a synthesized or "composite" image with a specific image obtained by photography of a subject of interest being synthesized with another image in accordance with a desired format, s/he is expected, for the purpose of permitting execution of an image synthesis processing for synthesizing the specific image with another image, to first turn the menu switch 28 on causing certain items to be displayed on the display 26 in a table-like form and then select "Image Synthesis" from among these items being displayed in the table form. Whereby the judgment is made affirmative at step 394 letting the procedure proceed to step 398 for performing the required image synthesis processing at a later step or steps in the downstream of step 398.

Figure 12A:
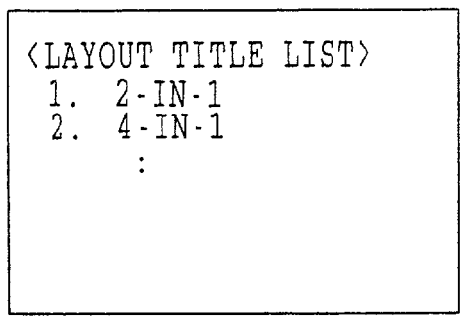
FIGS. 12A–12G are image diagrams each showing an exemplary on-screen display image in the process of image synthesis processing.

More specifically, at step 398, refer to one storage region of the storage regions of the nonvolatile memory 58 in which the layout information is stored, load title information included in all the layout information being stored in this storage region, and then display in a table form the titles of a variety of layout patterns represented by the title information thus loaded as shown for example in FIG. 12A. At next step 400, judge whether a specific title is selected by the user from among these layout titles being displayed in the table form; if no selection is made then wait until the judgment becomes affirmative.

Referring to the layout titles displayed in such table form enables the user to readily recognize the content of an individual layout and therefore select without difficulties his or her desired layout used for image synthesis. Note that the user's selection of his or her desired layout is achievable for example by activating either an upper side switch or a lower side switch of the operation switch 32 to thereby let a cursor move accordingly and then turning the execution/view changeover switch 30 on in the state that the cursor is at a title corresponding to the desired layout. In this way, the steps 394, 400 along with the operation switch 32 and execution/view change switch 30 correspond to the first selector section as claimed.

Upon selection by the user of a specific title, the judgment of step 400 is made affirmative causing the procedure to go to step 402. Note that in order to ensure that such desired layout is selected by the user without errors, it may be designed for example so that in case a specific title is temporarily selected by the user and then an instruction is made to display a layout corresponding to the temporarily selected title, the corresponding layout is visually displayed on the display 26 and the judgment of step 400 is rendered affirmative when this layout is finally selected by the user who has visually checked the layout being displayed on display 26 for appropriateness.

Figure 12B:
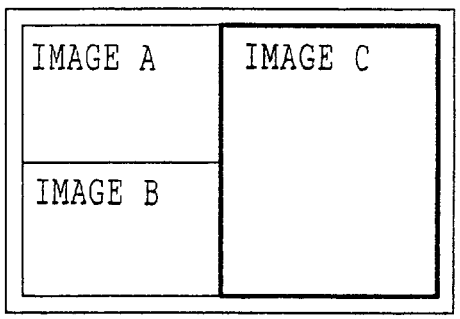

At step 402, load or "import" from the nonvolatile memory 58 the layout information corresponding to the selected title and then display on the display 26 the layout as defined by such loaded layout information as exemplarily shown in FIG. 12B while at the same time displaying on display 26 a message which asks the user to select a synthesis region to be processed (i.e. synthesis region for execution of selection of an image to be synthesized) from among a plurality of synthesis regions as provided in a displayed layout pattern. And at step 404, judge whether selection of the to-be-processed synthesis region is done; if such selection is not done then wait until the judgment becomes affirmative.

It should be noted that with regard to the selection of such to-be-processed synthesis region by the user also, this is achievable by a process including for example the steps of letting a graphic figure or "caricature" (e.g. a rectangular frame indicated by thick lines in FIG. 12B) indicative of a temporarily selected synthesis region as the synthesis region to be processed correspond sequentially to any one of a plurality of synthesis regions as provided in the layout through recurrent activation of a specific switch of the operation switch 32 and then turning the execution/view change switch 30 on in the state that said graphic corresponds to the synthesis region to be handled as the to-be-processed region. In this way the steps 402, 404 along with the operation switch 32 and execution/view change switch 30 correspond to the second selector section as claimed.

When a specific synthesis region is selected as the synthesis region to be processed, the judgment of step 404 becomes affirmative causing the procedure to go to step 406 which displays on the display 26 a message for permitting the user to select and determine which one of images is used as the image being synthesized into the to-be-processed synthesis region—an image as will be obtained due to image sensing of a subject, or an image whose image data is stored in either the memory card or the nonvolatile memory 58. The following processing will be diverted in accordance with a result of the user's selection.

In case the use of an image that will be obtained due to image sensing of a subject is selected as the image to be synthesized in the to-be-processed synthesis region, the procedure leaves step 406 and goes to step 408 which performs image pickup processing (i.e. the processing similar to that at steps 104 to 120 in the flowchart of FIG. 9A, excluding steps 106–110) and thereafter proceeds to step 414. In this case image sensing is done by the user's operation of the release button 22 causing image data obtained due to such image sensing to be stored in the memory 48 as image data of the image to be synthesized in the synthesis region.

Figure 12C:
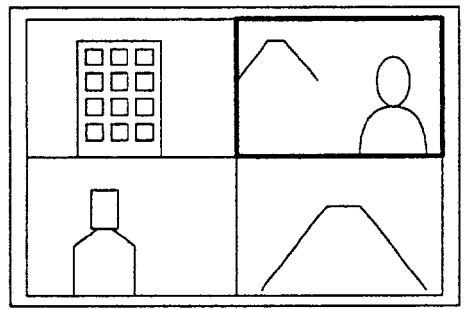

Alternatively in case the use of an image whose image data is presently stored as the image to be synthesized in the to-be-processed synthesis region, the procedure goes from step 406 to step 410 which loads image data of images synthesizable in the selected synthesis region from the memory card or the nonvolatile memory 58 and then display them on the display 26 in a table form as exemplarily shown in FIG. 12C while simultaneously displaying on display 26 a message which requests the user to select one image to be synthesized in the to-be-processed synthesis region.

At next step 412, judge whether an image to be synthesized in the to-be-processed synthesis region is selected; if no such selection is done then wait until the judgment is made affirmative. Note that the user's selection of such to-be-synthesized image is also achievable by a process including for example the steps of repeating activation of a specific switch of the operation switch 32 to thereby let a graphic figure indicative of an image being temporarily selected as the to-be-synthesized image (e.g. a rectangular frame indicated by thick lines in FIG. 12C) sequentially correspond to any one of respective images being presently displayed on the display 26 and then turning the execution/view change switch 30 on in the state that said graphic corresponds to a desired image. In this way the steps 410, 412 along with the operation switch 32 and execution/view change switch 30 correspond to the first designation section claimed.

When the to-be-synthesized image is selected by the user in the way stated above, the judgment of step 412 is made affirmative causing the procedure to go to step 414 after having loaded image data of a selected image from either the memory card or the nonvolatile memory 58.

In view of the fact that a variety of images are synthesizable into synthesis regions that are provided on the layout as defined by the layout information, the step of simply displaying synthesizable images in a table-like form is replaced by a process of displaying kind names of those images superposable in the to-be-processed synthesis region (e.g. user image (image obtained due to the user's image sensing of any given subject), character image, illustration image, etc.) in a table form and then displaying in a table form an image corresponding to a kind name as selected by the user. An alternative approach is that table-form displaying of images or image kind names in the way discussed above is replaced with displaying a single image on the display 26 and then switching an image being displayed on display 26 in reply to the user's instruction: still alternatively, it is also possible to arrange so that the table-form displaying and the individual displaying is made selectable.

At step 414, visually display the to-be-synthesized image on the display 26 based on image data being stored in the memory 48 while at the same time displaying on display 26 a message which asks the user to make a selection as to whether trimming is applied to the image being displayed and then judges based on the user's selection result whether trimming is done or not. While referring to an image as displayed on display 26, if the user might want to use an entire area of the displayed image for image synthesis then he or she selects that trimming is not performed; if s/he wants to use only partial region in the displayed image then select that trimming is performed.

Figure 12D:
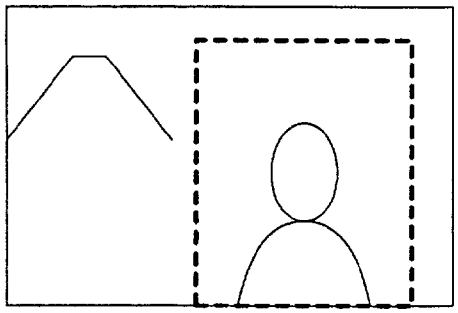

When a selection is made specifying that any trimming is not performed, that is, if NO at step 414 then the procedure goes to step 424. When execution of trimming is selected, that is, if YES at step 414 then the procedure proceeds to step 416 which displays a trimming frame indicative of outer edges of a trimming region (this trimming frame is indicated by broken lines in FIG. 12D as an example) in such a manner that this is superposed over an image being presently displayed on the display 26.

As apparent from viewing respective synthesis regions in respective layouts shown in FIGS. 11A to 11E, the aspect ratio of each synthesis region is not fixed. Due to this, this embodiment is designed to display a trimming frame that is identical in aspect ratio to the to-be-processed synthesis region (in FIG. 12D a trimming frame with the same aspect ratio as a synthesis region indicated by "Image C" on a layout shown in FIG. 12B is displayed as an example). As will be set forth in detail later, this trimming frame is displayed in a way such that its aspect ratio is kept constant irrespective of changes in position and size although the trimming frame is freely alterable in position and/or entire size in accordance with an instruction from the user.

At next step 418, judge whether it is instructed to change the position or overall size of the trimming frame upon the user's manual operation of the operation switch 32 and execution/view change switch 30. Alternation of the trimming frame position can be instructed for example by taking an action for "drag-and-drop" of a straight portion of the trimming frame whereas change of the overall size of the trimming frame may be instructed for example by taking drag-and-drop of a corner of the trimming frame. If NO at step 418 then the procedure goes to step 422; if YES st step 418 then go to step 420 which changes at least one of the position and size of the trimming frame in accordance with the user's instruction and then go to step 422.

At step 422, judge whether the trimming region has been decided by determining whether the user inputs his or her judgment result saying that the trimming frame's position and size are proper. If NO at step 422 then the procedure returns at step 418 for re-execution of steps 418–422 to thereby repeat alternation of at least one of the position and size of the trimming frame in reply to the user's instruction until the trimming region is finally established. Additionally the steps 416 to 422 along with the operation switch 32 and execution/view change switch 30 correspond to the second designation section.

Upon final decision or establishment of the trimming region, the judgment of step 422 is made affirmative causing the procedure to go to step 424 which stores in the memory 48 or the like synthesis condition information for specifying the image to be synthesized in the to-be-processed synthesis region. In case no trimming is done, this synthesis condition information consists only of information that specifies an image to be synthesized in the to-be-processed synthesis region; in case trimming is done it is arranged to also include information indicative of the position and size of the trimming region. Thus the step 424 corresponds to the generator section claimed.

Figure 12E:
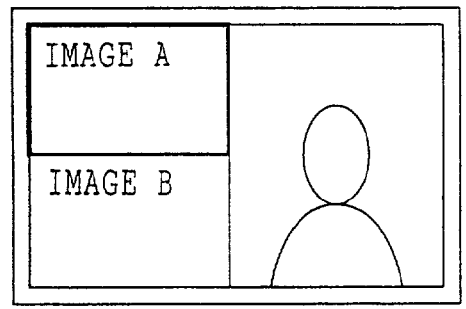

And at step 426, as exemplarily shown in FIG. 12E, visually display an image that corresponds to a certain region on the display screen of the display 26 corresponding to the to-be-processed synthesis region (i.e. an image within the trimming region when trimming is instructed). This permits the user to readily visually recognize any synthesis image to be generated upon issuance of a series of instructions stated previously.

Figure 12F:
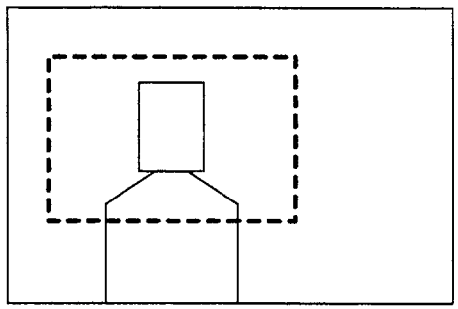
Figure 12G:
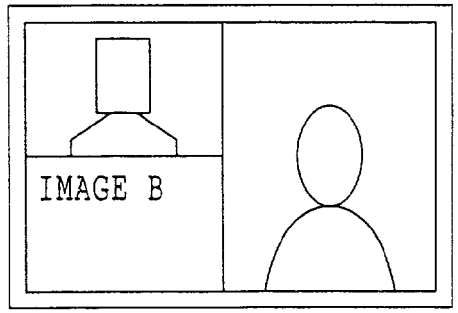

At next step 428, judge whether images to be synthesized are selected with respect to all the synthesis regions on the layout as selected by the user. If NO at step 428 the procedure returns to step 404 for repeated execution of step 404. Whereby, as exemplarily shown in FIGS. 12F and 12G, the images to be synthesized in respective synthesis regions are selected sequentially causing an image being displayed on the display 26 to switch sequentially.

Upon completion of synthesis image selection relative to all the synthesis regions resulting in the user's desired synthesized or "composite" image being displayed on the display 26, the judgment of step 428 is made affirmative causing the procedure to go to step 430 which displays on display 26 a message that requests the user to select whether image synthesis (generation of image data indicative of synthesized image) is performed or not and then judges based on a selection result as input by the user whether image synthesis is to be done.

One example is that when the user wants to print out the synthesized or composite image being displayed on the display 26 by using a printer the user owns, s/he selects execution of image synthesis. Whereby the judgment of step 430 is made affirmative causing the procedure to go to step 432 which integrally combines a plurality of to-be-synthesized image data together into a single image data based on the user's selected layout information and synthesis condition information in units of respective synthesis regions (information as stored at prior step 424) to thereby generate composite image data representing a composite image being displayed on display 26 with high resolution.

And at next step 434, let the composite image data thus generated be stored in the memory card; then complete the interruption processing (image synthesis processing). Using such composite image data makes it possible to achieve the intended processing such as printout of an image represented by said composite image by use of the user's own printer for example. This in turn makes it possible to obtain a composite image with the user's desired images being synthesized together in the user's desired layout.

On the other hand, when the user wants to request a photo processing lab to prepare the composite image being displayed on the display 26 as a high-quality photo print for example, s/he selects preparation of instruction information for instructing preparation of said composite image in place of the execution of image synthesis. In this case, the judgment of step 430 says NO causing the procedure to go to step 436 which generates image synthesis instruction information for instructing preparation of the composite image being displayed on display 26. This image synthesis instruction information is arranged including the user's selected layout information, synthesis condition information in units of respective synthesis regions and image data indicative of images to be synthesized into respective synthesis regions.

And at step 438, let the image synthesis instruction information thus generated be stored in the memory card, thereby completing the interruption processing (image synthesis processing). In this case, at the photo-processing lab that receives a photo print request from the user, it is possible to prepare a composite image through execution of similar processing to that at step 432 based on the image synthesis instruction information as has been sent from the user.

In this way, generation of image synthesis instruction information defining how a composite image is to be created makes it unnecessary for the user per se to perform complicated works such as informing in detail the synthesis conditions or the like for obtaining any desired composite image, which in turn makes it possible to lighten the user's workload for requesting photo print preparation to ensure that a photo print of the user's desired composite image is obtained. In addition, although relatively large loads are applied to the CPU 54 during generation of the composite image data as in step 432, it is possible to avoid the need to perform such processing at the digital still camera 10. Note that the steps 424, 430 and 432–438 correspond to the generation section in the present invention as claimed.

Additionally although the processing has been explained above for completing the intended composite image through selection of more than one image to be synthesized with respect to all the synthesis regions on a specific layout being presently selected upon startup of the image synthesis processing, the invention should not be limited only to this approach and may alternatively be arranged to enable the image synthesis processing to be temporarily terminated in the state that an image being synthesized in a partial synthesis region is not yet selected while enabling re-startup of the image synthesis processing by calling an unfinished composite image with an image to be synthesized in said partial synthesis region being not yet selected in an event that an image to be synthesized in such synthesis region in which any to-be-synthesized image selection is not selected is acquired or alternatively when said image to be synthesized is image-sensed.

Said unfinished composite image calling and image synthesis processing restartup may be arranged for example in such a way that if an unfinished composite image is found during displaying of layouts in a table form then they are co-displayed as "candidates" for selection thereby permitting execution thereof by selection of the unfinished composite image thus displayed or alternatively said unfinished image is displayed on the display 26 in the image display mode thus permitting execution by startup of the image synthesis processing in this state.

Additionally, although in the above explanation the aspect ratio of a trimming frame for designation of the trimming region was made identical to the aspect ratio of a synthesis region to be processed, the invention should not be limited thereto and may alternatively be arranged so that the aspect ratio of such trimming frame is alterable irrespective of the synthesis region and if upon execution of image synthesis the aspect ratio of the trimming frame is different from the aspect ratio of the synthesis region to be processed then a blank space within a synthesis region occurring due to such difference in aspect ratios will be left with no changes added thereto.

In addition, although in the above explanation there was set forth one example which is designed to allow pre-selection of a layout for use in image synthesis and later-selection of images to be superposed in synthesis regions as provided on the layout, the present invention should not be limited to this and may also be arranged so that either one of the layout selection and image selection is done first.

Furthermore, although in the above description the digital still camera 10 has been explained as one example of the image pickup device in accordance with the present invention, the invention should not be limited thereto and may also be applicable to other devices of the type having functions for converting optical photographic images to image information, such as for example digital video cameras or equivalents thereto.

A third preferred embodiment will next be explained below. An explanation of part of the third embodiment which is similar in device and processing to the second embodiment will be omitted herein. In this embodiment, information capable of being input to the digital still camera 10 may generally be divided into three kinds of ones which follow: image pickup condition information that defines image pickup condition of the digital still camera 10, processing condition information defining the processing condition of image processing as applied to image data, and information to be added to photo prints.

Also in this embodiment, when more than one image represented by image data obtained due to the user's image-sensing of any given subject of interest using the digital still camera 10 is recorded on recording material such as photographic printing paper or the like to thereby prepare a photo print(s), any given information designated by the user (e.g. audio information, character information, illustration information) is addable to (recordable on) the photo print(s). With this embodiment, these kinds of information will collectively be called the information to be added to photo prints. The information to be added to photo prints corresponds to the "predefined information to be recorded on the same recording material upon recording of an image represented by the image information onto the recording material" of the present invention as claimed.

The audio information may include sound/voice information indicative of sounds and/or voices for explanation of objects in picture images resulted from photography of memorable events, amusement parks, sightseeing spots, buildings or commercially available products as the objects to be shot. The audio information in accordance with this embodiment is such that digital audio data as obtained through sampling of an analog audio signal in predefined periods and analog-to-digital (A/D) conversion thereof is added with title information indicative of the title of such sound/voice represented by the audio data to thereby make up information body, which is then recorded on a medium as a visually recognizable two-dimensional (2D) bar code (equivalent to the first format in accordance with the present invention) in the state that the header information stated supra is added to this information body. The 2D bar code of the audio information is such that if it is a bar code of audio information for explanation of an event, amusement park, sightseeing spot, building or product under exhibition or the like then it is possible to record it on a signboard or the like that is installed at the original place.

When the user who has photographed as his or her target object an event, amusement park, sightseeing spot, building or product under exhibition or the like wants to add audio information explaining this photographed object to a photo print, s/he uses the digital still camera 10 to take a picture of a portion of the signboard installed at the original place on which a 2D bar code of the audio information explaining the photographed object is recorded (displayed). In this case, digital audio data and title information will be input as audio information to the digital still camera 10 and then stored in a corresponding storage region of the nonvolatile memory 58. And the digital still camera 10 performs processing (i.e. information addition processing to be later described) for addition of such input audio information to a photo print(s).

It should be noted that the audio information in accordance with this embodiment should not be limited only to the information indicative of sounds/voices explaining objects under photography and may alternatively be for example audio information or the like which represents human voices as pronounced to provide a word for image classification for example (e.g. the title of individual image, keyword being added to individual image, etc.) In view of the fact that the image classification is often done by selectively using a plurality of kinds of universal or "general-purpose" words, it will be permissible that a plurality of kinds of information items corresponding to the plurality of words for use in image classification are prerecorded as a 2D bar code or codes on sheet material such as paper or the like for permitting said plurality of kinds of audio information to be input to the digital still camera 10 by image-sensing of this 2D bar code(s).

The character information may be character information in a picture image obtained due to photography of an event, amusement park, sightseeing spot, building or product or the like as a target object, which information is indicative of an explanatory sentence explaining the object under photography. This character information is recorded on a medium as a visually recognizable 2D bar code (equivalent to the first format in accordance with the present invention) in the state that the above-noted header information is added to text data indicative of a sentence such as the explanatory sentence stated above. The 2D bar code representing the character information is such that if it is a bar code of character information indicative of an explanatory sentence for explanation of an event, amusement park, sightseeing spot, building or product under exhibition or the like then it is possible to record it on a signboard or the like as installed at the original place.

When the user who has photographed as his or her target object an event, amusement park, sightseeing spot, building or product under exhibition or the like wants to add character information explaining this photographed object to a photo print, s/he uses the digital still camera 10 to take a picture of a portion of the signboard installed at the original place at which a 2D bar code indicative of the character information explaining the object thus photographed is recorded (displayed) In this case the character information will be input as text data to the digital still camera 10 and then stored in a corresponding storage region of the nonvolatile memory 58. And the digital still camera 10 performs processing (i.e. information addition processing) for addition of such input character information to a photo print(s).

Note here that regarding to the character information in accordance with this embodiment also, this may also be character information or the like indicative of a word used for image classification by way of example; it will also be permissible that a plurality of kinds of character information items corresponding to a plurality of words used for image classification are prerecorded as a 2D bar code or codes on sheet material such as paper or the like for permitting said plurality of kinds of character information to be input to the digital still camera 10 by image-sensing of this 2D bar code(s).

The illustration information may be illustration information in an image obtained due to photography as a target object of an event, amusement park, sightseeing spot, building or product or the like, which information is indicative of a land map of a nearby location of the object-shooting place. This illustration information is recorded on a medium as a visually recognizable 2D bar code (equivalent to the first format in accordance with the present invention) in the state that the aforementioned header information is added to either bitmap data indicating an illustration such as the aforesaid map or the like by densities in units of respective color components of individual dots when the illustration such as a land map is subdivided into multiple dots or vector data indicating said illustration by information of densities or the like in units of respective color components in respective regions as partitioned by individual line segments's positions and/or such line segments making up said illustration. Regarding the 2D bar code representing the illustration information also, if it is a bar code of illustration information indicative of illustration information representing an illustration indicative of a map or the like of a nearby location of the shooting place whereat an event, amusement park, sightseeing spot, building or product under exhibition or the like was photographed then it is possible to record it on a signboard or the like as installed at the original place.

When the user who has photographed as his or her target object an event, amusement park, sightseeing spot, building or product under exhibition or the like wants to add to a photo print the illustration information indicative of a map or the like of a nearby location of the shooting place whereat the event, amusement park, sightseeing spot, building or product under exhibition or the like was photographed, s/he uses the digital still camera 10 to take a picture of a portion of the signboard installed at the original place on which a 2D bar code indicative of the map or the like of a nearby location of the shooting place whereat the target object was photographed is recorded (displayed) In this case the illustration information will be input to the digital still camera 10 as either the bitmap data or vector data and then stored in a corresponding storage region of the nonvolatile memory 58. And the digital still camera 10 performs processing (i.e. information addition processing) for addition of such input illustration information to a photo print.

Note that this embodiment is arranged to offer a capability to input the character information and/or illustration information to the digital still camera 10 via image-sensing of a string of characters and/or an illustration as recorded in other formats such as hand-writing or the like without having to use 2D bar codes. One example is that when the user wants to add hand-written characters or illustration to a photo print, s/he uses a data input sheet of predetermined format with several blank spaces being provided for entry of a title, keyword, memo and illustration as exemplarily shown in FIG. 7B and then handwrites such string of characters or illustration to be input to the digital still camera 10 into the blank spaces and, thereafter, takes a photographic image of the input sheet with handwriting completed by using the digital still camera 10. In this case the character information and/or illustration information is input as bitmap data to the digital still camera 10 and then stored in a corresponding storage region of the nonvolatile memory 58. And the digital still camera 10 performs processing (i.e. information addition processing to be later described) for addition of such input character information and/or illustration information to a photo print.

Note that if a plurality of types of input sheets different in format from one another are available then it will be permissible that bar codes indicating such input sheets' formats (position and size of each blank space) are added in advance to the input sheets for allowing the digital still camera 10 to recognize the bar codes.

At next step 164, judge again whether an object equivalent to a bar code is contained in the optical image as image-sensed by the image photography processing of step 162. If NO at step 164 then it is possible to judge in a way that the information to be input to the digital still camera 10 is not the information as represented by the 2D bar code; thus, at step 166, an attempt is made to recognize based on the image data being stored in the memory 48 due to the above-noted image photography processing a character region and/or illustration region of the image represented by the image data with characters and/or illustration to be input to the digital still camera 10 being recorded (displayed) therein and then extract from the image data an image of the character region (bitmap data equivalent to the character information) and/or an image of the illustration region (bitmap data equivalent to the illustration information) on the basis of the recognized character region and/or illustration region.

When the user desires to add the hand-written characters or illustration to a photo print due to the above-discussed processing also, it becomes unnecessary for the user to take a sheet material with characters and/or illustration hand-written thereon to a photo processing lab that is expected to perform photo print preparation while at the same time avoiding a necessity for the lab to do time-consuming works for conversion of such hand-written characters and/or illustration into digital data.

As in this embodiment the header information indicative of the kind of the information body of coded information is added to the coded information, when there is inconsistency or "contradiction" in the content of the header information being added to the coded information as obtained from a 2D bar code (e.g. any code indicating the kind of the information body is not set in the header information), that is, if YES at step 174, then the system routine goes to step 176 which notifies the user of failure in bar code recognition in such a way as to produce an alarm sound for warning to the user or alternatively display a message on the display 26 by way of example.

Additionally in light of the fact that the individual one of a variety of kinds of information to be input by the above-noted information input processing to the digital still camera 10 is generally such that specific information is selectively used from among a plurality of information being stored in the digital still camera 10, the above information input processing will be done a plurality of times with respect to the various information items respectively in a way which follows: regarding the audio information for example, a plurality of audio data bits indicative of mutually different sound/voice patterns will be stored in corresponding storage regions of the nonvolatile memory 58 of the digital still camera 10 respectively while being forced to correspond to title information representing titles of sound/voice patterns represented by the audio data respectively.

An explanation will next be given of the processing in an image reproduction or "playback" mode. In case the image playback mode is selected as the processing mode, the system routine leaves step 100 and goes to step 126 which brings or loads from a memory card the image data of an image to be displayed on the display 26 and then stores it in the memory 48.

At step 128, perform conversion of the pixel density of the image data being stored in the memory 48 in accordance with the pixel number of the display 26 (i.e. convert so that the numbers of longitudinal pixels and lateral pixels of an image represented by the image data become identical to the longitudinal/lateral pixel numbers of display 26), and then expand resultant pixel-density converted image data in a display image data storage region (bitmap memory) as provided in advance on the memory 48, and thereafter transfer the image data being stored in the display image data storage region toward the display 26. Whereby the image represented by the image data being stored in memory 48 will actually be displayed on display 26. Obviously in this process of image displaying on display 26, a plurality of images may also be laid out together in a matrix form and then displayed.

At next step 138, judge whether an instruction is issued to change or switch the image to be displayed on the display 26. When the judgment of step 138 is denied, that is, if NO at step 138 then the routine goes to step 140 which judges whether termination of the image playback mode is instructed. If NO at step 140 then return at step 138 for repeated execution of steps 138 to 140 until either the to-be-displayed image switching or image playback mode termination is actually instructed.

When the to-be-displayed image changeover is instructed through manual operation of the operation switch 32 for example, that is, if YES at step 138 then the system routine returns to step 126 for recurrent execution of the processing tasks at step 126 and its following steps whereby the image being displayed on the display 26 is changed. Alternatively when termination of the image playback mode is instructed, that is if YES at step 140, then the routine returns to step 100 for rejudgment of the present processing mode.

An explanation will next be given of the interruption processing that gets started in response to occurrence of an interruption when the user turns the menu switch 28 on, with reference to a flowchart of FIG. 13. At step 590, visually display a list of certain items to be displayed in a table-like form upon activation of the menu switch 28. Such items being displayed at this time indicate titles of processing tasks executable in reply to the user's instruction: with this embodiment, in addition to standard items being displayed at the digital still camera 10 upon activation of menu switch 28, respective items of "Image Pickup Condition," "Processing Condition" and "Information Addition" will also be displayed on the display 26.

At step 592, judge whether any one of such items as displayed in a table form on the display 26 is selected by the user: if no selection is made then wait until the judgement says YES. Additionally the operation switch 32 that is provided on the back face of the body 12 of digital still camera 10 is structured from an almost rectangular-shaped button having respective switch portions corresponding to upper/lower and right/left edges thereof, and is arranged so that upon depressing of an edge of the button, its corresponding switch portion will turn on.

During the interruption processing, the operation switch 32 is used for permitting the user to select information: the user's selection of a specific item from among those items being displayed in a table form is achievable for example by turning on either an upper side switch or a lower side switch of the operation switch 32 to thereby let a cursor move accordingly and then activating the execution/view changeover switch 30 in the state that the cursor is at said specific item.

When an item is selected by the user, YES is issued at step 592; thus, the system routine goes to step 594 which judges whether the user's selected item is "Information Addition" or not. When the user's selected item is an item other than "Information Addition," that is, if NO at step 594, then the routine proceeds to step 596 which performs processing which corresponds to the user's selected item.

If the selected item is "Image Pickup Condition" for example, let the user select specific image pickup condition information from among image pickup condition information being stored in the nonvolatile memory 58; then, perform the processing for setting in the digital still camera 10 an image pickup condition as defined by the user's selected image pickup condition information. Whereby image capture or photography of a target object in a photographing mode will be done in accordance with the image pickup condition thus established.

Alternatively if the selected item is "Processing Condition" then let the user select specific processing condition information from among processing condition information being stored in the nonvolatile memory 58; then, perform a variety kinds of processing tasks (e.g. color saturation control processing, hyper sharpness processing, density/color correction processing, tone/gradation conversion processing and the like) under the processing condition defined by the user's selected information. And upon completion of the processing of step 596, the interruption processing is terminated. Optionally it may be arranged so that after completion of image processing with respect to image data of a specific image, the image data of such specific image obtained after the image processing is used to visually display the specific image on the display 26. This permits the user to visually recognize an exact result of the image processing.

On the other hand, when the user wants to add (record) desired information (e.g. audio information, character information, illustration information) onto a specific photo print of those photo prints as prepared by a process of recording an image on recording material such as a photographic print sheet or the like by use of resultant image obtained by image-sensing of a given subject or object to be shot, s/he first turns the menu switch 28 on—in the state that an image to be processed is selected (e.g. in the state that the image to be processed is being displayed on the display 26 in the image playback mode) in order to permit execution of the processing (i.e. information adding processing for adding processing information (for detail, see later part of the description) to specific image data) for addition of desired information to a specific photo print—thereby causing certain items to be displayed on display 26 in a table-like form and then selects "Information Add" from among the items being displayed in the table form. Whereby YES is issued at step 594 letting the routine go to step 598 for permitting execution of the intended information adding processing at a step(s) in the downstream of step 594. Additionally this information addition processing corresponds to the adder section of the claimed invention.

More specifically at step 598, kind names ("Audio Information," "Character Information," "Illustration Information") of information addable to photo prints will be displayed on the display 26 in a table-like form. At next step 600, judge whether a specific kind name is selected from among the presently displayed kind names of information addable to photo prints; if no selection is made then wait until the judgment becomes affirmative. When a kind name of information to be added to the specific photo print is selected upon the user's activation of either an upper side switch or lower side switch of the operation switch 32 to thereby let a cursor move accordingly and then activating the execution/view changeover switch 30 in the state that the cursor is at the kind name of the information that the user desired to add to the specific photo print, the judgment of step 600 says YES causing the routine to go next to step 602.

At step 602, refer to a storage region of the information corresponding to the user's selected kind name as included in the storage regions of the nonvolatile memory 58 to thereby display in a table form all information items being stored in this storage region while substantially simultaneously displaying on the display 26 a message which requests the user to select information to be added to the specific photo print. Additionally this information display in the table form is achievable in a way such that if the user's selected kind name is "Audio Information" then display in a table form those titles indicated by title information being stored in an audio information storage region(s) of the nonvolatile memory 58 in a way corresponding to respective audio data.

Additionally with regard to the character information, there are a case where it is input and stored as bitmap data (when a string of characters recorded in a format such as hand-writing or the like was image-sensed) and a case where it is input and stored as text data (when a 2D bar code indicative of character information was image-sensed). Due to this, in case the "Character Information" is selected by the user as a kind name, bitmap data being stored in the nonvolatile memory 58's character information storage region is such that character information is displayed by a process of displaying within a certain display region an image (i.e. image containing therein the character information) represented by the bitmap data after having performed pixel density conversion so that a dot number of the bitmap data becomes identical to the dot number of a display region on the display screen of the display 26, whereas text data as stored in the character information storage region is such that the character information is displayed by a process of expanding character patterns (dot patterns indicative of characters) corresponding to the individual characters represented by the text data onto a bitmap memory respectively to thereby produce bitmap data of a character image containing therein the character information indicated by the text data and then displaying within a certain display region the character image indicated by the bitmap data.

Regarding the illustration information also, there are two possible cases one of which permits this information to be input and stored as bitmap data and the other of which lets it be input and stored as vector data. Due to this, in case the "Illustration Information" is selected by the user as a kind name, bitmap data being stored in the nonvolatile memory 58's illustration information storage region is such that illustration information is displayed by a process of displaying within a certain display region an image (i.e. image containing therein the illustration information) represented by the bitmap data after having performed pixel density conversion so that a dot number of the bitmap data becomes identical to the dot number of a display region on the display screen of the display 26 whereas vector data as stored in the illustration information storage region is such that the illustration information is displayed by a process of performing on a bitmap memory the processing of drawing line segments and/or painting a specific region on the basis of each information constituting the vector data to thereby generate bitmap data of an illustration image containing therein the illustration information indicated by the vector data and then displaying within a certain display region the illustration image indicated by this bitmap data.

Note here that the above-stated process of displaying the information corresponding to the selected kind name in a table form may be replaced with the process of displaying a single information on the display 26 while permitting switching of the information as displayed on display 26 in reply to the user's instruction; alternatively, it may also be arranged to offer a capability to select and determine whether the table-form display or individual display is employed on a case-by-case basis.

At next step 604, judge whether the information to be added to a specific photo print has been selected; if no such selection is made then wait for issuance of YES at this step. When the to-be-added information is selected by the user, that is, if YES at step 604, then the routine goes to step 606 which requests designation of a print position upon adding (recording) of the to-be-selected information to the specific photo print. And at step 608, judge whether such recording position upon addition of the information to the photo print has been designated; if no such designation is done then wait until YES is issued at this step.

In this embodiment, two positions are preset as the recording position of the information to be added to a photo print, one of which is a lateral side (first position) of an image recording region on an image recording surface as exemplarily shown in FIG. 14A and the other of which is on the back surface (second position) of the image recording surface as exemplarily shown in FIG. 14B (the character information or illustration information is to be recorded in an area as indicated by "Character or Illustration Information Recording Area" whereas the audio information is recorded in an area indicated by "Audio Information Recording Area"). When either the first position or second position is designated by the user as the recording position of the information to be added to the photo print, that is, if YES at step 608, then the routine goes to step 610.

Incidentally in this embodiment, recording formats for use during recording of the information addable to photo prints are fixedly defined in units of kinds of said information. More specifically, with this embodiment, an image display format for displaying as an image either a string of characters represented by the character information or an illustration represented by the illustration information is employed as the recording format of character information and illustration information whereas an audio information display format is used as the recording format of the audio information.

This audio information display format is a format for subdividing audio data as compressed by a chosen compression technique into segments of fixed data amount, converting the individual one of such divided data segments into a binary pattern similar to the bar code (i.e. pattern consisting of black and white portions), and sequentially recording said individual divided data segments as binary patterns on a medium along a fixed direction to thereby record the audio information as an elongated visible pattern train. The audio information as has been recorded in accordance with this audio information display format is readily reproducible as real sounds or voices by using a certain audio information reproduction or "playback" reader.

Specifically the audio information playback reader is arranged including a light emitting section for irradiation of light rays onto the above-noted visible pattern train, a photoelectric conversion unit for converting light reflected from the visible pattern train into an electrical signal, an A/D converter unit for performing sampling of analog electric signals as sequentially output from the photoelectric conversion unit for conversion to digital data, a decompression processing unit for decompressing or "defrosting" digital data being sequentially output from the A/D converter (i.e. compressed audio data), and audio playback unit for converting resultant defrosted audio data to an analog audio signal to thereby reproduce it as real sounds and/or voices, wherein the audio information playback reader is driven to move while causing the irradiation position of the light being output from the audio information playback reader to travel on the visible pattern train along said fixed direction whereby the audio information being recorded in accordance with the audio information display format will be reproduced as real sound/voice.

Due to this, at step 610, add several information to specific image data corresponding to the specific photo print as addition processing information, the several information including the information to be added to a specific photo print as selected by the user (audio information or character information or illustration information) and the information designating the recording position of said to-be-added information plus the information designating a recording format corresponding to the kind of said to-be-added information which format is selected from those recording formats as fixedly determined in units of kinds of addable information. In this way the step 610 corresponds to the adder section claimed.

At step 612, generate based on the specific image data and the addition processing information being added to the specific image data the image data representing a simulation image (image as shown in FIG. 14A or 14B) of a photo print as will be obtained form the specific image data and then display the simulation image on the display 26 based on the image data thus generated. Referring to this simulation image, the user is capable of visually verify the photo print with his or her desired information being added thereto at desired positions in accordance with the various selection and designation stated above, prior to actual production of this photo print.

At next step 614, display on the display 26 a message which asks the user to verify whether selection of all the information items to be added to the specific photo print has been completed to thereby judge whether all the information items desired to be added to the specific photo print have been added as the addition processing information.

In case the user desires to add a plurality of information items to the specific photo print, the user is expected to manually operate the operation switch 32 and execution/view change switch 30 to thereby input the information indicating that selection of all the to-be-added information items has not yet been completed; in reply thereto, NO is issued at step 614 causing the routine to return at step 598 for repeated execution of steps 598 to step 614. In this case a plurality of addition processing information will be added to the image data respectively in a way corresponding to a plurality of information to be added.

Upon completion of selection of all the information to be added to the specific photo print, when a simulation image of the specific photo print with all desired information being added at desired positions thereof is displayed on the display 26, the judgment of step 614 is made affirmative letting the routine go to step 616 which stores the specific image data with various information items added thereto in the memory card, thus terminating the interrupt processing (image synthesis processing).

An explanation will next be given of the way of preparing photo prints. The user is expected to send the memory card with image data of more than one image to be recorded as a photo print being stored therein to a photo processing lab; when requesting the photo processing lab to prepare photo prints, this lab will perform photo print preparation in a way as will be set forth below.

Firstly, read the image data out of the memory card and then judge whether addition processing information is added to the image data thus read. For image data with no addition processing information added thereto, apply a variety of kinds of image processing (e.g. color saturation control processing, hyper sharpness processing, density/color correction processing, tone/gradation conversion processing and the like) and thereafter transfer it toward the image exposure section of a photo printer. At the image exposure section of the photo printer, modulate the intensity of laser light being emitted from a laser light source of R, G and B in accordance with said image data while simultaneously letting the intensity-modulated laser light deflect for scanning on a recording material (e.g. photo printing paper) to thereby scan/expose an image represented by the image-processing experienced image data onto the recording material. And various processings including but not limited to color development, bleaching/fixation, water cleaning and dry-up are applied to the recording material with the image exposed and recorded thereon; then the recording material is cut into portions in units of individual images thus visualized to thereby produce photo prints from the image data with no addition processing information added thereto.

On the other hand, as for image data with the addition processing information being added thereto, refer to the contents of such addition processing information; judge the kind of information to be added to a photo print along with the recording position and recording format thereof; and generate recording data for recording the information to be added to the photo print at the designated recording position in the designated recording format.

One example is that when the information to be added to the photo print is audio information, a processing is done which includes the steps of compressing audio data contained in corresponding addition processing information in accordance with a chosen compression scheme (this compression is unnecessary if the audio data added has already been compressed), subdividing the compressed audio data into segments each having a constant data amount, converting the individual one of divided data segments into a binary pattern in conformity with certain rules, and generating binary pattern train data indicative of a train of elongated visible patterns obtainable when binary patterns of individual divided data segments are sequentially laid out along a fixed direction (i.e. data indicating whether each dot obtained when the visible pattern train is disassembled into multiple dots is "Black" or "white").

Additionally in view of the fact that the recording material used is such that its top surface is in most cases different from the back surface thereof in both the resolving power and the number of colors representable in units of dots during image printing onto the recording material (for instance, image printing to the back surface is often done by using dot printers relatively less in resolution and in number of representable colors (as a remarkable example, a dot printer of the monochrome type)), the recording data is generated by a process having the steps of performing pixel density conversion with respect to the binary pattern train data thus generated in a way conformity with the resolution during image recording to a recording position (recording surface) as designated relative to audio information while substantially simultaneously performing conversion of data per dot in accordance with the number of representable colors during image recording to the designated recording position to thereby produce the intended recording data. In addition, in case the audio information is recorded on the image recording surface, in order to simultaneously expose and record the visible pattern train indicative of such audio information in a chosen format as shown in FIG. 14A, let the recording data be combined or synthesized together with the image data in accordance with said chosen format.

Alternatively in case the information to be added to the photo print is character information, if the character information being contained in its corresponding addition processing information is text data then expand onto a bitmap memory those character patterns corresponding to the individual characters represented by the text data respectively to thereby generate bitmap data indicative of a character image and thereafter perform pixel density conversion and also conversion of data per dot in accordance with the resolution and the number of representable colors during image recording to a recording position (recording surface) as designated relative to the character information, thus producing the intended recording data. Additionally in case the character information is recorded on the image recording surface, in order to simultaneously expose and record the character image in a chosen format as shown in FIG. 14A, let the recording data be synthesized with the image data in accordance with said chosen format.

Note that in case where the information to be added to the photo print is character information and the character information contained in its corresponding addition processing information is bitmap data, apply to this bitmap data the pixel density conversion and also conversion of data per dot in accordance with the resolution and the number of representable colors corresponding to the character information's recording position to thereby produce recording data: further, if the character information's recording position is on the image recording surface then let the recording data be combined together with the image data in accordance with a chosen format.

Alternatively in case the information to be added to the photo print is illustration information, if the illustration information being contained in its corresponding addition processing information is bitmap data then, in a similar way to that discussed above, apply to this bitmap data the pixel density conversion and the conversion of data per dot in accordance with the resolution and the number of representable colors corresponding to the illustration information's recording position to thereby produce recording data: further, if the illustration information's recording position is on the image recording surface then let the recording data be combined together with the image data in accordance with a chosen format.

Furthermore in case where the information to be added to the photo print is illustration information and the illustration information as contained in its corresponding addition processing information is vector data byway of example, perform on the bitmap memory a processing such as drawing of line segments and/or paint-out of a specific area(s) or the like based on respective information items making up this vector data to thereby create bitmap data containing therein an image represented by the vector data (i.e. image including illustration information) and then perform the pixel density conversion and conversion of data per dot in accordance with the resolution and the number of representable colors corresponding to the illustration information's recording position to thereby produce recording data: further, if the illustration information's recording position is on the image recording surface then let the recording data be combined together with the image data in accordance with a chosen format.

And when recording the information to be added to the photo print onto the image recording surface, transfer the image data with the recording data combined together toward the image exposure unit of the photo printer. Whereby laser light with its intensity modulated based on the recording data-combined image data is forced to scan over the recording material causing an image with the information represented by the recording data (image such as shown in FIG. 14A) to be exposed and recorded on the image recording surface of the recording material, which would result in preparation of a photo print with the user's desired information added onto the image recording surface thereof.

In case the information to be added to the photo print is recorded on the back surface of the image recording surface, transfer image data with no recording data combined toward the image exposure unit of the photo printer while also transferring the recording data to a back print unit of the photo printer which is operable to perform recording of characters and/or image on the back surface of recording material. Whereby an image will be exposed and recorded on the image recording surface of recording material while substantially simultaneously permitting the back print unit to record the recording data on the back surface of the image recording surface as shown in FIG. 14B, which results in preparation of a photo print with the user's desired information being added to the back face of the image recording surface.

From the foregoing, it is no longer required that upon requesting of preparation of more than one photo print with desired information added thereto the user per se perform complicated works typically including delivery of a recording medium or media such as paper with the to-be-added information recorded thereon to the photo processing lab and designation of a photo print or prints to which desired information is added, which in turn makes it possible to lighten the user's workload for requesting photo print preparation to ensure that the user's desired photo print(s) is/are obtained.

It should be noted that although in the above description one specific case has been explained where the recording formats are fixedly determined in units of kinds of information addable to photo prints, the present invention should not be limited thereto and may also be arranged so that a plurality of formats are made selectable as the recording format (second format) for adding to the image data the information instructing a recording format as selected by the user to thereby permit information to be added to photo prints in said selected format. For instance, other formats selectable upon addition of audio information to photo prints include for example a format which magnetically records audio information on a recording material with magnetic material being pre-coated thereon while offering enhanced sound/voice reproducibilities. In addition, other formats selectable upon addition of character information to photo prints include for example a dot-character block format for representation of each character indicated by the character information in the form of a convexo-concave pattern.

Also note that although in the above description one exemplary case has been explained where either the first position (specific position on the image recording surface) or the second position (specific position on the back face of the image recording surface) is selected as the recording position of the information to be added to a photo print, the invention should not be limited to this and may also be arranged so that multiple types of formats are prepared as the format of recording positions of the information to be added to the photo print for enabling these multiple types of formats to be input and stored in the digital still camera 10 by use of bar codes to thereby permit use of a format as selected by the user from among such formats being stored in the digital still camera 10 (i.e. from the multiple types of formats if multiple formats are presently stored therein).

Further note that although in the above discussion one preferred form has been set forth which causes photo print preparation to be done at the photo processing lab, the invention should not be limited thereto and may alternatively be arranged so that the digital still camera is designed to offer a built-in printer control function to ensure that upon recording of an image on a recording material such as paper by a printer machine as connected to the digital still camera, the information defined by addition processing information being added to image data is recorded on the same recording material.

Furthermore, although in the above description the digital still camera 10 has been explained as an example of the image pickup device in accordance with the present invention, the invention should not be limited thereto and may be applicable to any other devices having functions of shooting optical images and converting them into image information such as digital video cameras or equivalents thereof.

What is claimed is:

1. An image pickup device comprising:
   an image pickup section which senses an optical image and converts said optical image into image information;
   a recognition section which, if said optical image sensed by said image pickup section includes a medium displaying predefined information, recognizes said predefined information based on said image information obtained by said image pickup section;
   a storage section which stores said predefined information recognized by said recognition section; and
   a processing section which performs at least one of controlling image sensing by said image pickup section based on said predefined information, processing image information based on said predefined information, and making said predefined information correspond to associated image information,
   wherein while in a photography mode, said image pickup device automatically prompts a user to enter into an information input mode upon recognition of said predefined information on said medium by said recognition section, and
   wherein while in said information input mode, said storage section stores said predefined information recognized by said recognition section.

2. The image pickup device of claim 1, wherein said predefined information is coded and displayed at said medium in a visually recognizable form.

3. The image pickup device of claim 1, wherein said predefined information is one of text and an illustration displayed at said medium.

4. The image pickup device of claim 1, wherein said predefined information is any one of information relating to an image pickup condition of said image pickup section, information relating to processing of image information obtained by image sensing of said image pickup section, and information which is to be corresponded to image information obtained by image sensing of said image pickup section.

5. The image pickup device of claim 4, wherein said information relating to said image pickup condition includes image pickup condition information which regulates said image pickup condition, and said processing section controls such that image sensing is performed by said image pickup section with said image pickup condition being regulated by said image pickup condition information.

6. The image pickup device of claim 5, wherein said image pickup condition information is information which regulates at least one of a flash mode, an automatic exposure mode, turning automatic white balance adjustment on/off, and whether to allow saturation of gray tones at a highlighted area.

7. The image pickup device of claim 5, further comprising a selector section which selects information, wherein said storage section is capable of storing a plurality of kinds of said image pickup condition information, and said processing section controls such that image sensing is performed by said image pickup section with said image pickup condition being regulated by image pickup condition information selected, by said selector section, from said plurality of kinds of said image pickup condition information stored at said storage section.

8. The image pickup device of claim 7, further comprising a display section, wherein said information relating to said image pickup condition includes title information which represents a title of said image pickup condition information, and said selector section displays, based on said title information, a title of a selectable image pickup condition at said display section.

9. The image pickup device of claim 4, wherein said information relating to processing of image information includes processing condition information which regulates a processing condition of image processing on image information, and said processing section performs said image processing on image information with said processing condition being regulated by said processing condition information.

10. The image pickup device of claim 9, wherein said processing condition information is information which regulates at least one of a saturation enhancement degree, a sharpness enhancement degree, a processing condition of color conversion processing, a processing condition of density conversion processing, and turning a particular image processing on/off.

11. The image pickup device of claim 9, further comprising a selector section which selects information, wherein said storage section is capable of storing a plurality of kinds of said processing condition information, and said processing section performs said image processing on image information with a processing condition being regulated by processing condition information selected, by said selector section, from said plurality of kinds of said processing condition information stored at said storage section.

12. The image pickup device of claim 11, further comprising a display section, wherein said information relating to processing of image information includes title information which represents a title of said processing condition information, and said selector section displays, based on said title information, a title of a selectable processing condition at said display section.

13. The image pickup device of claim 4, wherein said information relating to processing of image information includes layout information which regulates a layout when image information representing an image is to be synthesized with other visually recognizable recordable information, and said processing section synthesizes a portion or all of said image information representing said image with said other information in said layout regulated by said layout information.

14. The image pickup device of claim 4, wherein said information relating to processing of image information includes at least one of processing condition information which regulates a processing condition of image processing on image information, title information which represents a title of said processing condition of image processing, and layout information which regulates a layout when image information representing an image is to be synthesized with other visually recognizable recordable information, and said processing section makes at least one of said processing condition information, said title information and said layout information to correspond to said image information.

15. The image pickup device of claim 4, wherein said information which is to be corresponded to said image information obtained by image sensing of said image pickup section includes at least one of classification information for classification of an image represented by said image information, text information which represents a text message which explains content of said image represented by said image information, and illustration information which represents an illustration to be added to said image represented by said image information, and said processing section performs one of making correspond to specific image information said information which is to be corresponded and synthesizing with said image information said information which is to be corresponded.

16. The image pickup device of claim 1, further comprising a notifying section which notifies the user if said recognition section recognizes the predefined information or fails to recognize the predefined information.

17. The image pickup device of claim 1, wherein if said image pickup device is sensing an optical image that includes a medium displaying coded predefined information in a visually recognizable form, said image pickup section performs image sensing with a fixedly predetermined image pickup condition.

18. The image pickup device of claim 1, further comprising a notifying section which judges whether a medium displaying coded predefined information in a visually recognizable form is included in said optical image sensed by said image pickup section, and notifies if said medium is judged to be included.

19. An image pickup device control method comprising the steps of:
sensing, with an image pickup device provided with an image pickup section which senses an optical image and converts said optical image into image information, a medium displaying predefined information to be input to said image pickup device;
inputting said predefined information into said image pickup device by recognizing said predefined information based on said image information obtained by image sensing, and storing said predefined information at a storage section; and performing at least one of controlling image sensing by said image pickup section based on said predefined information, processing image information based on said predefined information, and making said predefined information correspond to associated image information, wherein while in a photography mode, automatically prompting a user to enter into an information input mode upon recognition of said predefined information on said medium, and wherein while in said information input mode, storing of said predefined information at said storage section.

20. An image processing method comprising the steps of:

sensing, with an image pickup device provided with an image pickup section which senses an optical image and converts said optical image into image information, a medium displaying processing information which regulates processing content when image information is to be processed;

inputting said processing information into said image pickup device by recognizing said processing information based on said image information obtained by image sensing and storing said processing information at a storage section;

making said processing information correspond to specific image information; and sending said specific image information corresponded to said processing information to an image processing device, such that said specific image information is processed by said image processing device with said processing content being regulated by said processing information, wherein while in a photography mode, automatically prompting a user to enter into an information input mode upon recognition of said predefined information on said medium, and wherein while in said information input mode, storing of said predefined information at said storage section.

21. An image pickup device comprising:

an image pickup section which senses an optical image and converts said optical image to image information;

a recognition section which, if said optical image sensed by said image pickup section includes a medium displaying layout information which defines a layout employable during image synthesis, recognizes said layout information based on said image information obtained by image sensing;

a storage section which stores said layout information recognized by said recognition section; and a generator section which, when image information of an image to be synthesized in accordance with said layout defined by said layout information is one of designated and inputted, generates one of composite image information, which represents a composite image in which said image to be synthesized is synthesized in accordance with said layout, and instruction information, which is for generation of said composite image information, wherein while in a photography mode, said image pickup device automatically prompts a user to enter into an information input mode upon recognition of said layout information on said medium by said recognition section, and wherein while in said information input mode, said storage section stores said layout information recognized by said recognition section.

22. The image pickup device of claim 21, wherein said layout information is coded and displayed at said medium in a visually recognizable form.

23. The image pickup device of claim 21, further comprising a selector section, wherein a plurality of kinds of layout information, which define mutually different layout patterns, are stored in said storage section, and said selector section selects layout information to be used during image synthesis.

24. The image pickup device of claim 23, further comprising a display section, wherein title information which represents a title of a layout defined by layout information is added to said layout information, and said selector section displays, based on said title information, a title of a selectable layout at said display section.

25. The image pickup device of claim 21, further comprising a selector section, wherein a plurality of image synthesizable synthesis regions are provided in said layout defined by said layout information, and said selector section selects a to-be-processed synthesis region from among said plurality of synthesis regions.

26. The image pickup device of claim 25, further comprising a display section, wherein said selector section displays said layout defined by said layout information at said display section such that an arrangement of said plurality of synthesis regions provided in said layout can be visually confirmed.

27. The image pickup device of claim 21, wherein after image synthesis has been instructed, said image information of said image to be synthesized in accordance with said layout defined by said layout information is inputted by said image pickup section sensing an optical image and image information obtained by image sensing being inputted.

28. The image pickup device of claim 21, further comprising a designation section, which designates said image to be synthesized in accordance with said layout defined by said layout information from among a plurality of images whose image information has been stored in said storage section by optical image sensing by said image pickup section.

29. The image pickup device of claim 21, further comprising a designation section which designates as said image to be synthesized a partial region of a specific image whose image information is stored in said storage section, wherein said generator section generates one of said composite image information and said instruction information based on position, shape and size of said region designated by said designation section, such that only said region is synthesized as said composite image.

30. An image pickup device control method comprising the steps of:

sensing, with an image pickup device provided with an image pickup section which senses an optical image and converts said optical image into image information, a medium displaying layout information which defines a layout for use when an image is to be synthesized;

inputting said layout information into said image pickup device by recognizing said layout information based on said image information obtained by image sensing and storing said layout information at a storage section; and generating, after image information of an image to be synthesized in accordance with said layout defined by said layout information has been one of designated and inputted, one of composite image information, which represents a composite image in which said image to be synthesized is synthesized in accordance with said layout, and instruction information, which is for generation of said composite image information, wherein while in a photography mode, automatically prompting a user to enter into an information input mode upon recognition of said layout information on said medium, and wherein while in said information input mode, storing of said layout information at said storage section.

31. An image pickup device comprising:

an image pickup section which senses an optical image and converts said optical image to image information;

a recognition section which, if said optical image sensed by said image pickup section includes a medium displaying predefined information in a visually recognizable first format, recognizes said predefined information based on said image information obtained by image sensing;

a storage section which stores said predefined information recognized by said recognition section; and an adder section which, when an image represented by said image information is to be recorded on a recording material, adds said predefined information to said image information to provide information to be recorded on the same recording material in a second format which is different from said first format, wherein while in a photography mode, said image pickup device automatically prompts a user to enter into an information input mode upon recognition of said predefined information on said medium by said recognition section, and wherein while in said information input mode, said storage section stores said predefined information recognized by said recognition section.

32. The image pickup device of claim 31, wherein said first format is a bar code.

33. The image pickup device of claim 31, wherein identification information indicating kind of said predefined information is added to said predefined information, and said recognition section recognizes said kind of said predefined information based on said identification information.

34. The image pickup device of claim 33, wherein said adder section decides said second format in accordance with said kind of said predefined information recognized by said recognition section, and adds information designating said second format to said image information with said predefined information.

35. The image pickup device of claim 31, wherein said predefined information is audio information, and said second format is an audio information representation format which represents said audio information such that sound represented by said audio information is easily reproducible.

36. The image pickup device of claim 31, wherein said predefined information is text information, and said second format is an image representation format which represents text represented by said text information as an image.

37. The image pickup device of claim 31, wherein said predefined information is illustration information, and said second format is an image representation format which represents an illustration represented by said illustration information as an image.

38. An image processing method comprising the steps of:

sensing, with an image pickup device provided with an image pickup section which senses an optical image and converts said optical image to image information, an image of a medium displaying, in a visually recognizable first format, predefined information which is to be recorded onto the same recording material as an image represented by image information;

inputting said predefined information to said image pickup device by recognizing said predefined information based on said image information obtained by image sensing and storing said predefined information at a storage section;

adding, when said image represented by image information is to be recorded onto the recording material, said predefined information to said image information, to provide information to be recorded on said recording material in a second format which is different from said first format; and recording said predefined information onto said recording material in said second format when said image represented by image information, to which said predefined information has been added, is recorded onto said recording material, wherein while in a photography mode, automatically prompting a user to enter into an information input mode upon recognition of said predefined information on said medium, and wherein while in said information input mode, storing of said predefined information at said storage section.

* * * * *